United States Patent
Ogata et al.

[11] Patent Number: 6,114,668
[45] Date of Patent: Sep. 5, 2000

[54] HEATER-CONTAINING GRIP FOR VEHICLES

[75] Inventors: Toru Ogata; Nobuhiko Muramatsu; Shinji Teraoka, all of Shizuoka; Yasuo Ohishi, Saitama, all of Japan

[73] Assignee: Koita Manufacturing Co., Ltd., Tokyo, Japan

[21] Appl. No.: 09/051,488
[22] PCT Filed: Aug. 27, 1997
[86] PCT No.: PCT/JP97/02974
§ 371 Date: Apr. 20, 1998
§ 102(e) Date: Apr. 20, 1998
[87] PCT Pub. No.: WO98/08731
PCT Pub. Date: May 3, 1998

[30] Foreign Application Priority Data

| Aug. 29, 1996 | [JP] | Japan | 8-228222 |
| Aug. 29, 1996 | [JP] | Japan | 8-228223 |
| Sep. 3, 1996 | [JP] | Japan | 8-232929 |
| Sep. 11, 1996 | [JP] | Japan | 8-240842 |
| Sep. 11, 1996 | [JP] | Japan | 8-240843 |
| Sep. 11, 1996 | [JP] | Japan | 8-240844 |

[51] Int. Cl.$^7$ .................................................. H05B 1/02
[52] U.S. Cl. .................... 219/494; 219/548; 219/544; 219/202; 219/204; 74/551.8
[58] Field of Search ...................... 219/202, 204, 219/497, 501, 499, 494, 548, 544; 74/552, 551.9, 558.5

[56] References Cited

U.S. PATENT DOCUMENTS

| 3,633,094 | 1/1972 | Clements | 219/501 |
| 3,733,463 | 5/1973 | Low et al. | 219/499 |
| 4,420,113 | 12/1983 | Lacroix | 219/497 |
| 4,631,976 | 12/1986 | Noda et al. | 74/552 |
| 5,613,407 | 3/1997 | Ogata | 219/204 |

FOREIGN PATENT DOCUMENTS

| 57-10021 | 6/1955 | Japan . |
| 57-191170 | 11/1982 | Japan . |
| 62-200089 | 12/1987 | Japan . |
| 2-18786 | 2/1990 | Japan . |
| 3-41990 | 9/1991 | Japan . |
| 6-44791 | 11/1994 | Japan . |
| 7-29030 | 7/1995 | Japan . |
| 7-48463 | 11/1995 | Japan . |
| 8-26164 | 1/1996 | Japan . |
| 8-26165 | 1/1996 | Japan . |

*Primary Examiner*—Mark Paschall
*Attorney, Agent, or Firm*—Nikaido Marmelstein Murray & Oram LLP

[57] ABSTRACT

A heater-installed grip for a vehicle includes substantially semi-cylindrical inner pieces ($33_1$, $33_2$) of a synthetic resin which have a planar heater ($34_L$, $34_R$; $174_L$, $174_R$; 184) wound around an outer periphery thereof and which are integrally embedded in a cylindrical grip body (35) made of a rubber assembled to a pipe-shaped steering handlebar (26) or a throttle pipe (79). In this heater-installed grip, a circumferentially central portion of each of the inner pieces ($33_1$, $33_2$) is formed at a large wall thickness, as compared with circumferentially opposite ends thereof. Thus, the assemblability of the grip body (35) to the pipe-shaped steering handlebar (26) or the throttle pipe (79) is enhanced, while ensuring a die-clamping strength in a process for forming the grip body (35).

20 Claims, 32 Drawing Sheets

HEATER-CONTAINING GRIP FOR VEHICLES

TECHNICAL FIELD

The present invention relates to a heater-installed grip for a vehicle such as a motorcycle, a snowmobile, a buggy vehicle and the like, a control device for a heater installed in the vehicle grip, and an electrical connection structure for a heater unit for the grip.

BACKGROUND ART

Such grips are conventionally known, for example, from Japanese Utility Model Publication No. 7-48463 and the like. As shown in FIGS. 37 and 38, the grip is of a structure in which a flexible printed wiring heater circuit 190 (which will be referred to as an FPC heater hereinafter) is integrally embedded, in a mode in which it has been wound around a semi-cylindrical inner piece 33' made of a synthetic resin, in a cylindrical grip body 35' made of a rubber and capable of being fitted into a pipe-shaped steering handlebar 26. A feeder cord (not shown) is soldered to a lead portion 190a of the FPC heater 190 led out of the grip body 35'.

In producing the grip body 35', the following steps are sequentially conducted as shown in FIG. 39: a step of assembling the inner piece 33' having the FPC heater 190 wound therearound to a core 191; a step of winding a sheet 192 of a raw rubber around the FPC heater 190; a step of bringing dies 193 and 194 in a state in which the resulting sheet has been accommodated therein, into close contact with each other to clamp them; a step of pouring a molten rubber into the dies 193 and 194 at a point when the temperature has reached a level at which the raw rubber sheet 192 within the dies 193 and 194 is molten, thereby forming the grip body 35'; and a step of removing the formed grip body 35' out of the dies 193 and 194 at a point when the rubber within the dies 193 and 194 has been vulcanized, and then cooling the removed grip body 35' by leaving it to stand for a predetermined time.

In the above heater-installed grip, however, the inner piece 33' made of the synthetic resin is formed at a circumferentially constant and relatively large wall thickness. For this reason, the flexibility of the grip body 35' is small, and in press-fitting the steering handlebar 26 into the grip body 35', the grip body 35' cannot follow the movement of the steering handlebar 26 which is press-fitted and hence, it is difficult to press-fit the steering handlebar 26 into the grip body 35'. If the steering handlebar 26 is forcibly press-fitted into the grip body 35', there is a possibility that the inner piece 33' may be cracked, resulting in a very poor assemblability of the grip body 35' to the steering handlebar 26.

Therefore, if the inner piece 33' is formed at a relatively small wall thickness, the flexibility of the grip body 35' is increased, whereby the assemblability of the grip body 35' to the steering handlebar 26 is enhanced and the possibility of cracking of the inner piece 33' is eliminated. However, during clamping of the dies in forming the grip body 35', the inner piece 33' may be cracked in some cases, because it cannot withstand the clamping.

The conventional inner piece 33' suffers from the following problem: Since the conventional inner piece 33' is semi-cylindrical, the rubber layer is cooled and shrunk in the course of cooling of the grip body 35' after being removed from the dies 193 and 194, especially, a rubber layer region a opposed to the inner piece 33' is shrunk, and the circumferentially opposite ends b, b of the inner piece 33' are deformed in a direction to approach each other by such shrinking force and as a result, the grip body 36' is warped.

An electric power for heating a heater in such a heater-installed grip by a heater is supplied from a battery mounted on a vehicle. The capacitor of the battery is limited and hence, it is desirable that the grip is effectively warmed by an electric power as small as possible. In the conventional heater-installed grip, however, the FPC heater is disposed in a uniformly dispersed manner in the grip body and is of a construction to uniformly warm the entire grip. Therefore, to warm the grip up to a comfort temperature, there is a possibility that the amount of power consumed may be increased to produce the running-out of the battery. If the amount of power consumed is suppressed, the rising of the temperature of the grip is insufficient.

The conventional heater control device is of an arrangement in which as shown in FIG. 40, heaters $190_L$ and $190_R$ mounted respectively in the left and right handlebar grips of the steering handlebar in the motorcycle are connected in series; a switch 195 is mounted between one of the heaters $190_L$ and the battery 90, and a variable resistor 196 is connected in series to the other heater $190_R$, so that the electric current flowing through the heaters $190_L$ and $190_R$ is regulated and the power consumed in the heaters $190_L$ and $190_R$ is controlled by varying the resistance value of the variable resistor 196, thereby maintaining the handlebar grips at a suitable temperature.

However, there is a problem that the power consumed in the variable resistor 196 is relatively large, and the battery 90 cannot be utilized efficiently. Especially, in a case of the grip heater mounted in the handlebar in the motorcycle or the like, the power consumed in the heaters is large, because it is in direct contact with the open air, and the power consumed in the variable resistor is increased because of a large range of variation in temperature of the open air. This makes it difficult to utilize the battery efficiently.

The warming of the grip by the heaters installed in the grip for the vehicle is attended on the traveling of the vehicle. To have a preference of the traveling of the vehicle, it is required that the supplying of the power from the battery to the heaters should be stopped when the power source voltage of the battery has been dropped down to a value equal to or lower than a voltage required at a minimum for driving a starter motor. Even in the above conventional heater-installed grip, the control of the supplying of the power to the heater is carried out in the above manner. However, if the timing to stop the supplying of the power to the heaters is established so that the supplying of the power is stopped at a voltage threshold value larger than required to reliably ensure a minimum power source voltage required in the battery, a state in which the grip can be warmed by the heaters is extremely limited. If the voltage threshold value is too small, the supplying of the power to the heaters is conducted even if the voltage becomes equal to or smaller than the minimum power source voltage required in the battery due to an error of detection of the voltage or a drop of the voltage from the battery to a detected portion, whereby it may be difficult to start the vehicle. Therefore, it is desirable that the voltage threshold value for determining the timing for stopping the supplying of the power to the heaters is set at a necessary minimum value in consideration of the voltage detection error and the voltage drop.

If the supplying of the power to the heaters is stopped, the power source voltage of the battery is slightly risen. If the supplying of the power to the heaters is controlled in an ON/OFF manner at a constant voltage threshold value, turning-ON/OFF of the supplying of the power to the heater is frequently repeated to produce a control hunching. Therefore, the grip cannot be stably warmed, and a good warm-feeling is not obtained.

In mounting of the grip heater unit comprised of a heater installed in a grip of a steering handlebar and a control device for controlling the heater to a vehicle such as a motorcycle, if the grip heater unit is assembled exclusively for the vehicle as manufactured, then a plus-side connecting wire is connected directly to a plus side of the battery, and minus-side connecting wire is connected directly to a minus side of the battery. In this case, there is particularly not a problem arisen. However, if the grip heater unit is applied to a commercially available vehicle, or the application thereof to a large number of types of vehicles is considered, it is desirable that the connection of the plus-side connecting wire and the minus-side connecting wire extended from the grip heater unit to the plus side and the minus side of the battery can be easily performed for any type of the vehicles. Moreover, the heater is installed in the grip of the turnable steering handlebar, and it is necessary to avoid the arising of problems in the reliability and the durability of the connection structure as a result of twisting of the connecting wires due to the connection of the plus-side and minus-side connecting wires.

DISCLOSURE OF THE INVENTION

Accordingly, it is a first object of the present invention to provide a heater-installed grip for a vehicle, wherein the assemblability of a grip body to a pipe-shaped steering handlebar or a throttle pipe is enhanced, while ensuring the clamping strength at a step of forming the grip body, by varying the plate thickness of an inner piece in a circumferential direction thereof.

To achieve the first object, according to a first aspect and feature of the present invention, there is provided a heater-installed grip for a vehicle, comprising a substantially semi-cylindrical inner piece of a synthetic resin which has a planar heater wound around an outer periphery thereof and which is integrally embedded in a cylindrical grip body of a rubber assembled to a pipe-shaped steering handlebar or a throttle pipe, wherein a circumferentially central portion of the inner piece is formed at a wall large thickness, as compared with circumferentially opposite ends thereof. According to a second aspect and feature of the present invention, there is provided a heater-installed grip for a vehicle, wherein grooves arcuate in cross section, into which a molten rubber flows in the formation of the grip body, are defined in inner peripheral surfaces of the inner pieces. According to a third aspect and feature of the present invention there is provided a heater-installed grip for a vehicle, wherein an axially extending projection is formed at a circumferentially central portion of an inner surface of each of the inner pieces.

With the first feature, by the fact that the circumferentially opposite ends of the inner piece have a relatively small wall thickness, the flexibility of the inner piece and thus of the grip body is enhanced, so that the grip body can follow the movement of the steering handlebar or the throttle pipe which is press-fitted. Moreover, in the clamping of dies, a large external force acts on the circumferentially central portion of the inner piece, but by the fact that the circumferentially central portion of the inner piece is formed at the relatively large wall thickness, the inner piece cannot be deformed.

With the second feature, by the fact that the groove is defined in the inner peripheral surface of the inner piece, the flexibility of the inner piece and thus of the grip body is enhanced, so that the grip body can follow the movement of the steering handlebar or the throttle pipe which is press-fitted. Moreover, the rigidity of a portion in the vicinity of the groove can be enhanced by forming the section of the groove into an arcuate shape, thereby enhancing the rigidity of the entire inner piece. Therefore, even if a large external force acts on the circumferentially central portion of the inner piece in the clamping of dies, the inner piece cannot be deformed.

With the third feature, by the fact that the axially extending projection is formed at the circumferentially central portion of the inner surface of the inner piece, the circumferentially central portion of the inner piece is formed at a large wall thickness, as compared with the circumferentially opposite ends, and the circumferentially opposite ends of the inner piece are formed at a relatively small wall thickness. Thus, the flexibility of the inner piece and thus of the grip body is enhanced, so that the grip body can follow the movement of the steering handlebar or the throttle pipe which is press-fitted. Even if a large external force acts on the circumferentially central portion of the inner piece in the clamping of dies, the inner piece cannot be deformed since the circumferentially central portion of the inner piece is formed at a relatively large wall thickness.

It is a second object of the present invention to provide a heater-installed grip for a vehicle, wherein the rigidity and strength of an inner piece are enhanced, so that a grip body cannot be deformed after being formed.

To achieve the second object, according to a fourth aspect and feature of the present invention, there is provided a heater-installed grip for a vehicle, comprising a substantially semi-cylindrical inner piece of a synthetic resin which has a planar heater wound around an outer periphery thereof and which is integrally embedded in a cylindrical grip body of a rubber assembled to a pipe-shaped steering handlebar or a throttle pipe, wherein the inner piece is integrally provided, at an axially predetermined location thereon, with annular portions which are intended to prevent the deformation of the inner piece attendant on the shrinkage of a rubber layer after formation of the grip body, and each of which functions as a guide for insertion of the steering handlebar or the throttle pipe.

A shrinking force produced in the cooling and solidification of the rubber layer acts on the grip body removed from the dies, thereby shrinking and deforming the rubber layer in the circumferential and axial directions, particularly in a rubber layer region opposed to the inner piece, and deforming the circumferentially opposite ends of the inner piece so that the opposite ends are adjacent to each other. However, according to the fourth feature, the annular portion integrally included in the inner piece receives the shrinking force acting on the rubber layer. Therefore, it is possible to provide the inner piece with a rigidity and strength enough to prevent the deformation of the inner piece, and it is possible to prevent the produced grip body from warping to reduce the rate of generation of a defective product. Moreover, by the fact that the annular portion is provided at a portion of the axially predetermined location of the inner piece, the flexibility of the grip body at the time when the steering handlebar or the throttle pipe is press-fitted into the grip body cannot be remarkably injured at the annular portion. Furthermore, since the annular portion functions as a guide for insertion of the steering handlebar or the throttle pipe, the assemblability of the grip body to the steering handlebar or the throttle pipe can be enhanced. It is a third object of the present invention to provide a heater-installed grip for a vehicle, wherein the grip can be effectively warmed with a small amount of power consumed.

To achieve the third object, according to a fifth aspect and feature of the present invention, there is provided a heater-installed grip for a vehicle, comprising a heat generating element integrally embedded over the substantially entire circumference in a grip body made of a rubber, wherein the heat generating element is disposed in a dispersed manner in the grip body in such a manner that the density of heat generating element dispersed at a front portion of the grip body in a direction of movement of the vehicle is higher than that at a rear portion of the grip body. According to a sixth aspect and feature of the present invention, there is provided a heater-installed grip for a vehicle, wherein the heat generating element is disposed in a dispersed manner in the grip body in such a manner that the density of heat generating element dispersed at an end portion of the grip body, that is located on an inner side when assembled on the vehicle is higher than that at an outer end portion of the grip body. According to a seventh aspect and feature of the present invention, there is provided a heater-installed grip for a vehicle, comprising a heat generating element integrally embedded over substantially half of a circumference in a grip body made of a rubber, wherein the heat generating element is disposed in the grip body at a front portion of the grip body in a direction of movement of the vehicle. According to an eighth aspect and feature of the present invention, there is provided a heater-installed grip for a vehicle, wherein the heat generating element is disposed in a dispersed manner in the grip body in such a manner that the density of heat generating element dispersed at an inner end portion of the grip body is higher than that at an outer end portion of the grip body.

The front portion of the grip body in the direction of movement of the vehicle is a portion touched by fingertips of a hand grasping the grip. By the fact that the density of heat generating element dispersed at such portion is higher than that at the rear portion of the grip body, or the heat generating element is disposed only at the front portion of the grip body according to the fifth or seventh feature, the fingertips sensitively feeling the cold can be effectively warmed, thereby providing an excellent warm-feeling with a relatively reduced amount of power consumed. Particularly, according to the fifth feature, the amount of power consumed can be relatively reduced while warming the entire grip by the heat generating element dispersed over the entire periphery of the grip, thereby providing an excellent warm-feeling. In addition, the inner end portion of the grip body is a portion relatively strongly touched by a hand when grasping the grip. By the fact that the density of heat generating element dispersed at such portion is larger than that at the outer end portion, or the heat generating element is disposed only at the inner end portion according to the sixth or eighth feature, a hand can be effectively warmed, thereby providing an excellent warm-feeling with a relatively reduced amount of power consumed. Particularly, according to the sixth feature, the amount of power consumed can be relatively reduced while warming the entire grip by the heat generating element dispersed over the entire periphery of the grip, thereby providing an excellent warm-feeling.

It is a fourth object of the present invention to provide a control device for a heater installed in a grip for a vehicle, wherein a battery can be efficiently utilized.

To achieve the fourth object, according to a ninth aspect and feature of the present invention, there is provided a control device for a heater installed in a grip for a vehicle for controlling a power supplied from a battery to a heater installed in a grip mounted on a steering handlebar, the control device comprising a periodic voltage generating means for generating a periodic voltage whose value is periodically varied, a comparative voltage outputting means for outputting a predetermined comparative voltage depending upon a temperature regulating operation for the heater, a rectangular-wave signal outputting means for outputting a rectangular-wave signal having a duty ratio depending upon the temperature regulating operation by comparing the periodic voltage outputted from the periodic voltage generating means with the comparative voltage outputted from the comparative voltage outputting means, and a switching means for ON/OFF-controlling the power supplied from the battery to the heater in response to the rectangular-wave signal outputted from the rectangular-wave signal outputting means.

With the ninth feature, there is no wasteful consumption of the power at the variable resistor, as compared with the conventional device in which the resistance value of the variable resistor connected in series to the heater is varied. Therefore, the battery can be efficiently utilized.

It is a fifth object of the present invention to provide a control device for a heater installed in a grip for a vehicle, wherein the running-out of the battery can be reliably prevented, and the grip can be stably warmed, thereby providing a good warm-feeling.

To achieve the fifth object, according to a tenth aspect and feature of the present invention, there is provided a control device for a heater installed in a grip for a vehicle, comprising a switching means for ON/OFF-controlling a power supplied from a battery to a heater installed in a grip mounted on a steering handlebar, and a driving-signal outputting means for outputting a driving signal for turning the switching means ON, wherein the control device further includes a power source voltage monitoring means which is adapted to provide a state to prohibit the outputting of the driving signal from the driving-signal outputting means when a voltage corresponding to a power source voltage outputted from the battery is smaller than a first voltage threshold value, and to provide a state to permit the outputting of the driving signal from the driving-signal outputting means when the voltage corresponding to the power source voltage is equal to or larger than a second voltage threshold value set higher than the first voltage threshold value by a predetermined value or more, the first voltage threshold value being set as being $(V_M - \Delta V_1 + \Delta V_2)$, wherein $V_M$ represents a necessary minimum power source voltage required in the battery; $\Delta V_1$ represents a decrement of voltage dropped from the battery to the power source voltage monitoring means; and $\Delta V_2$ represents a maximum voltage detection error on the plus side presumed in the power source voltage monitoring means.

With the tenth feature, the voltage threshold value (the first voltage threshold value) serving to stop the supplying of the power to the heater is determined at an extremely small level in consideration of the decrement of voltage dropped from the battery to the power source voltage monitoring means and the voltage detection error presumed in the power source voltage monitoring means. Thus, even if the voltage threshold value becomes equal to or lower than the minimum power source voltage required in the battery, chances to be able to warm the grip by the heater can be increased to the utmost, while avoiding the supplying of the power to the heater. In addition, by permitting the supplying of the power from the battery to the heater at the second voltage threshold value higher than the first voltage threshold value by the predetermined value or more, the switching-ON and OFF of the supplying of the power to the heater can be prevented from being frequently repeated, thereby stably warming the grip.

Further, it is a sixth object of the present invention to provide an electrical connection structure for a heater unit for a grip in a vehicle, wherein the heater unit for the grip can be easily mounted to any type of vehicles to provide a general-purpose utilization of a connection, and the arising of problems in reliability and durability of the connection structure can be avoided in the general-purpose utilization of the connection.

To achieve the sixth object, according to an eleventh aspect and feature of the present invention, there is provided an electrical connection structure for a heater unit for a grip in a vehicle including a heater unit for a grip, which is comprised of a heater installed in a grip mounted on a steering handlebar, and a control device for controlling the supplying of a power from a power source mounted on a vehicle body frame to the heater, wherein plus-side and minus-side connecting wires led out of the heater unit for the grip are interruptively connected to a plus wire of one of first and second electric parts and to a minus wire of the other electric part at locations near the electric parts which are disposed on the steering handlebar or a member turned in unison with the steering handlebar and to which a power is supplied from said power source. According to a twelfth aspect and feature of the present invention, there is provided a vehicle including a heater unit for a grip, which is comprised of a heater installed in a grip mounted on a steering handlebar, and a control device for controlling the supplying of a power from a power source mounted on a vehicle body frame to the heater, and an earth wire connected to a grounding portion of a power source and coupled to the steering handlebar or a member which is turned in unison with the steering handlebar, wherein a first connecting wire led out of the heater unit for the grip is interruptively connected to between the power source and an electric part at a location near the electric part which is disposed on the steering handlebar or the member turned in unison with the steering handlebar and to which an electric power is supplied from the power source, and a second connecting wire led out of the heater unit for the grip is connected to the steering handlebar or the member turned in unison with the steering handlebar.

With the eleventh feature, by the fact that the plus-side and minus-side connecting wires are interruptively connected to the plus wire of one of the first and second electric parts and to the minus wire of the other electric part which are disposed on the steering handlebar or the member turned in unison with the steering handlebar, the connection of the heater unit for the grip to the power source is achieved. Thus, the general-purpose utilization of the connection to any type of various vehicles can be achieved, while avoiding the occurrence of the mis-operation of the electric parts even if the heater is operated. Moreover, by the fact that the electric parts are disposed on the steering handlebar or the member turned in unison with the steering handlebar, wiring portions connected to the electric parts are wired so that they are not twisted even due to the turning of the steering handlebar. Thus, the connection structure interruptively connected to such wiring portions in the vicinity of the steering handlebar offers no problem in durability and reliability thereof.

With the twelfth feature, the first connecting wire is interruptively connected between the power source and the electric part disposed on the steering handlebar or the member turned in unison with the steering handlebar, and the second connecting wire is connected to the steering handlebar or the member turned in unison with the steering handlebar to which the earth wire is connected. Therefore, the connection of the heater unit for the grip to the power source is achieved and thus, the general-purpose utilization of the connection to any type of various vehicles can be achieved, while avoiding the occurrence of the mis-operation of the electric parts even if the heater is operated. Moreover, since the electric part is disposed on the steering handlebar or the member operated in unison with the steering handlebar, wiring portions connected to the electric part are wired so that they are not twisted even due to the turning of the steering handlebar. Thus, the connection structure connected to such wiring portions in the vicinity of the steering handlebar offers no problem in durability and reliability thereof. In addition, the second connecting wire connected to the steering handlebar or the member turned in unison with the steering handlebar to which the earth wire is connected, cannot also be twisted even due to the turning of the steering handlebar.

BRIEF DESCRIPTION OF THE DRAWING

FIGS. 1 to 21 illustrate a first embodiment, wherein

FIG. 1 is a perspective view of a front portion of a motorcycle;

FIG. 2 is a perspective view of a left grip as viewed from the front thereof;

FIG. 3 is a partially-omitted perspective view of the left grip in a state in which it has been turned through 90 degree from a state shown in FIG. 2;

FIG. 4 is a longitudinal sectional view of the left grip with a steering handlebar omitted;

FIG. 5 is a sectional view taken along a line 5—5 in FIG. 4;

FIG. 6 is a sectional view taken along a line 6—6 in FIG. 4.

FIG. 7 is an exploded perspective view of an inner piece assembly and a heater;

FIG. 8 is a partially-omitted perspective view of the left grip as viewed from the rear thereof;

FIG. 9 is a front view of the inner piece assembly;

FIG. 10 is an illustration for explaining the flow of a molten resin in forming a second inner piece;

FIG. 11 is an illustration for explaining a step of forming a grip body;

FIG. 12 is an enlarged perspective view of a feeder cord;

FIG. 13 is a sectional view similar to FIG. 5, but showing a right grip;

FIG. 14 is a partially enlarged view of a portion of FIG. 13;

FIG. 15 is an electric circuit diagram showing the arrangement of a heater unit for a grip;

FIG. 16 is a diagram showing the timing for outputting a periodic voltage and a driving signal;

FIG. 17 is a diagram showing the timing for outputting a proportional voltage and the driving signal;

FIG. 18 is a front view of a control box;

FIG. 19 is a sectional view taken along a line 19—19 in FIG. 18;

FIG. 20 is a circuit diagram showing a structure of connection between a heater unit for a grip and a stop switch as well as left and right front winkers;

FIG. 21 is a perspective view showing a wiring state around a front fork;

FIGS. 23 to 30 illustrate a third embodiment, wherein FIG. 23 is a perspective view of a left grip as viewed from the front thereof;

FIG. 24 is a sectional view of the left grip grasped by a left hand, taken along a line 24—24 in FIG. 23;

FIG. 25 is a sectional view taken along a line 25—25 in FIG. 23;

FIG. 26 is a longitudinal sectional side view of the left grip, with only a grip body being omitted, taken along a line 26—26 in FIG. 25;

FIG. 27 is a sectional view taken along a line 27—27 in FIG. 25;

FIG. 28 is an exploded perspective view of an inner piece assembly;

FIG. 29 is a plan view of a heater with an overlying film being omitted;

FIG. 30 is a sectional view similar to FIG. 24, but showing a right grip grasped by a right hand;

FIGS. 34 to 36 illustrate a sixth embodiment, wherein FIG. 34 is a plan view of a right grip in a buggy vehicle;

FIG. 35 is a sectional view taken along a line 35—35 in FIG. 34;

FIG. 36 is a plan view similar to FIG. 34, but with the grip being removed from a steering handlebar;

BEST MODE FOR CARRYING OUT THE INVENTION

Figure 1:
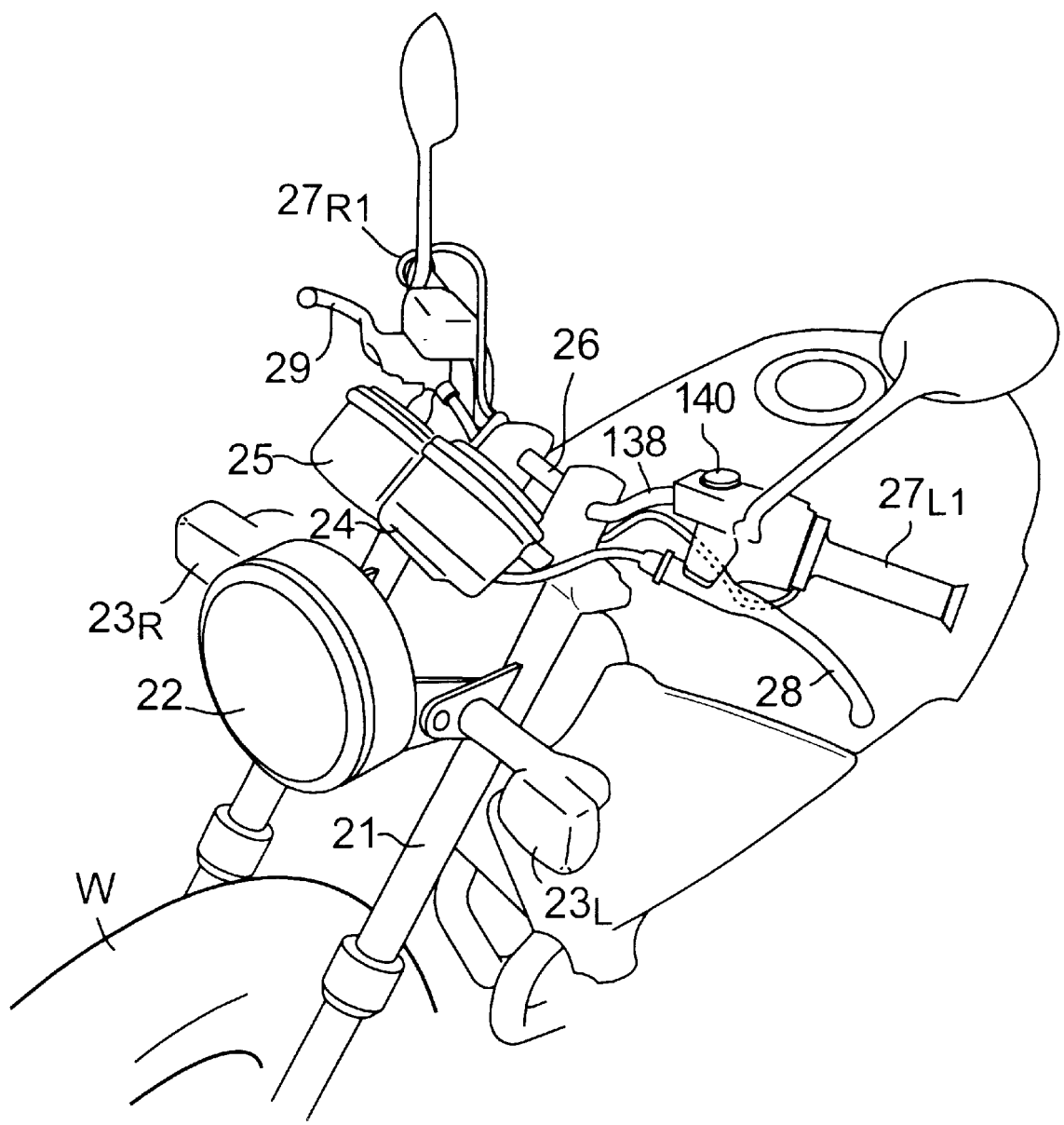

A first embodiment of the present invention will now be described with reference to FIGS. 1 to 21. Referring first to FIG. 1, a front fork 21 for suspending the front wheel W is rotatably carried at a front end of a vehicle body frame of a motorcycle. A head lamp 22 and left and right front winker lamps $23_L$ and $23_R$ are mounted at a longitudinally intermediate portion of the front fork 21, and a speedometer 24 and a tachometer 25 are mounted at an upper end of the front fork 21.

A laterally extending pipe-shaped steering handlebar 26 is mounted at the upper end of the front fork 21 to steer the front wheel W. A left grip $27_{L1}$ and a clutch lever 28 operated by a left hand grasping the left grip $27_{L1}$ are disposed at a left end of the steering handlebar 26, and a right grip $27_{R1}$ and a brake lever 29 operated by a right hand grasping the right grip $27_{R1}$ are disposed at a right end of the steering handlebar 26.

Referring to FIGS. 2 to 9, the left grip $27_{L1}$ is formed into a cylindrical shape, so that the steering handlebar 26 in the motorcycle is press-fitted into the left grip $27_{L1}$ to fix the left grip $27_{L1}$ at the left end of the steering handlebar 26. The left grip $27_{L1}$ has an outward protruding flange portion 32 provided at an inner end in a widthwise direction of the motorcycle, i.e., at an inner end thereof. An opening at an outer end of the left grip $27_{L1}$ is occluded by a cap (not shown) detachably mounted therein.

The left grip $27_{L1}$ is comprised of an inner piece assembly 33 formed cylindrically and a sheet-shaped heater $34_L$ wound around the substantially entire periphery of an outer surface of the inner piece assembly 33, the assembly 33 and the heater $34_L$ being integrally embedded into a grip body 35 made of a rubber.

The inner piece assembly 33 is formed into a cylindrical shape with first and second inner pieces $33_1$ and $33_2$ abutted against each other. Each of the inner pieces $33_1$ and $33_2$ is formed, for example, by an injection molding from a synthetic resin, and i t is desirable that each of the inner pieces $33_1$ and $33_2$ is formed from a glass fiber-incorporated polybutylene terephthalate resin, a glass fiber-incorporated polyphenylene sulfide resin or the like, because each of these resins has an excellent heat resistance and also has a high strength due to a glass fiber dispersed therein.

Figure 10:
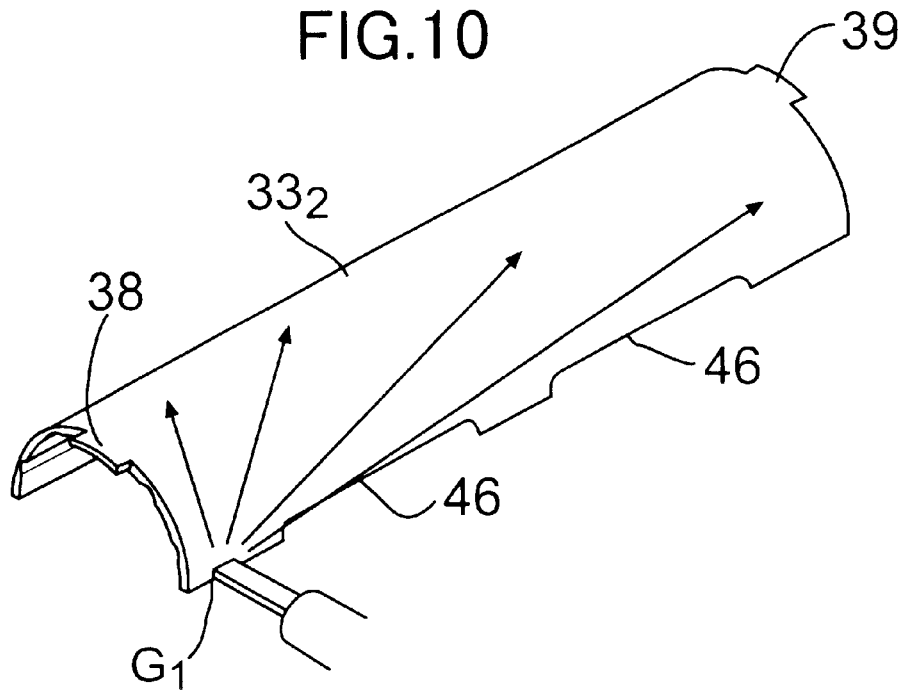

Each of the inner pieces $33_1$ and $33_2$ is formed by the injection molding. In forming the second inner piece $33_2$ in the injection molding, a molten resin is injected into a metal mold in such a manner that a gate $G_1$ is located on an outer peripheral surface of the second inner piece $33_2$ in the vicinity of one corner thereof, as shown in FIG. 10. Thus, the flows of the molten resin and the glass fiber are turned in a lengthwise direction (an axial direction) of the second inner piece $33_2$, and as a result, the formed second inner piece $33_2$ has an increased strength. The first inner piece $33_1$ is also formed by the injection molding, as is the second inner piece $33_2$, whereby the first inner piece $33_1$ has an increased strength.

The first inner piece $33_1$ is form ed semi-cylindrically so as to basically have a substantially semi-circular shape in cross section, so that when the first inner piece $33_1$ has been mounted in the steering handlebar 26, an annular portion 36 located at axially one end inner in the widthwise direction of the motorcycle, i.e., at an inner end thereof and an annular portion 37 located at the axially other end outer in the widthwise direction, i.e., at an outer end thereof are opposed to each other at lengthwise opposite ends of the first inner piece $33_1$. The second inner piece $33_2$ is formed semi-cylindrically so as to have a substantially semi-circular shape in cross section, so that its circumferentially opposite ends are abutted against circumferentially opposite ends of the first inner piece $33_1$ between both the annular portions 36 and 37.

Moreover, the second inner piece $33_2$ is provided, at circumferentially central portions at its lengthwise opposite ends, with engage projections 38 and 39 which protrude on opposite sides in the lengthwise direction of the second inner piece $33_2$. The inner pieces $33_1$ and $33_2$ are abutted against each other in such a manner that the engage projections 38 and 39 are brought into engage recess 40 and 41 defined in the annular portions 36 and 37 of the first inner piece $33_1$, whereby both the inner pieces $33_1$ and $33_2$ are integrally assembled as the cylindrical inner piece assembly 33. Thus, the inner piece assembly 33 comprised of the inner pieces $33_1$ and $33_2$ has an increased assembly rigidity, and a disadvantage that the grip body 35 made of the rubber is deformed due to the shrinkage of the rubber layer after being removed from the metal mold, cannot be produced.

Figure 11:
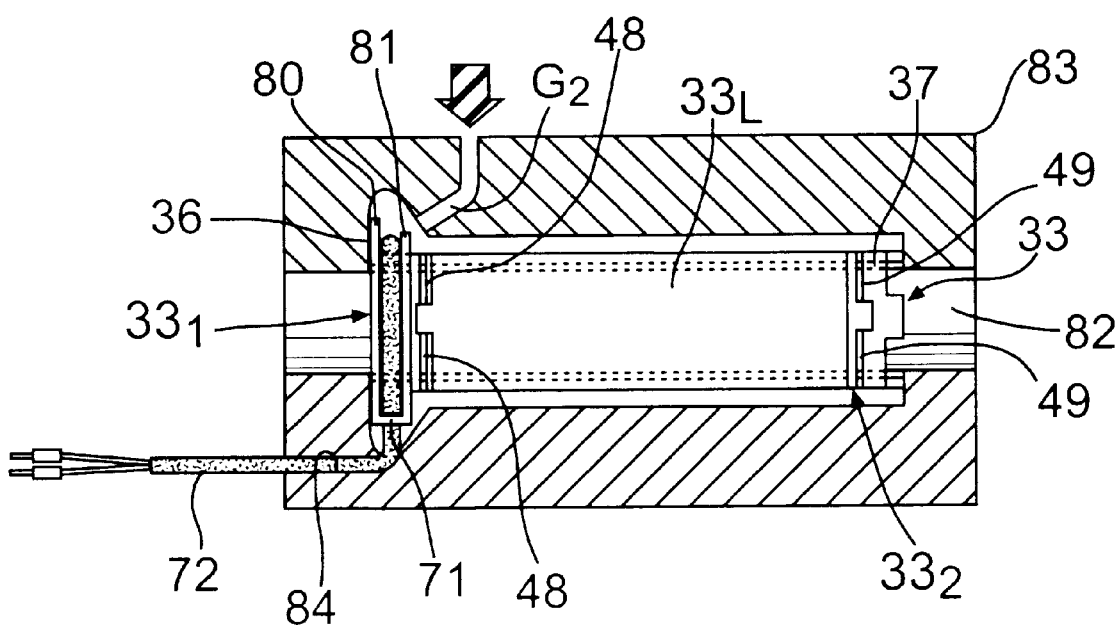

More specifically, in forming the grip body 35, as shown in FIG. 11, a primer and an adhesive are applied to inner and outer peripheral surfaces of the cylindrical inner piece assembly 33 comprised of the inner pieces $33_1$ and $33_2$, and the primer and the adhesive are also applied to opposite surfaces of the heater $34_L$. The inner piece assembly 33 with the heater $34_L$ and a crude rubber sheet (not shown) covering the heater $34_L$ being wound therearound is assembled to a core die 82 and accommodated between an upper die (not shown) and a lower die 83. In this case, a cord 72 extends from the inner piece assembly 33, and each of the upper die and the lower die 83 is provided with an insertion bore 84 for drawing out the cord 72 to the outside.

Then, in a state in which the upper die and the lower die 83 have been brought into close contact with each other and thus clamped, a molten rubber is poured and filled through a gate $G_2$ into the upper die and the lower die 83 heated up to a melting temperature of the rubber. During this time, the molten rubber from the gate $G_2$ pushes the annular portion 36 of the inner piece assembly 33 against the upper die and the lower die 83. Therefore, the position of the inner piece assembly 33 within the upper die and the lower die 83 is stabilized, whereby the filling of the molten rubber can be performed smoothly. At a time point when the rubber has been vulcanized after a lapse of a predetermined time from the filling of the molten rubber, the upper die and the lower die 83 are opened, and the formed grip body 35 is removed and cooled. The flange portion 32 is also formed as a portion of the grip body 35 made of the rubber.

In the cooling course during such formation of the grip body 35, the shrinking force produced in the rubber layer of the grip body 35 acts in the circumferential and axial directions of the inner pieces $33_1$ and $33_2$. However, since the annular portions 36 and 37 are provided at the axially opposite ends of the first inner piece $33_1$, a circumferentially compressing force and an axially compressing force produced in the rubber layer existing between both the annular portions 36 and 37 are received by the annular portions 36 and 37 and hence, the circumferentially opposite ends of the first inner piece $33_1$ are difficult to deform. In addition, the second inner piece $33_2$ is disposed between both the annular portions 36 and 37, and the cylindrical inner piece assembly 33 is comprised of the inner pieces $33_1$ and $33_2$. Therefore, the circumferentially and axially compressing forces produced in the rubber layer existing between both the annular portions 36 and 37 (the rubber layer extending along the second inner piece $33_2$) are all received by the second inner piece $33_2$ and the annular portions 36 and 37 and hence, the circumferentially opposite ends of the inner pieces $33_1$ and $33_2$ are not deformed at all.

The wall thickness of the circumferentially opposite ends of the inner pieces $33_1$ and $33_2$ is smaller than that of the circumferentially central portion. Thus, when the steering handlebar 26 is press-fitted into the left grip $27_{L1}$, the left grip $27_{L1}$ is easily elastically deformed according to the contour of the steering handlebar 26 to facilitate the press-fitting of the steering handlebar 26 into the left grip $27_{L1}$ and to ensure the strength against the clamping of the dies in the step of forming the grip body 35.

Specifically, by the fact that the circumferentially opposite ends of the inner pieces $33_1$ and $33_2$ are formed at a smaller thickness, they are easy to flex, resulting in a relatively increased flexibility of the grip body 35. Therefore, when the steering handlebar 26 is press-fitted into the left grip $27_{L1}$, the grip body 35 is elastically deformed, while following the press-fitting of the steering handlebar 26, and thus, the steering handlebar 26 can be smoothly press-fitted into the left grip $27_{L1}$. In this case, the steering handlebar 26 is guided on the annular portion 36 existing at one end of the inner piece assembly 33 and having a relatively high rigidity and on the annular portion 37 existing at the other end of the inner piece assembly 33 and having a relatively high rigidity, leading to a further improved assemblability of the left grip $27_{L1}$ to the steering handlebar 26.

At the clamping, a substantially vertical force acts on the circumferentially central portions of the inner pieces $33_1$ and $33_2$. However, the inner pieces $33_1$ and $33_2$ are prevented from being cracked or deformed, because the circumferentially central portions of the inner pieces $33_1$ and $33_2$ are formed at the larger wall thickness.

Further, when a driver grasps the left grip $27_{L1}$ to drive the motorcycle, a grasping force provided by the palm of a hand of the driver acts on the inner pieces $33_1$ and $33_2$, and places on which the grasping force acts largest are portions corresponding to the circumferentially central portions of the inner pieces $33_1$ and $33_2$. However, because the inner pieces $33_1$ and $33_2$ are formed at the larger wall thickness at such portions, the grip body 35, i.e., the left grip $27_{L1}$ cannot be deformed by the grasping force of the driver.

Moreover, because the annular portions 36 and 37 are provided at the axially opposite ends of the first inner piece $33_1$ and the cylindrical inner piece assembly 33 is comprised of the second inner piece $33_2$ and the first inner piece $33_1$ disposed between both the annular portions 36 and 37, as described above, it is sufficiently possible to oppose the circumferentially compressing force of the inner pieces $33_1$ and $33_2$. Therefore, even if the circumferentially opposite ends of the inner pieces $33_1$ and $33_2$ are formed at a smaller wall thickness, the inner piece assembly 33 cannot be deformed in the cooling course in the formation of the grip body 35. Additionally, the inner surfaces of the annular portions 36 and 37 are formed into such shapes that they are connected flush with the inner surface of the first inner piece $33_1$ and hence, the shapes of the inner surfaces of the annular portions 36 and 37 are not really circular, but the shapes of the outer surfaces of the annular portions 36 and 37 are formed into a really circular shape. Therefore, the annular portions 36 and 37 have an increased strength, namely, the inner piece assembly 33 has an increased strength.

A plurality of stripe-shaped support projections $42a_1$ and $42a_2$ are provided on the inner surfaces of the inner pieces $33_1$ and $33_2$, i.e., on the inner surface of the inner piece assembly 33 at distances in the circumferential direction of the inner piece assembly 33. These support projections $42a_1$ and $42a_2$ extend in the lengthwise direction of the inner piece assembly 33 and are integrally connected to the grip body 35 made of the rubber. The support projections $42a_1$ and $42a_2$ resiliently bear on the outer surface of the steering handlebar 26 press-fitted into the left grip $27_{L1}$.

The inner surfaces of the inner pieces $33_1$ and $33_2$ are provided with a plurality of shallow grooves 43 extending in the lengthwise direction of the inner pieces $33_1$ and $33_2$, and a plurality of shallow grooves 44 extending in the circumferential direction of the inner pieces $33_1$ and $33_2$ to interconnect the grooves 43. The grooves 43 and 44 are provided in a lattice-shaped fashion. The support projections $42a_1$ and $42a_2$ are formed to fill the grooves 43, and the grooves 43 are formed into an arcuate shape in cross section. Therefore, the resistance to the flowing of the molten rubber within the dies can be suppressed to a smaller level, thereby enabling a smooth filling of the molten rubber. The grooves 44 are also filled with the rubber layers 42b, but the rubber layers 42b are flush with the inner surface of the inner piece assembly 33.

By the fact that the shallow grooves 43 and 44 are provided in the lattice-shaped fashion in the inner surfaces of the inner pieces $33_1$ and $33_2$ in the above manner, the flexibility of the inner pieces $33_1$ and $33_2$ can be further enhanced. Namely, the flexibility of the grip body 35 is further enhanced by the formation of the lattice-shaped grooves 43 and 44 more than only by the circumferential regulation of the wall thickness of the inner pieces $33_1$ and $33_2$, thereby further facilitating the press-fitting of the steering handlebar 26 into the left grip $27_{L1}$.

If each of the grooves 43 and 44 has a rectangular section, the following problems are arisen: the bottom of each of the grooves 43 and 44 is easily deformed, and each of the grooves has a poor rigidity. However, by the fact that the cross-sectional shape of each of the grooves 43 and 44 is arcuate, the rigidity of the bottom of each of the grooves 43 and 44 is increased, and the rigidity and strength of the inner pieces $33_1$ and $33_2$ and thus of the inner piece assembly 33 are increased and hence, when the dies are clamped for the formation of the grip body 35, there is no possibility that the inner pieces $33_1$ and $33_2$ are deformed.

Moreover, those portions of the inner pieces $33_1$ and $33_2$ which are surrounded by the grooves 43 and 44 are formed into a rectangular shape longer in the axially direction than in the circumferential direction of the inner pieces $33_1$ and $33_2$, thereby providing a structure in which the inner pieces $33_1$ and $33_2$ are difficult to deform, during the formation of the grip body 35.

Further, the inner surface of the circumferentially central portion of each of the inner pieces $33_1$ and $33_2$ is of a structure with the axially extending projections 33a, 3a formed thereon, because the grooves 43, 43 are defined on the opposite sides. The rigidity and strength of the inner pieces $33_1$ and $33_2$ at their circumferentially central portions are increased even by the projections 33a, 33a.

Figure 5:
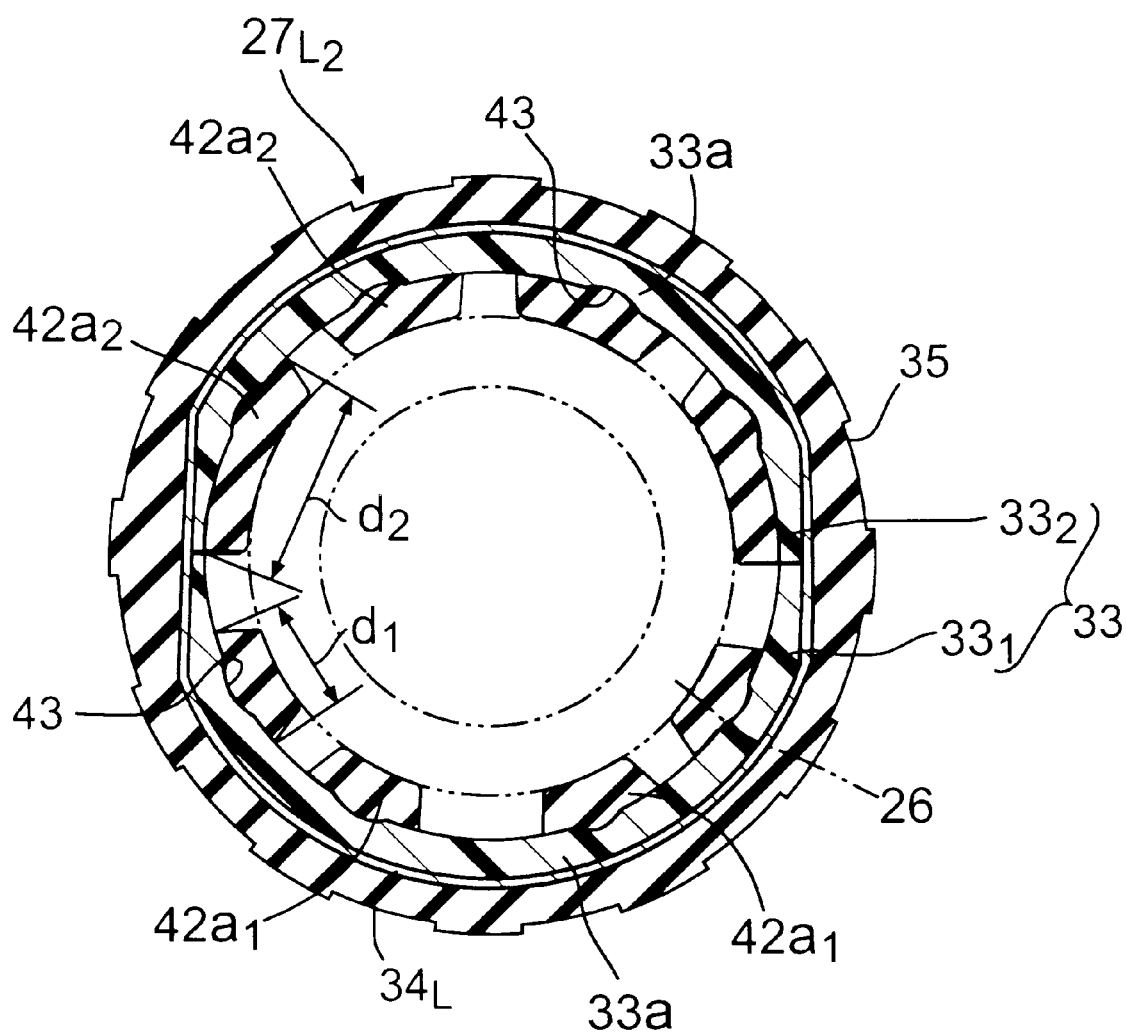
Figure 6:
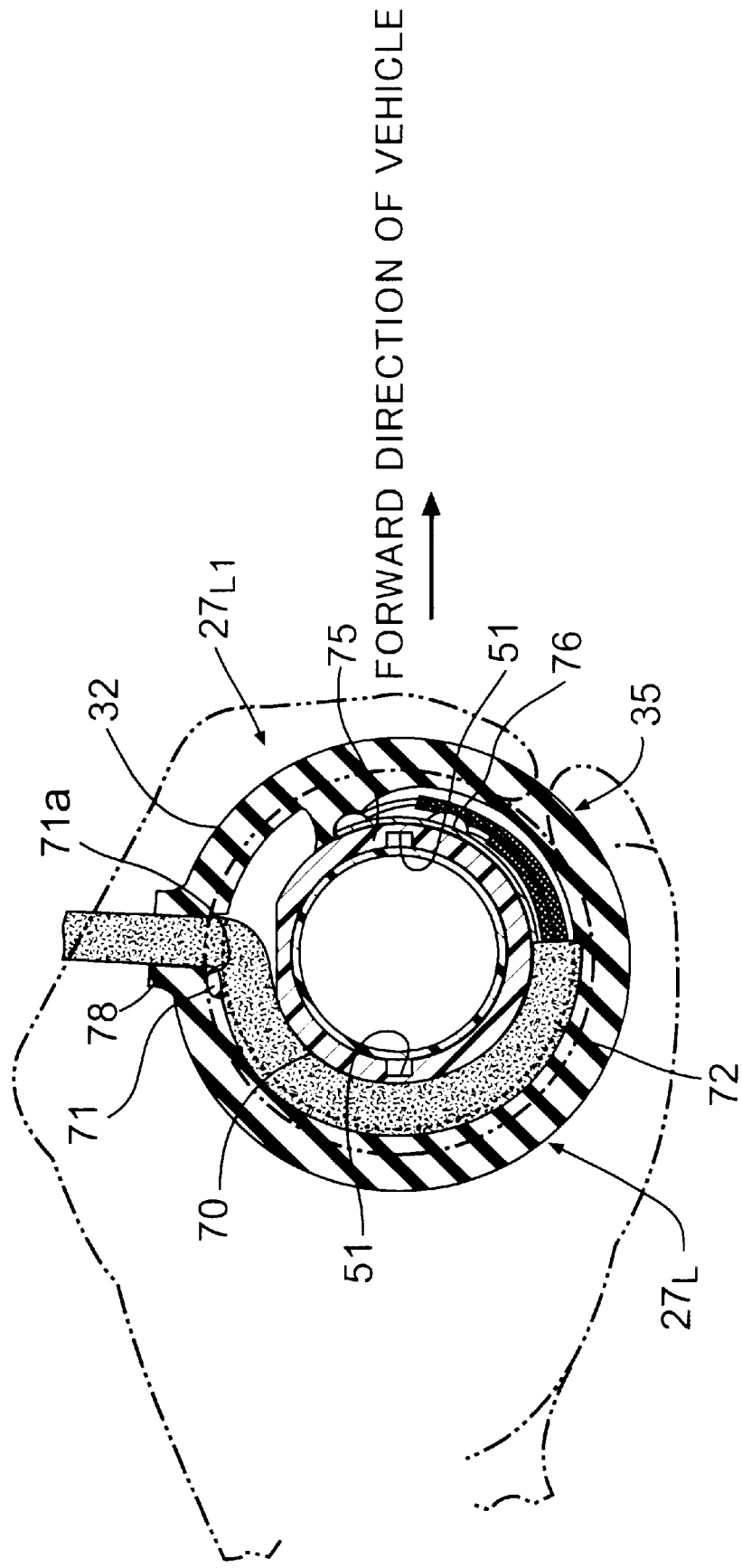

As best shown in FIG. 5, the support projections $42a_1$ are provided on the inner surface of the first inner piece $33_1$, while the support projections $42a_2$ are provided on the inner surface of the second inner piece $33_2$. The cross-sectional shape of each of the support projections $42a_1$ and $42a_2$ is trapezoidal, so that the contact area with the steering handlebar 26 is extremely small. Therefore, the amount of heat transmitted from the inner pieces $33_1$ and $33_2$ to the steering handlebar 26 can be extremely decreased, and the strength of adhesion between the inner pieces $33_1$ and $33_2$ and the support projections $42a_1$ and $42a_2$ can be extremely increased. Further, each of the support projections $42a_1$ and $42a_2$ is formed to have a larger width than the width of the grooves 43, leading to a structure in which the strength of adhesion between the inner pieces $33_1$ and $33_2$ and the support projections $42a_1$ and $42a_2$ is correspondingly increased.

The width $d_2$ of the support projections $42a_2$ of the second inner piece $33_2$ is formed larger than the width $d_1$ of the support projections $42a_1$ of the first inner piece $33_1$. Thus, the strength of adhesion between the left grip $27L_1$ and the steering handlebar 26 on the side of the second inner piece $33_2$ can be ensured, and the heat insulating property can be more enhanced on the side of the first inner piece $33_1$. Both of the heat insulating property and the adhesion strength are satisfied.

The area of contact between the steering handlebar 26 and the left grip $27L_1$ is smaller on the side of the first inner piece $33_1$ than on the side of the second inner piece $33_2$, because the width $d_2$ of the support projections $42a_2$ of the second inner piece $33_2$ is larger than the width $d_1$ of the support projections $42a_1$ of the first inner piece $33_1$. Namely, the area of an air heat-insulating layer formed between the steering handlebar 26 and the first inner piece $33_1$ is larger than that of an air heat-insulating layer formed between the steering and handlebar 26 and the second inner piece $33_2$, so that the first inner piece $33_1$ touched by fingertips when the grip body 35 has been grasped by a hand (in a state shown in FIG. 6) is warmed without escaping of the heat, more than the second inner piece $33_2$.

A pair of notches 45, 45 are provided at circumferentially opposite end edges of the first inner piece $33_1$ at a distance spaced apart from each other in the lengthwise direction of the first inner piece $33_1$, while notches 46, 46 are provided at circumferentially opposite end edges of the second inner piece $33_2$. The notches 46 define openings 47, 47 by cooperation with the notches 45, 45 of the first inner piece $33_1$. In the formation of the grip body 35, the molten rubber flows through the openings 47, 47 into the grooves 43 and 44 in the inner piece assembly 33 to form the support projections $42a_1$ and $42a_2$ and the rubber layers 42b integrally connected to the grip body 35. Moreover, the notches 45, 45 and 46, 46 are rectangular, but corners of the notches 45, 45 and 46, 46 are curved and thus, each of peripheral edges of the notches 45, 45 and 46, 46 has an increased strength.

Openings 48 and 49 are also defined between the longitudinally opposite ends of the second inner piece $33_2$ and the annular portions 36 and 37 of the first inner piece $33_1$, respectively. The molten rubber also flows through the openings 48 and 49 into the grooves 43 and 44 in the inner piece assembly 33, whereby the molten rubber can be promptly filled all inside and outside the inner piece assembly 33.

An inner surface of one 36 of the annular portions of the first inner piece $33_1$ is provided circumferentially at a distance spaced apart from each other with a plurality of positioning abutment projections 50 for abutment against an outer surface of the core die 82 and alignment of the axes upon mounting of the inner piece assembly to the core die 82, and positioning notches 51 for achieving the circumferential alignment within the forming mold by engagement with the core die 82.

Figure 2:
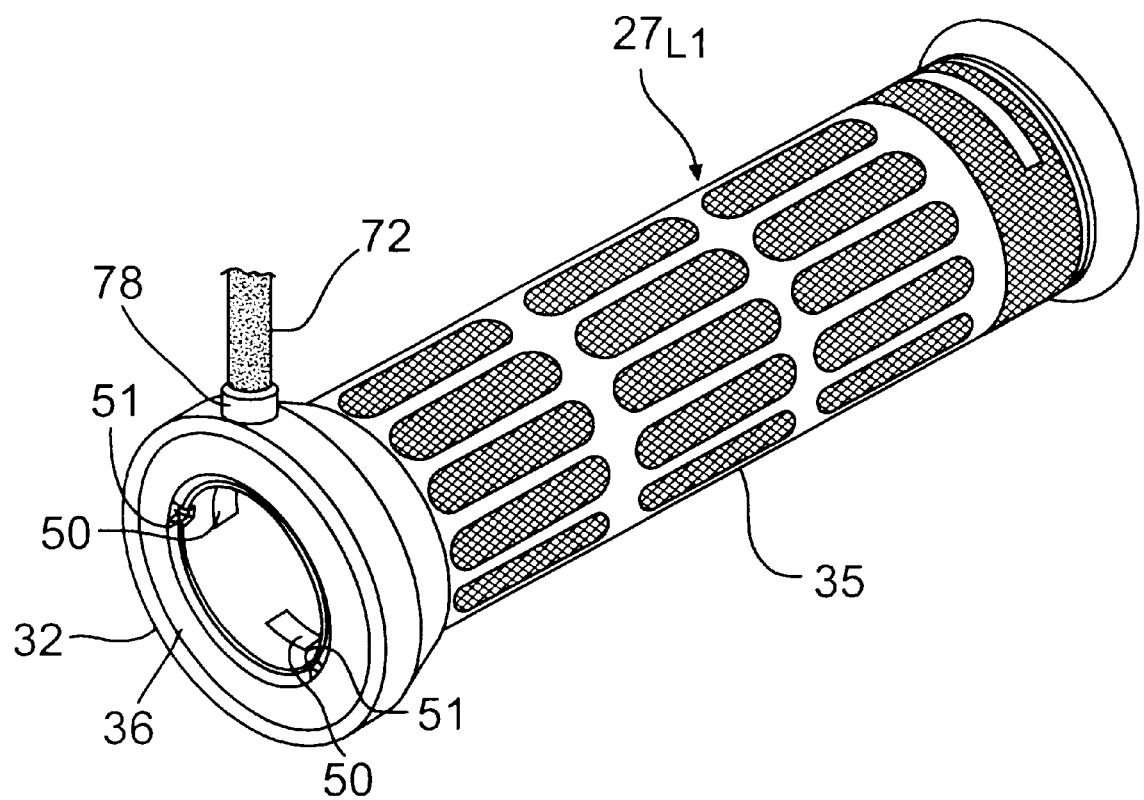
Figure 3:
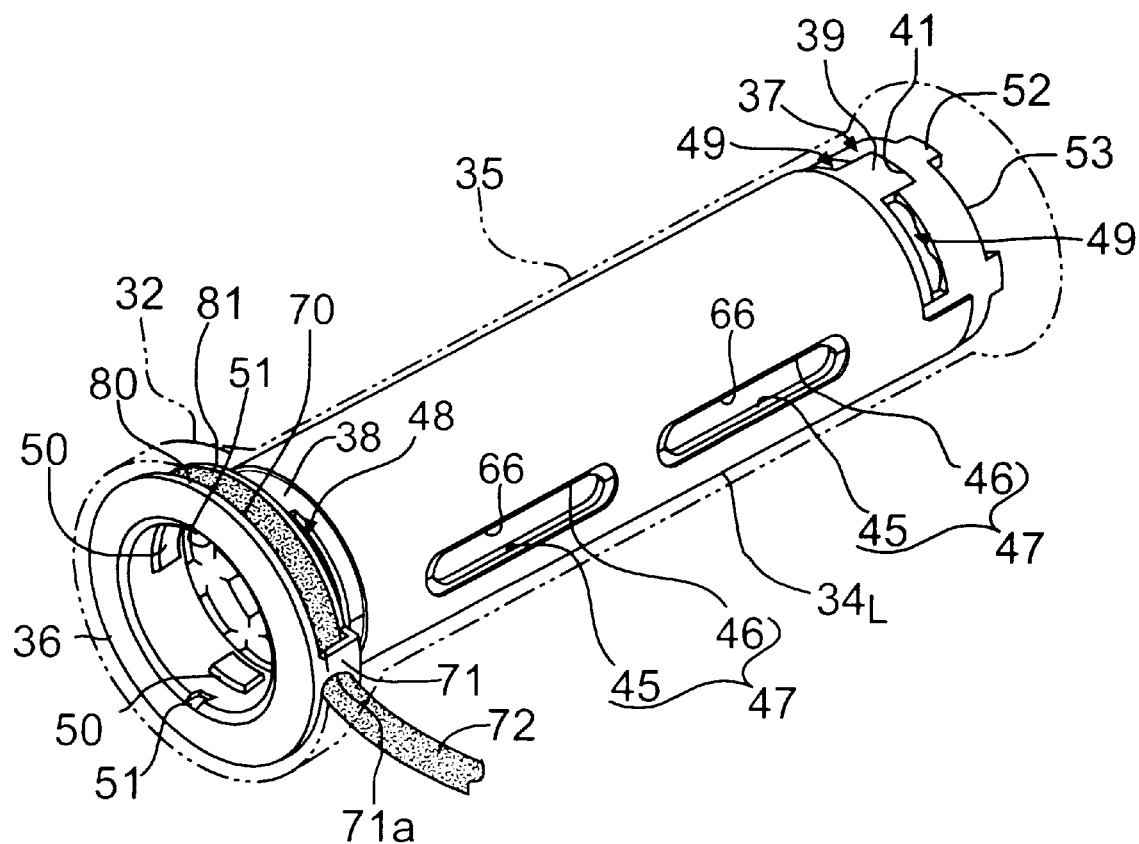
Figure 4:
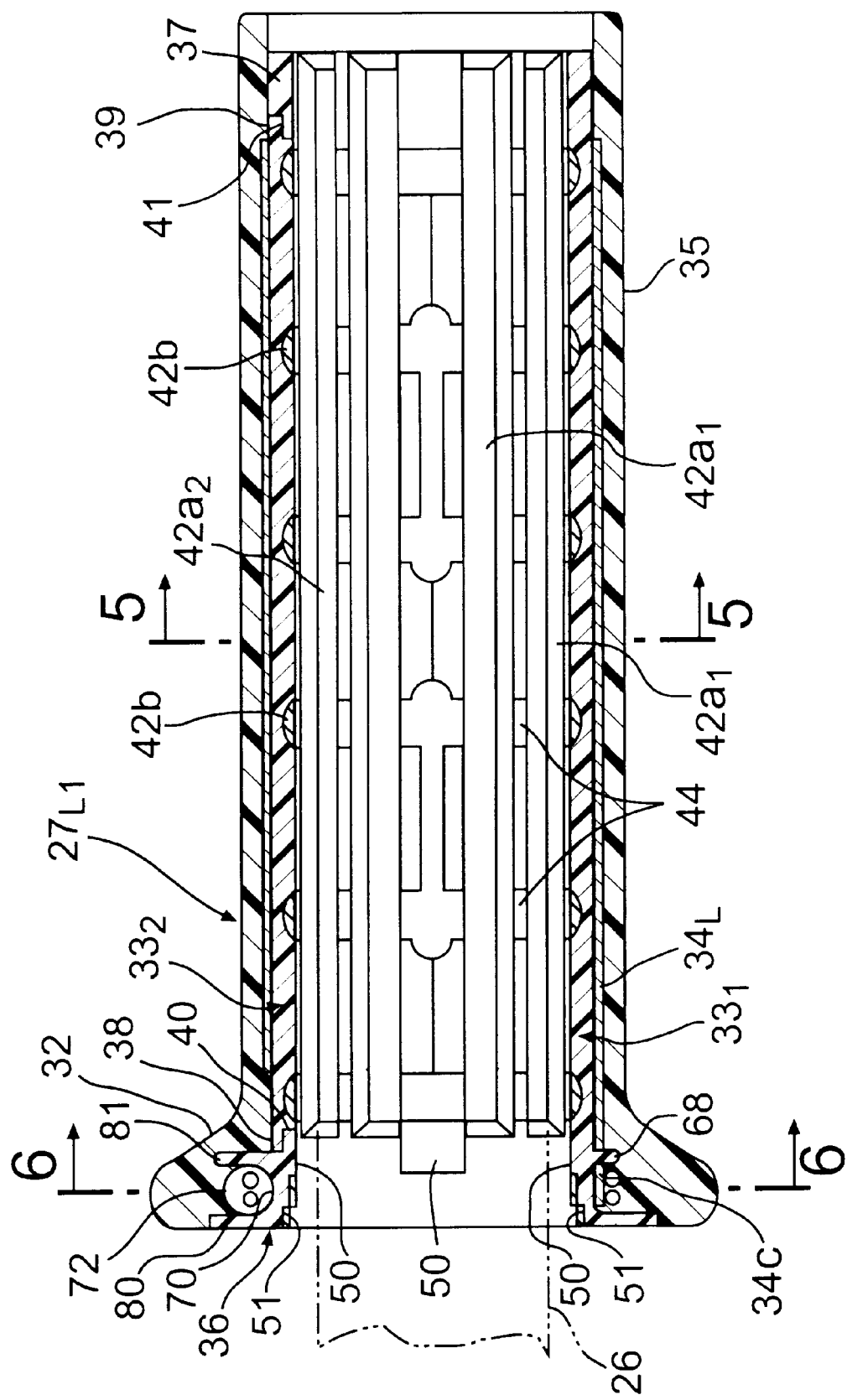

A rubber layer is formed in the inner surface of the annular portion 36 excluding the positioning notch 51 to extend to the entire periphery of the opened edge, as shown in FIGS. 2 and 4, thereby providing a structure in which the rubber layer formed on the inner surface of the inner piece assembly 33 is difficult to peel off, when the steering handlebar 26 is press-fitted into the left grip $27_{L1}$.

A plurality of positioning projections 52 are provided on the other annular portion 37 at locations circumferentially spaced apart from one another to define recesses 53 between the positioning projections 52, so that the axial positioning of the inner piece assembly 33 within the forming mold can be achieved by abutment of the projections 52 against the forming mold. Each of the recesses 53 functions as an opening for flowing of the molten rubber into the inner piece assembly 33.

By the fact that the positioning abutment projections 50 and the positioning notches 51 are provided on the inner surface of the annular portion 36 and the positioning projections 52 are provided on the annular portion 37 to define the recesses 53 each functions as the opening for flowing of the molten rubber into the inner piece assembly 33, as described above, the inner pieces $33_1$ and $33_2$ can be positioned correctly within the mold system including the core die 82, the upper die and the lower die 83, whereby the grip body 35 can be appropriately formed.

Figure 7:
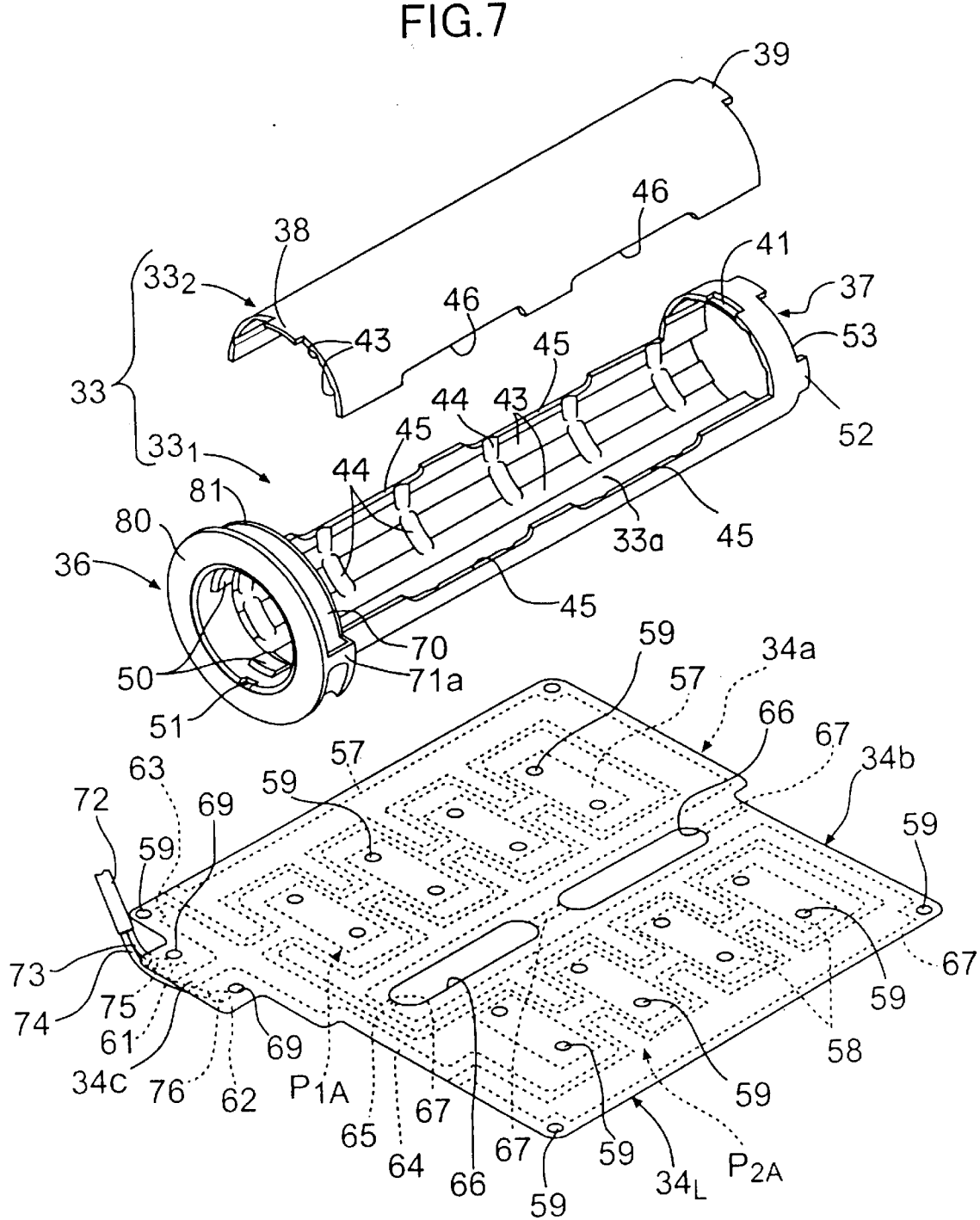
Figure 8:
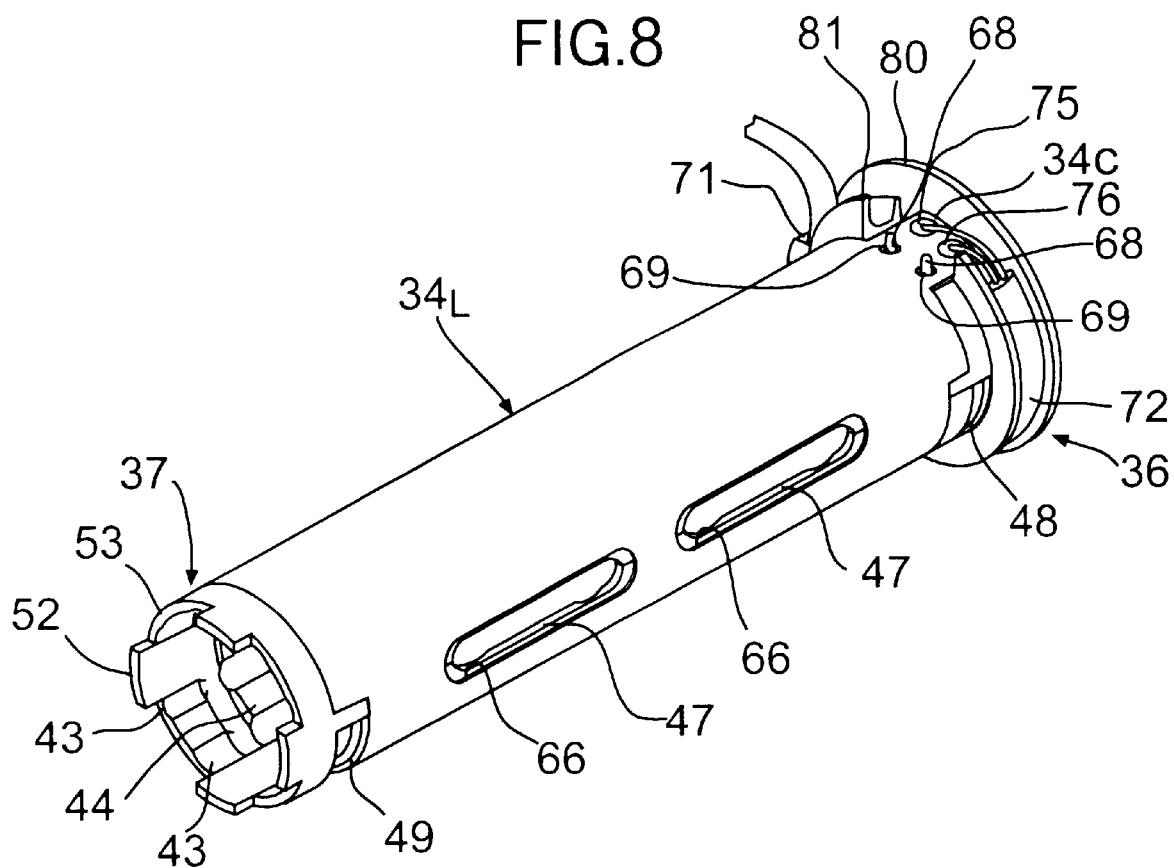
Figure 9:
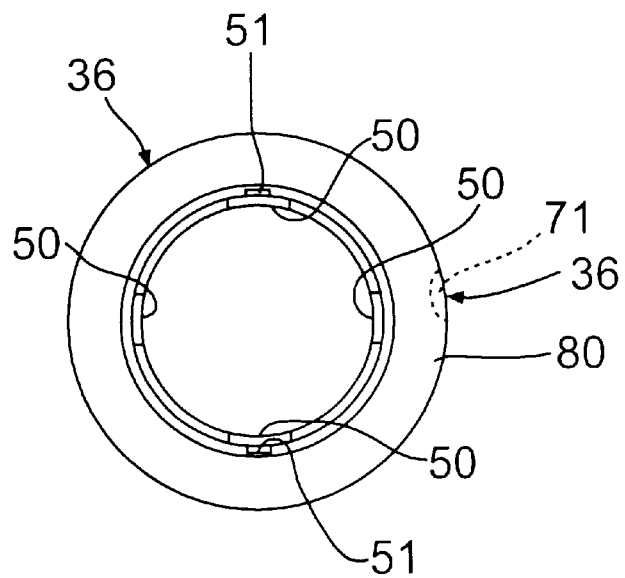

The heater $34_L$ is an FPC heater having a sectional structure with a copper foil strip pattern sandwiched between a base film and an overlying film. The heater $34_L$ is of a substantially rectangular shape, as shown in FIG. 7, when it is in a developed state.

The heater $34_L$ includes a first heater region 34a having a size corresponding to the first inner piece $33_1$, a second heater region 34b having a size corresponding to the second inner piece $33_2$, and a connecting region 34c extending from the first heater region 34a toward the annular portion 36 of the first inner piece $33_1$.

A pair of connecting lands 61 and 62 are formed in the connecting region 34c by exposure of a copper foil, and connecting wires 73 and 74 extending from the cord 72 are to the connecting lands 61 and 62 by soldering portions 75 and 76, respectively.

A first heater circuit pattern portion $P_{1A}$ is formed in the first heater region 34a and connected to the connecting land 61 by a connecting portion 63 disposed at a location near the connecting region 34c. A second heater circuit pattern portion $P_{2A}$ is formed in the second heater region 34b and connected to the connecting land 62 by a connection portion 64 disposed at a location near the connecting region 34c. Moreover, the strip pattern of each of the heater circuit pattern portions $P_{1A}$ and $P_{2A}$ is formed to extend mainly longer in the circumferential direction of the inner piece assembly 33, when the heater $34_L$ is wound around the inner piece assembly 33. Thus, when the heater $34_L$ is wound around the inner piece assembly 33, each of the heater circuit pattern portions $P_{1A}$ and $P_{2A}$ is difficult to wrinkle.

The first heater region 34a is formed sufficiently longer in the lengthwise direction of the heater $34_L$, so that all the fingers of a hand can be warmed. The second heater region 34b is formed shorter than the first heater region 34a, so that the openings 48 and 49 for flowing-in of the molten rubber cannot be occluded. When the heater $34_L$ has been positioned and wound around the inner piece assembly 33, the first heater region 34a is disposed in correspondence to the first inner piece $33_1$, and the second heater region 34b is disposed in correspondence to the second inner piece $33_2$.

The first and second heater circuit pattern portions $P_{1A}$ and $P_{2A}$ are connected to each other by a connecting portion 65 adjacent the connecting portion 64. Moreover, the connecting portions 64 and 65 are disposed at a location on the side of the axially inner end of the inner piece assembly 33 (at a location in the vicinity of the thumb when the left grip $27_{L1}$ has been grasped), which is a site most difficult to deform in the assembling of the left grip $27_{L1}$ to the steering handlebar 26, thereby providing a structure in which the connecting portions 64 and 65 are difficult to break by an external load. Namely, a larger load is applied to the axially outer end of the inner piece assembly 33 as a result of being pushed by the outer end of the steering handlebar 26 which is press-fitted, but a relatively small load is applied to the axially inner end of the inner piece assembly 33 and hence, there is correspondingly not a possibility of a breaking.

Pluralities of larger and smaller copper foil land portions 57 and 58 for reinforcing the heater $34_L$ are formed in the first and second heater regions 34a and 34b, respectively, and do not function as a heater circuit pattern. Bores 59 are defined at a plurality of points in each of the copper foil land portions 57 and 58, so that when the heater $34_L$ is wound around the inner piece assembly 33, the molten rubber is filled in the bores 59 to achieve the reliable adhesion of the heater $34_L$ to the inner piece assembly 33.

Elongated bores 66, 66 corresponding to the openings 47, 47 of the inner piece assembly 33 are defined in the heater 34 between the first and second heater regions 34a and 34b. The elongated bores 66, 66 are formed larger than the openings 47, 47, so that even if the relative positions of the inner piece assembly 33 and the heater $34_L$ are slightly misaligned from each other, the openings 47, 47 cannot be occluded by the heater $34_L$. Band-shaped copper foil-non-formed regions 67 are formed in the heater $34_L$ to connect the elongated bores 66, 66 to each other, and the flexibility of the heater $34_L$ is enhanced by the copper foil-non-formed regions 67.

A pair of flanges 80 and 81 are provided on the annular portion 36 of the first inner piece $33_1$ to define a mounting groove 70 therebetween. Moreover, the axially inner flange 81 is formed with a height and a thickness smaller than those of the axially outer flange 80, as shown in FIG. 4, into a structure in which when the inner piece assembly 33 has been embedded in the rubber layer of the grip body 35, the radially outer end of the flange 81 is difficult to protrude onto a slant surface of the flange portion 32.

A portion of the axially inner flange 81 is notched in correspondence to the circumferentially central portion of the first inner piece $33_1$, a pair of positioning pins 68, 68 are projectingly provided on the first inner piece $33_1$ in correspondence to such notches. On the other hand, the heater $34_L$ is wound around the outer periphery of the inner piece assembly 33 in such a manner that the connecting region 34c extends toward the annular portion 36 at the circumferentially central portion of the first inner piece $33_1$, and the heater $34_L$ is positioned relative to the inner piece assembly 33 by bringing the positioning pins 68 into engagement into the positioning bores 69, 69 provided in the connecting lands 61 and 62 of the heater $34_L$. The notches of the flange 81 and tip ends of the positioning pins 68 are rounded, so that the heater $34_L$ is not damaged when being wound around the inner piece assembly 33.

Moreover, in a state in which the heater $34_L$ has been wound around the inner piece assembly 33, the soldering portions 75 and 76 are in positions in which they are sandwiched between the axially outer flange 80 and the positioning pins 68, 68. Thus, it is avoided to the utmost that other members strike the soldering portions 75 and 76 to produce a connection failure. In addition, when the left grip $27_{L1}$ has been grasped by a hand, the soldering portions 75 and 76 are in positions in which a grasping force is difficult to act on them. Further, by the fact that the soldering portions 75 and 76 are disposed in a downward turned attitude between the upper die and the lower die 83 in forming the grip body 35 in the mold, the load acting on the soldering portions 75 and 76 by the clamping of the mold is also decreased.

A cord support portion 71 is provided with the annular portion 36 at circumferentially one end of the first inner piece $33_1$ and formed to traverse the mounting groove 70. The electrically feeding cord 72 is disposed in the mounting groove 70; wound around the annular portion 36; passed through the cord support portion 71 and led out to the outside. A cylindrical portion 78 for guiding and supporting the led-out portion of the cord 72 is projectingly provided on the flange portion 32 of the grip body 35. Thus, the cord 72 is folded back at the cord support portion 71 and led out to the outside, and an external force acting on the cord 72 is received by the cord support portion 71 and hence, the external force and load cannot be applied to the soldering portions 75 and 76.

A portion of the axially inner flange 81 has the same height in level as the axially outer flange 80, and the cord support portion 71 is bridged between those portions of the flanges 80 and 81 which have the same height. Moreover, a contact surface 71a of the cord support portion 71 with the cord 72 is formed into an arcuate shape in a direction substantially parallel to the axial direction of the inner piece assembly 33, so that the cord 72 can be led out from the cord support portion 71 in a direction substantially perpendicular to the axial direction of the inner piece assembly 33 without being tilting down and can be prevented to the utmost from being damaged at the folded-back portion thereof.

Figure 12:
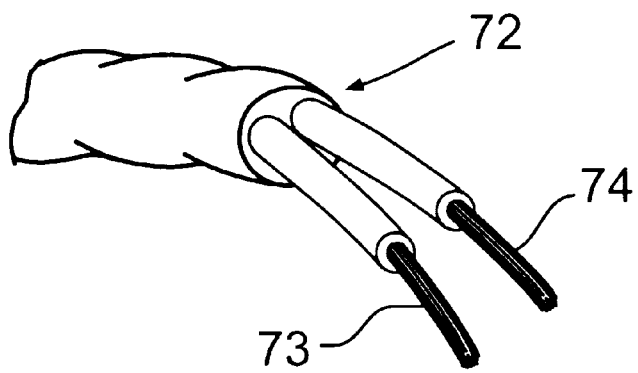

The cord 72 is a silicon-coated cord and is excellent in weatherability, heat resistance and flexibility, as compared with the conventional vinyl-coated cord. Further, the cord 72 is of a cabtyre cable structure, as shown in FIG. 12. If the cord is of the cabtyre cable structure in the formation of the grip body 35, there is a possibility that a soft silicon-coated portion of the cord may be compressed by a pressure of the molten rubber. However, the pressure acting on the cord 72 can be escaped by the fact that a portion of the molten rubber in the upper die and the lower die 83 flows out through a gap between the insertion bore 84 and the cord 72. Thus, during formation of the grip body 35, the cord 72 cannot be cut by the pressure of the rubber.

Figure 13:
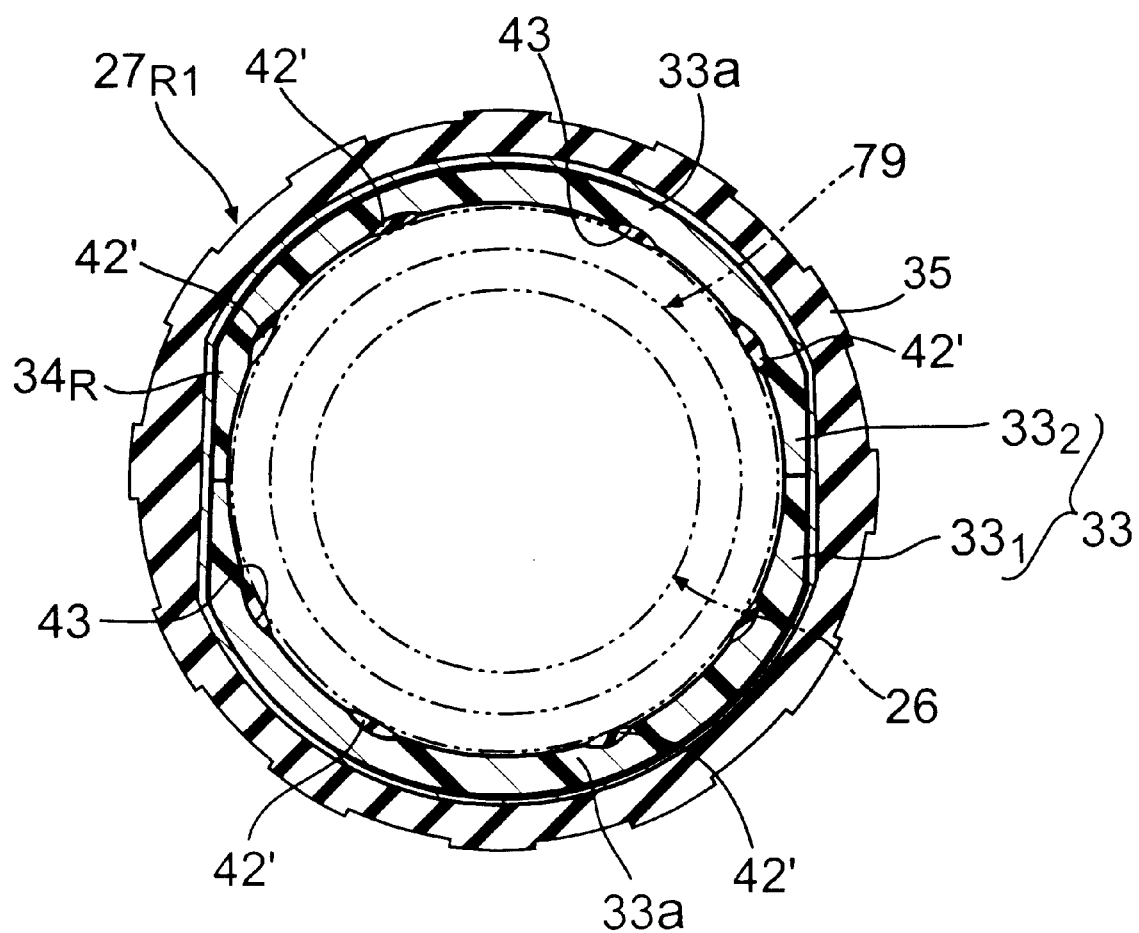
Figure 14:
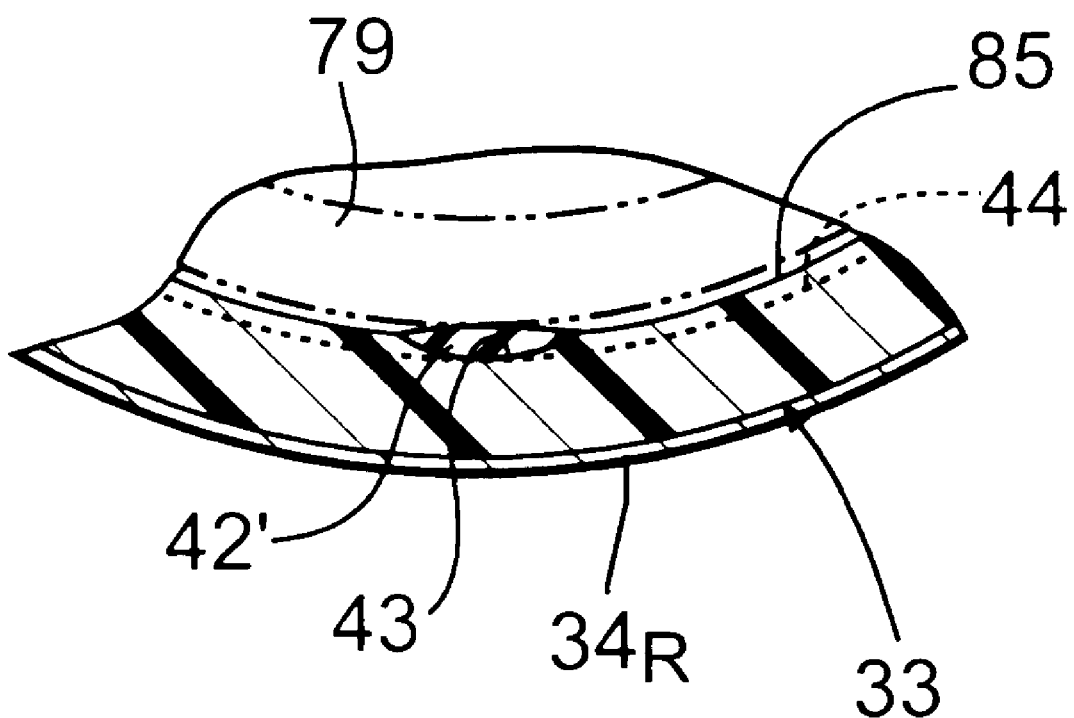

Referring to FIGS. 13 and 14, the right grip $27_{R1}$ is comprised of the inner piece assembly 33 formed cylindrically, and a sheet-shaped heater $34_R$ wound around the substantially entire periphery of the outer surface of the inner piece assembly 33, the inner piece assembly 33 and the sheet-shaped heater $34_R$ being integrally embedded in a grip body 35 made of a rubber. The right grip $27_{R1}$ is mounted on a throttle pipe 79 which is turnably mounted at the right end of the steering handlebar 26, and is formed with an inside diameter larger than that of the left grip $27_{L1}$ directly mounted on the steering handlebar 26.

More specifically, in place of the pluralities of support projections $42a_1$ and $42a_2$ provided on the inner periphery of the left grip $27_{L1}$, sliced flat support portions 42' are formed at a low height in the right grip $27_{R1}$. Thus, the support portions 42' are brought into contact with the throttle pipe 79, so that the strength of adhesion of the right grip $27_{R1}$ and the throttle pipe 79 is increased, and a wider heat-insulating air layer 85 is formed between the right grip $27_{R1}$ and the throttle pipe 79, thereby suppressing the transmission of a heat to the throttle pipe 79.

Another arrangement of the right grip $27_{R1}$ is similar to that of the left grip $27_{L1}$.

Figure 15:
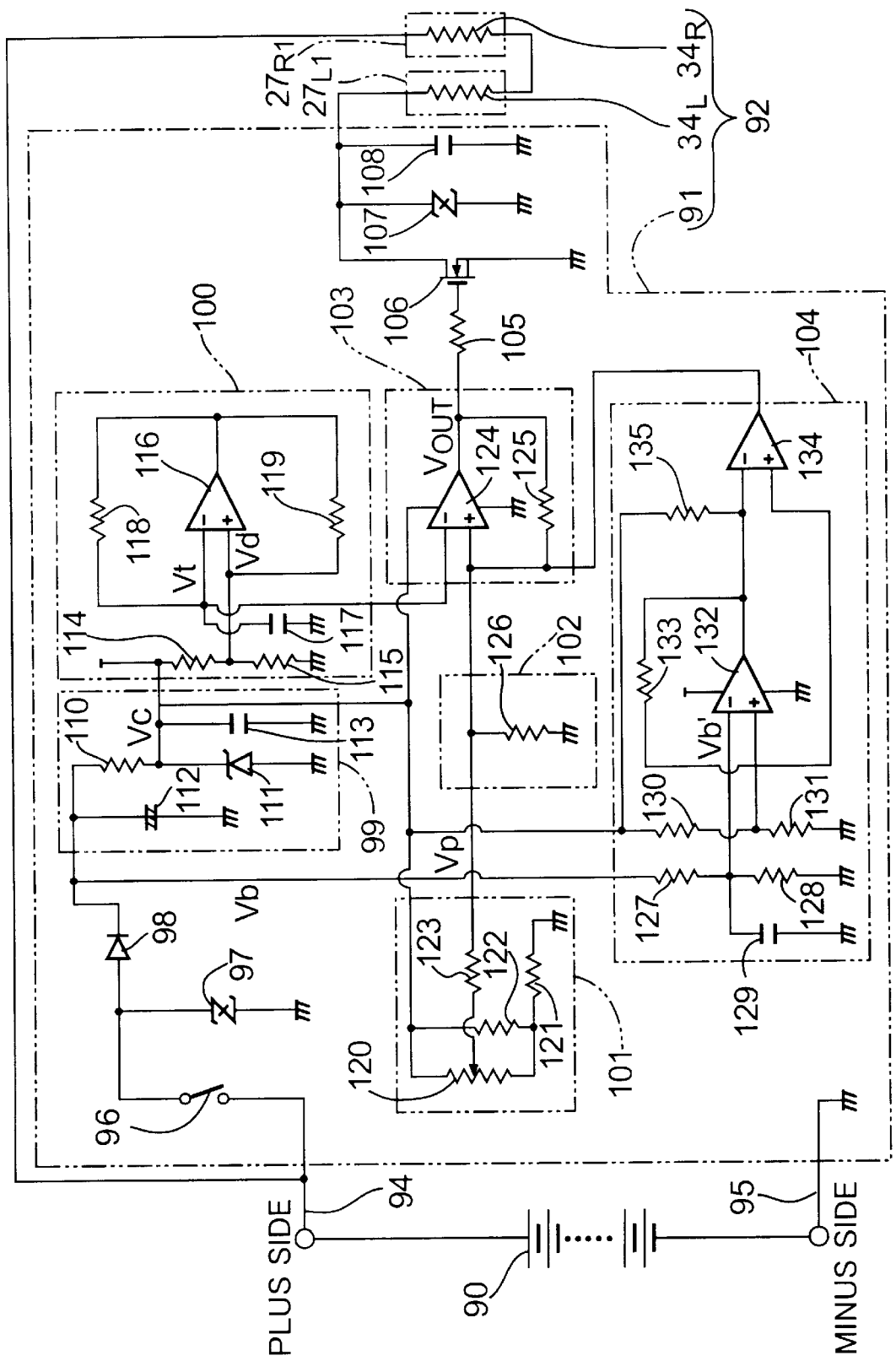

Referring to FIG. 15, a grip heater unit 92 is constituted by the heaters $34_L$ and $34_R$ installed in the left and right grips $27_{L1}$ and $27_{R1}$ and connected in series to each other, and a control device 91 for controlling the supplying of an electric power to the heaters $34_L$ and $34_R$.

Led out of the grip heater unit 92 are a plus-side connecting wire 94 connected to a plus side of a battery 90 serving as a power source mounted on the motorcycle, and a minus-side connecting wire 95 connected to (grounded to) a minus side of the battery 90. A serial circuit comprised of the heaters $34_L$ and $34_R$ is connected at one end thereof to the plus-side connecting wire 94 and at the other end thereof to the control device 91.

The control device 91 includes a switch 96 connected to the plus-side connecting wire 94, a surge absorber 97, a diode 98, a constant-voltage outputting means 99, a periodic voltage generating means 100, a proportional voltage outputting means 101, a fail-safe means 102, a driving-signal outputting means 103 as a rectangular-wave signal outputting means, a battery voltage monitoring means 104, a resistor 105, a field-effect transistor 106 as a switching means, a surge absorber 107, and a capacitor 108 for removing an electrostatic noise.

The surge absorber 97 and the diode 98 are connected to between the switch 96 and the constant-voltage outputting means 99. The field-effect transistor 106 is connected to the other end of the serial circuit comprised of the heaters $34_L$ and $34_R$ and connected at one end thereof to the plus-side connecting wire 94. The surge absorber 107 and the capacitor 108 are connected between the serial circuit and the field-effect transistor 106. Further, the resistor 105 is connected in series between the driving-signal outputting means 103 and a gate of the field-effect transistor 106.

The constant-voltage outputting means 99 is adapted to output a predetermined constant voltage Vc based on a voltage supplied from the battery 90 and inputted from the plus-side connecting wire 94 through the surge absorber 97 and the diode 98 upon turning-on of the switch 96. The constant-voltage outputting means 99 includes a resistor 110 and a Zener diode 111 which are connected in series between the diode 98 and a ground potential, a smoothing capacitor 112 connected to between the diode 98 and the resistor 110, and a smoothing capacitor 113 connected in parallel to the Zener diode 111.

The periodic voltage generating means 100 is adapted to output a triangular wave voltage Vt varied at a predetermined cycle based on the constant voltage Vc outputted from the constant-voltage outputting means 99. The periodic voltage generating means 100 includes resistors 114 and 115 connected to the constant-voltage outputting means 99, an operational amplifier 116 having a non-inverted input terminal connected to a point of connection between the resistors 114 and 115, a capacitor 117 provided between an inverted input terminal of the operational amplifier 116 and the ground potential, a resistor 118 provided between an output terminal and the inverted input terminal of the operational amplifier 116, and a chattering-preventing resistor 119 provided between the output terminal and the non-inverted input terminal of the operational amplifier 116. In the operational amplifier 116, a reference voltage Vd obtained from the division of a voltage at the resistors 114 and 115 is compared with a charging voltage (a triangular-wave voltage Vt) in the capacitor 117, and the triangular-wave voltage Vt is outputted by charging or discharging of the capacitor 117 through the resistor 118 by an output from the operational amplifier 116.

The proportional voltage outputting means 101 is adapted to output a temperature adjusting comparative voltage Vp based on the constant voltage Vc outputted from the constant-voltage outputting means 99. The proportional voltage outputting means 101 includes a variable resistor 120 and a resistor 121 connected in series between the constant voltage Vc and the ground potential, a resistor 122 connected in parallel to the variable resistor 120, and a resistor 123 connected to a contact which is in sliding contact with the variable resistor 120.

The driving-signal outputting means 103 is adapted to output a driving signal $V_{OUT}$ which is a rectangular wave, by comparing the triangular wave voltage Vt outputted from the periodic voltage generating means 100 with a comparative voltage Vp outputted from the comparative voltage outputting means 101. The driving-signal outputting means 103 includes an operational amplifier 124 having a non-inverted input terminal to which the proportional voltage Vp is inputted and an inverted input terminal to which the triangular wave voltage Vt is inputted, and a chattering-preventing resistor 125 provided between an output terminal and the non-inverted input terminal of the operational amplifier 124. The output terminal of the operational amplifier 124 is connected to a gate of the field-effect transistor 106 through the resistor 105. The operational amplifier 124 is adapted to output a rectangular driving signal $V_{OUT}$ which is brought into a high level (a level corresponding to the constant voltage Vc) when the triangular wave voltage Vt is lower than the comparative voltage Vp, and into a low level (a level corresponding to the ground potential) when the triangular wave voltage Vt is higher than the comparative voltage Vp. This causes the field-effect transistor 106 to be turned ON or OFF, thereby controlling the supplying of the electric power to the heaters $34_L$ and $34_R$.

Figure 16:
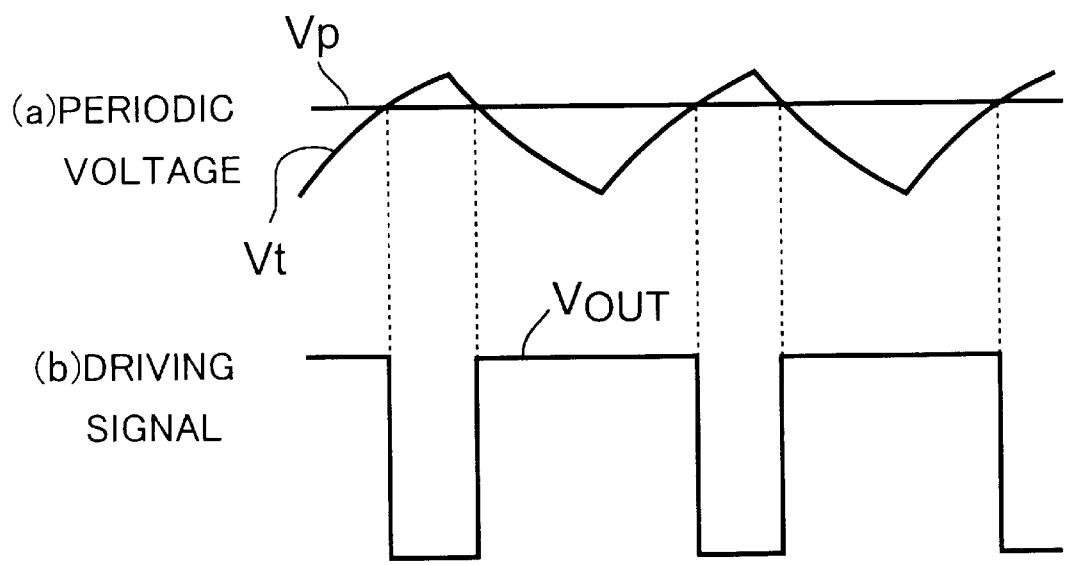

More specifically, when the triangular wave voltage Vt is outputted from the periodic voltage generating means 100, as shown in FIG. 16(*a*), the rectangular driving signal $V_{OUT}$ which is brought into a high level as the triangular wave voltage Vt becomes larger than the comparative voltage Vp, is outputted from the driving signal outputting means 103, as shown in FIG. 16(*b*). By varying the comparative voltage Vp by the comparative voltage outputting means 101, the ratio of the ON-time to OFF-time of the heaters $34_L$ and $34_R$ (a duty ratio) can be varied, thereby controlling the biased amount of electric power to the heaters $34_L$ and $34_R$.

The fail-safe means 102 includes a resistor 126 provided between the non-inverted input terminal of the operational amplifier 124 into which the comparative voltage Vp is inputted, and the ground potential. The resistance value of the resistor 126 is set at a value sufficiently larger than that of the variable resistor 120 in the comparative voltage outputting means 101. Thus, when the comparative voltage Vp from the comparative voltage outputting means 101 becomes unstable, the output from the driving signal outputting means 103 is brought into a low level in such a manner that the comparative voltage Vp is brought into the ground potential, thereby stopping the supplying of the electric power to the heaters $34_L$ and $34_R$.

The battery voltage monitoring means 104 is adapted to monitor the power source voltage Vb of the battery 90 obtained between the diode 98 and the constant voltage outputting means 99 upon turning-on of the switch 96 to determine whether the driving signal can be outputted from the driving signal outputting means 103. The battery voltage monitoring means 104 includes resistors 127 and 128 connected in series between the diode 98 and the ground potential to divide the power source voltage Vb to provide a proportional voltage Vb', a noise removing capacitor 129 connected in parallel to the resistor 128, resistors 130 and 131 connected in series between the constant voltage outputting means 99 and the ground potential to divide the constant voltage Vc outputted from the constant voltage outputting means 99 to provide a reference voltage (a voltage threshold value), an operational amplifier 132 having an inverted input terminal to which the proportional voltage Vb' is inputted and a non-inverted input terminal to which the reference voltage is inputted, a hysteresis setting resistor 133 connected between an output terminal and the non-inverted input terminal of the operational amplifier 132, an operational amplifier 134 having an inverted input terminal to which the output terminal of the operational amplifier 132 is connected and a non-inverted input terminal to which the non-inverted input terminal of the operational amplifier 132 is connected, and a resistor 135 connected between the inverted input terminal of the operational amplifier 134 and the constant voltage outputting means 99. The output terminal of the operational amplifier 134 is connected to the non-inverted input terminal of the operational amplifier 124 in the driving signal outputting means 103.

In such battery voltage monitoring means 104, when the output from the operational amplifier 132 is brought into a low level, the output from the operational amplifier 134 is brought into a high level, and the comparative voltage Vp inputted to the non-inverted input terminal of the operational amplifier 124 in the driving signal outputting means 103 cannot be varied. Thus, the supplying of the power to the heaters $34_L$ and $34_R$ is controlled in an ON-OFF manner in accordance with the comparative voltage Vp. Namely, the operational amplifier 134 outputs a permitting signal for permitting the outputting of the driving signal from the driving signal outputting means 103 as a high level signal. On the other hand, when the output from the operational amplifier 132 is brought into a high level, the output from the operational amplifier 134 is brought into a low level, and the output from the operational amplifier 124 is forcibly reduced to a low level by drawing the comparative voltage Vp inputted to the non-inverted input terminal of the operational amplifier 124 in the driving signal outputting means 103 to the operational amplifier 134, thereby stopping the supplying of the power to the heaters $34_L$ and $34_R$. Namely, the operational amplifier 134 outputs a prohibiting signal for prohibiting the outputting of the driving signal from the driving signal outputting means 103 as a low level signal.

A positive feedback is provided to the operational amplifier 132 in the battery voltage monitoring means 104 by the resistor 133, so that the proportional voltage Vb' inputted to the operational amplifier 132 is substantially decreased when being dropped, and substantially increased when being risen. Therefore, the hysteresis of the reference voltage, i.e., the voltage threshold value is substantially established in the operational amplifier 134. When the proportional voltage Vb' is dropped, a first voltage threshold value $V_{S1}$ is compared with the proportional voltage Vb', and when the proportional voltage Vb' becomes lower than the first voltage threshold value $V_{S1}$, a high level signal is outputted from the operational amplifier 134. When the proportional voltage Vb' is risen, a second voltage threshold value $V_{S2}$ larger than the first voltage threshold value $V_{S1}$ by a predetermined value or more is compared with the proportional voltage Vb', and when the proportional voltage Vb' becomes equal to or larger than the second voltage threshold value $V_{S2}$, a low level signal is outputted from the operational amplifier 134.

Figure 17:
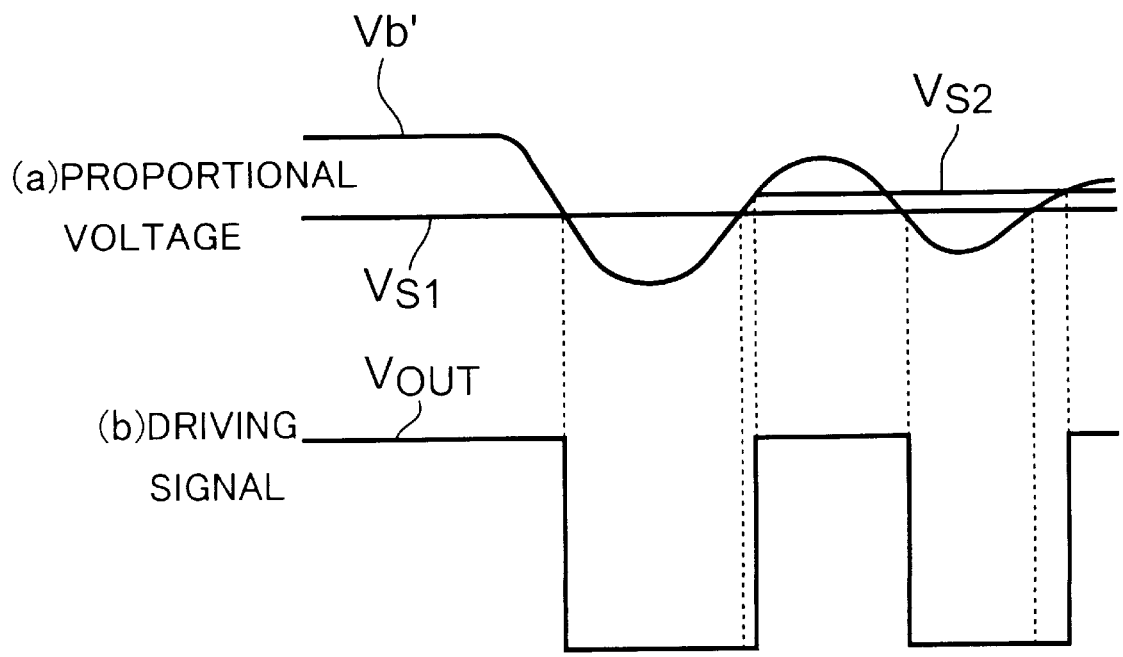

In other words, when the proportional voltage Vb' is varied as shown in FIG. 17(*a*), a prohibiting signal of a low level is outputted from the battery voltage monitoring means 104, i.e., from the operational amplifier 134, as the proportional voltage Vb' is dropped to become smaller than the first voltage threshold value $V_{S1}$, and in response to this, the driving signal from the driving signal outputting means 103 is forcibly brought into a low level as shown in FIG. 17(*b*). In addition, the high-level permitting signal is outputted from the battery voltage monitoring means 104, as the proportional voltage Vb' is risen to become equal to or larger than the second voltage threshold value $V_{S2}$, and in response to this, the high-level driving signal is outputted from the driving signal outputting means 103, as shown in FIG. 17(*b*).

The first voltage threshold value $V_{S1}$ is set according to the following equation:

$$V_{S1} = V_M - \Delta V_1 + \Delta V_2$$

wherein $V_M$ represents a necessary minimum power source voltage required in the battery 90 to allow the motorcycle to travel; $\Delta V_1$ represents a decrement of voltage dropped in the wire from the battery 90 to the battery voltage monitoring means 104; and $\Delta V_2$ represents a detected maximum voltage error presumed on the plus side in the battery voltage monitoring means 104. When the necessary minimum power source voltage $V_M$ is set at 12.5 V which required, for example, to operate a starter motor 144 (see FIG. 20); the dropped-voltage decrement $\Delta V_1$ is set at 0.5 V; and the detected maximum voltage error $\Delta V_2$ on the plus side is set at 0.3 V, the first voltage threshold value $V_{S1}$ is set at 12.3 V. The second voltage threshold value $V_{S2}$ is set larger than the first voltage threshold value $V_{S1}$, for example, by the dropped-voltage decrement $\Delta V_1$, (0.5 V) or more, and when the first voltage threshold value $V_{S1}$ is 12.3 V, the second voltage threshold value $V_{S2}$ is equal to or more than 12.8V.

Figure 18:
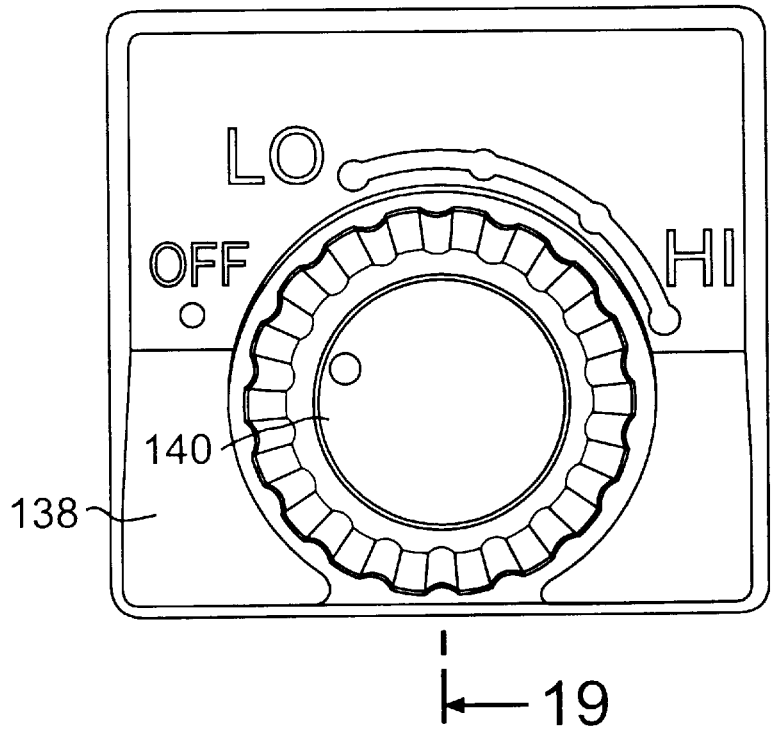
Figure 19:
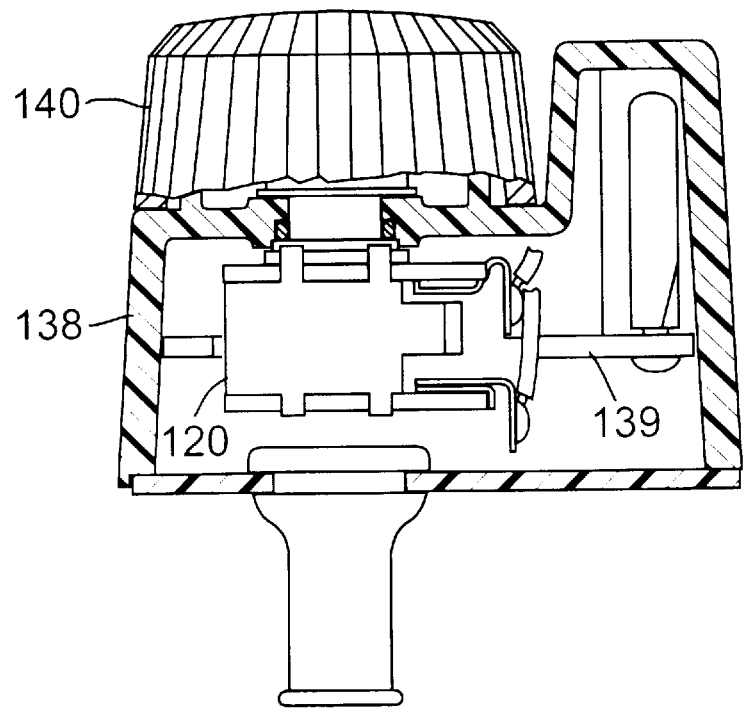

The control device 91 arranged as described above is disposed on a base plate 139 installed in a control box 138 shown in FIGS. 18 and 19. A knob 140 is disposed on a surface of the control box 138 for turning ON and OFF the switch 96 in the control device 91 and for performing the sliding of a contact of the variable resistor 120. Thus, the switch 96 can be turned OFF by bringing the knob 140 to an "OFF" position, and the resistance value of the variable resistor 120 can be varied to the regulate the temperature of the heaters $34_L$ and $34_R$ by turning the knob 140 between an "LO" position and an "HI" position. Moreover, the control box 138 is disposed at a location near the left grip $27_{L1}$ of the steering handlebar 26, as shown in FIG. 1.

Figure 20:
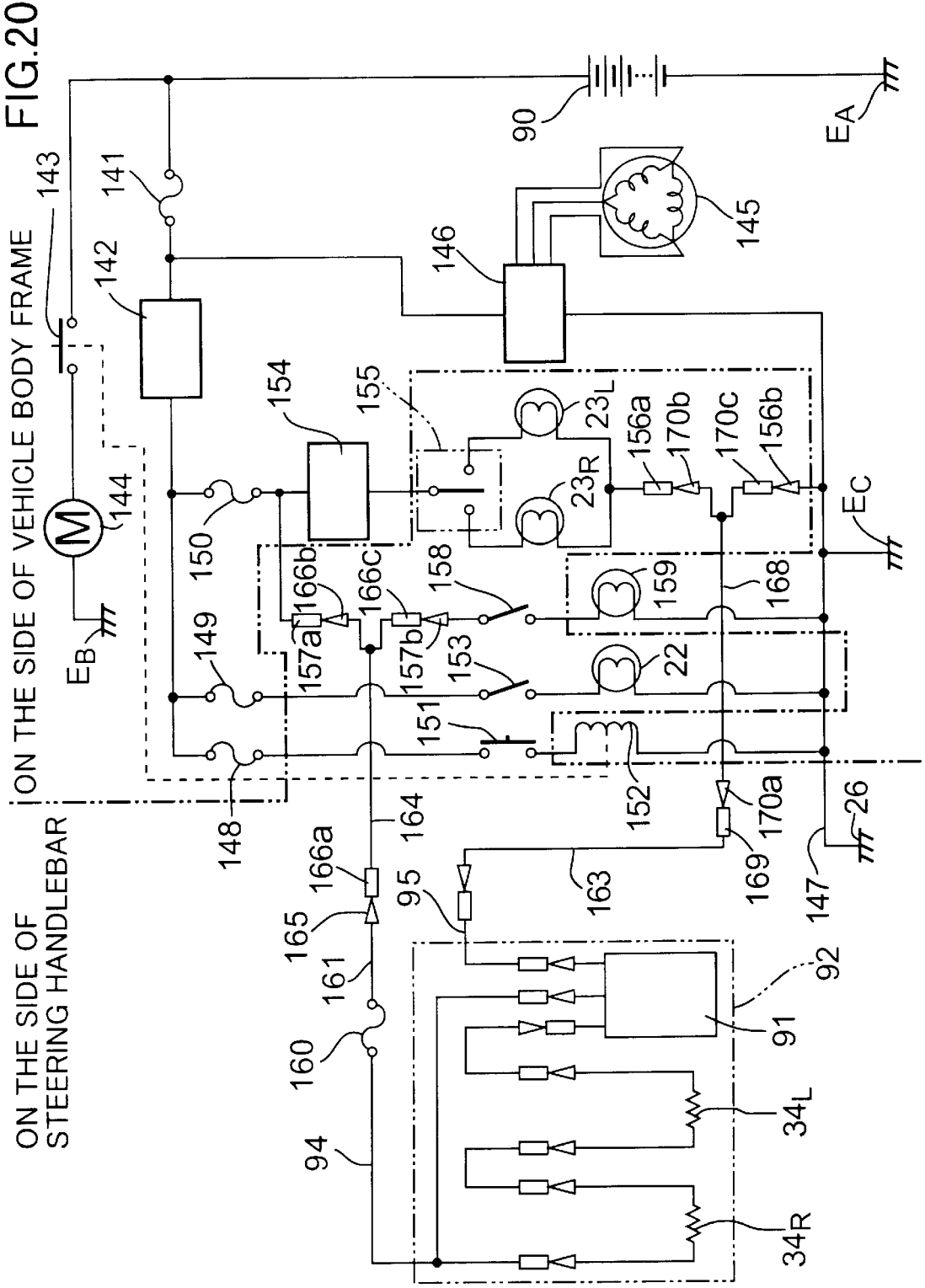

Referring to FIG. 20, one end of a main switch 142 or a combination switch having a main switch function is connected to the plus side of the battery 90 through a main fuse 141, and a starter motor 144 is also connected to the plus side of the battery 90 through a relay switch 143. A charger 146 is connected between the main fuse 141 and the main switch 142, and adapted to rectify AC power obtained in an AC generator 145 to supply a charging power with the battery 90.

The minus side of the battery 90, the starter motor 144 and the charger 146 are grounded at grounding portions $E_A$, $E_B$ and $E_C$ established at different points on an engine case in an engine mounted on the motorcycle. An earth wire 147 connected to the grounding portion $E_C$ is connected to the steering handlebar 26.

Fuses 148, 149 and 150 are connected in parallel to the other end of the main switch 142. The fuse 148 is connected to the grounding portion $E_C$ through a serial circuit comprised of a starter switch 151 and a relay coil 152, and the fuse 149 is connected to the grounding portion $E_C$ through a serial circuit comprised of a head lamp switch 153 and the head lamp 22. The starter switch 151 is disposed at the right end of the steering handlebar 26, so that the relay switch 143 is turned ON by exiting the relay coil 152 by turning ON the starter switch 151, thereby supplying a power with the starter motor 144. The head lamp switch 153 is disposed at the right end of the steering handlebar 26.

The fuse 150 is connected to one end of a winker relay 154. The left and right front winker lamps $23_L$ and $23_R$ disposed on the front fork 21 are connected at one ends thereof to the other end of the winker relay 154 through a winker switch 155 for selectively switching-over the lighting of the front winker lamps $23_L$ and $23_R$, and are capable of being connected at the other ends thereof to the grounding portion $E_C$ through connecting terminals 156a and 156b connected to each other. Moreover, the winker switch 155 is disposed at the left end of the steering handlebar 26.

One end of a stop switch 158 is capable of being connected between the fuse 150 and the winker relay 154 through connecting terminals 157a and 157b connected to each other. The other end of the stop switch 158 is connected to the grounding portion $E_C$ through a stop lamp 159. Moreover, the stop switch 158 is disposed at the right end of the steering handlebar 26.

The plus-side and minus-side connecting wires 94 and 95 are led from the grip heater unit 92 which comprises the serial circuit including the heaters $34_L$ and $34_R$ and the control device 91. The plus-side connecting wire 94 is connected to one end of an interruptive connecting wire 161 having a fuse 160, and the minus-side connecting wire 95 is connected to one end of an interruptive connecting wire 163. Thus, the other end of the interruptive connecting wire 161 is interruptively connected, at a location near the stop switch 158, between the main switch 142 for switching-over the connection and disconnection with the plus side of the battery 90 and the stop switch 158 as a first electric part disposed on the steering handlebar 26, e.g., between the fuse 150 connected to the main switch 142 and the stop switch 158 in this embodiment. In addition, the other end of the interruptive connecting wire 163 is interruptively connected between the front winker lamps $23_L$ and $23_R$ as second electric parts disposed on the front fork 21 which is a member turned in unison with the steering handlebar 26, and the minus side of the battery 90, i.e., the grounding portion $E_C$ at a location near the front winker lamps $23_L$ and $23_R$.

Figure 21:
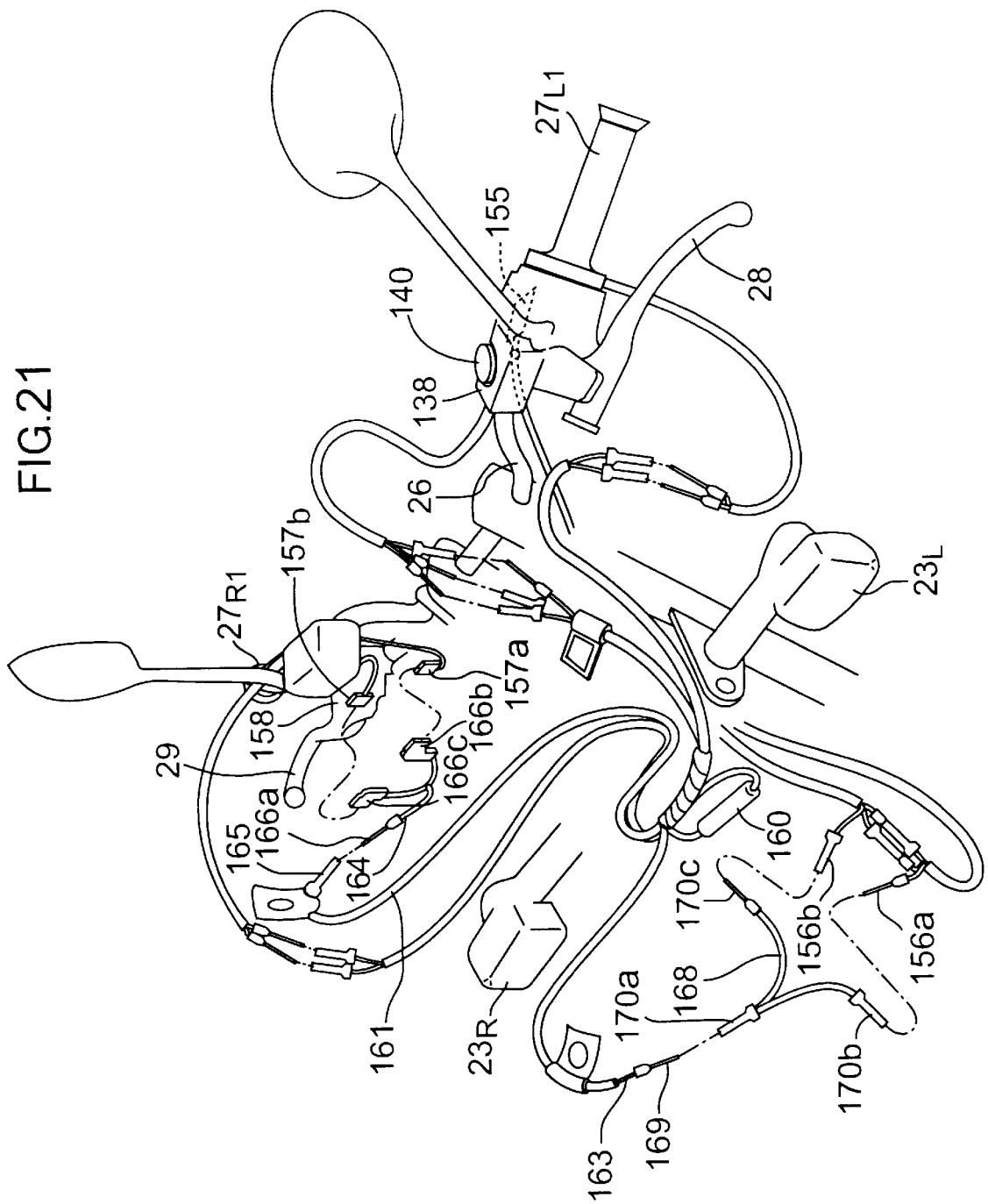

Referring also to FIG. 21, the other end of the interruptive connecting wire 161 connected to the plus-side connecting wire 94 is interruptively connected between the fuse 150 and the stop switch 158, for example, through a three-forked branch connecting wire 164. Namely, the branch connecting wire 164 is provided with connecting terminals 166a, 166b and 166c which are connected respectively to a connecting terminal 165 provided at the other end of the interruptive connecting wire 161 and connecting terminals 157a and 157b for connecting the fuse 150 to the stop switch 158.

The other end of the interruptive connecting wire 163 connected to the minus-side connecting wire 95 is also interruptively connected between the left and right front winker lamps $23_L$ and $23_R$ and the grounding portion $E_C$, for example, through a three-forked branch connecting wire 168. Namely, the branch connecting wire 168 is provided with connecting terminals 170a, 170b and 170c which are connected respectively to a connecting terminal 169 provided at the other end of the interruptive connecting wire 163 and the connecting terminals 156a and 156b for connecting the left and right front winker lamps $23_L$ and $23_R$ to the grounding portion $E_C$.

With such electrical connection structure, by the fact that the plus-side connecting wire 94 and the minus-side connecting wire 95 led from the grip heater unit 92 are interruptively connected between the fuse 150 and the stop switch 158 connected to the plus side of the battery 90 through the main fuse 141 and the main switch 142 and between the left and right front winker lamps $23_L$ and $23_R$ and the grounding portion $E_C$, the grip heater unit 92 can be connected to the plus side and the minus side of the battery 90 and mounted on the vehicle, while avoiding the misoperation of the stop switch 155 and the left and right front winker lamps $23_L$ and $23_R$, even if the heaters $34_L$ and $34_R$ are operated.

Moreover, by the fact that the stop switch 155 is disposed on the steering handlebar 26 and the front winker lamps $23_L$ and $23_R$ are disposed on the front fork 21 operated in unison with the steering handlebar 26, the wiring portions connected to the stop switch 155 and the front winker lamps $23_L$ and $23_R$ are arranged, so that they are not twisted, even if the steering handlebar 26 is turned. In such wire portions, particularly, the connection structure interruptively connected to the disposed portions in the vicinity of the steering handlebar 26, no problems are arisen in its durability and reliability.

In a vehicle such as a motorcycle, a snowmobile and a three-wheeled buggy, it is common that the wiring portion between the stop switch 155 and the main switch 142 and the wiring portions of the left and right front winker lamps $23_L$ and $23_R$ to the grounding portion $E_C$ are located in vicinity of the steering handlebar 26, and the general-purpose utilization of the electric connection of the grip heater unit 92 to a common vehicle can be easily achieved in such a manner to perform the interruptive connection to such wiring portions.

Further, in the battery voltage monitoring means 104 in the control device 91, the first voltage threshold value $V_{S1}$ for stopping the supplying of the power to the heaters $34_L$ and $34_R$ is determined according to the equation, $V_{S1}=V_M-\Delta V_1+\Delta V_2$, wherein $V_M$ represents a necessary minimum power source voltage required in the battery 90 to allow the motorcycle to travel; $\Delta V_1$ represents a decrement of voltage dropped in the wire from the battery 90 to the battery voltage monitoring means 104; and $\Delta V_2$ represents a detected maximum voltage error presumed on the plus side in the battery voltage monitoring means 104. Therefore, the first voltage threshold value $V_{S1}$ is set at an extremely small level, while ensuring the necessary minimum power source voltage required in the battery 90 to allow the motorcycle to travel, after taking the dropped-voltage decrement and the detected error of voltage in the battery voltage monitoring means 104 into consideration. Thus, it is avoided that the supplying of the power to the heaters $34_L$ and $34_R$ is performed even if the first voltage threshold value $V_{S1}$ becomes equal to or smaller than the minimum power source voltage required in the battery 90, and the chances to be able to warm the left and right grips $27_{L1}$ and $27_{R1}$ by the heaters $34_L$ and $34_R$ can be extremely increased. Further, by the fact that the supplying of the power from the battery 90 to the heaters $34_L$ and $34_R$ is permitted at the second voltage threshold value $V_{S2}$ higher than the first voltage threshold value $V_{S1}$ by the predetermined value or more, the turning ON and OFF of the supplying of the power to the heaters $34_L$ and $34_R$ cannot be frequently repeated, and the control of the supplying of the power to the heaters $34_L$ and $34_R$ can be stabilized to stably warm the left and right grips $27_{L1}$ and $27_{R1}$, thereby providing a good warm-feeling.

Moreover, the voltage monitored in the battery voltage monitoring means 104 is provided by the interruptive connecting wire 161 interruptively connected to the plus side of the stop switch 155, and the voltage dropped due to the passing through the main fuse 141, the main switch 142 and the fuse 150 from the battery 90 is monitored and as a result, no exclusive resistor is required. When the voltage becomes lower than the first voltage threshold value $V_{S1}$ as a result of a voltage drop produced in the interruptive connection point of the interruptive connecting wire 161 due to the lighting of the stop lamp 159 by the turning ON of the stop switch 155, the supplying of the power to the heaters $34_L$ and $34_R$ is immediately stopped, and the lighting of the stop lamp 159 is preferentially maintained.

Figure 22:
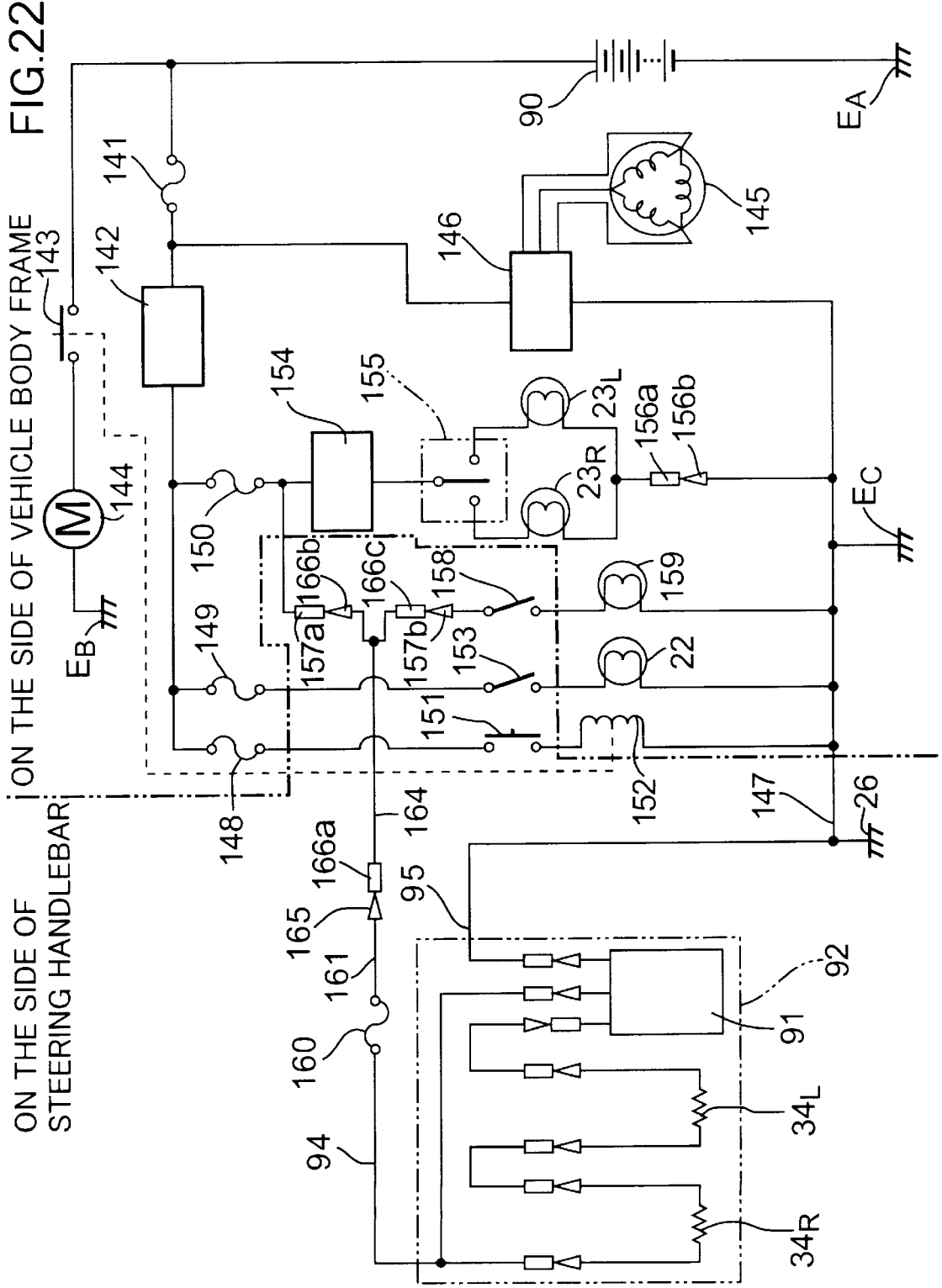
FIG. 22 is a circuit diagram similar to FIG. 20, but according to a second embodiment.
Figure 23:
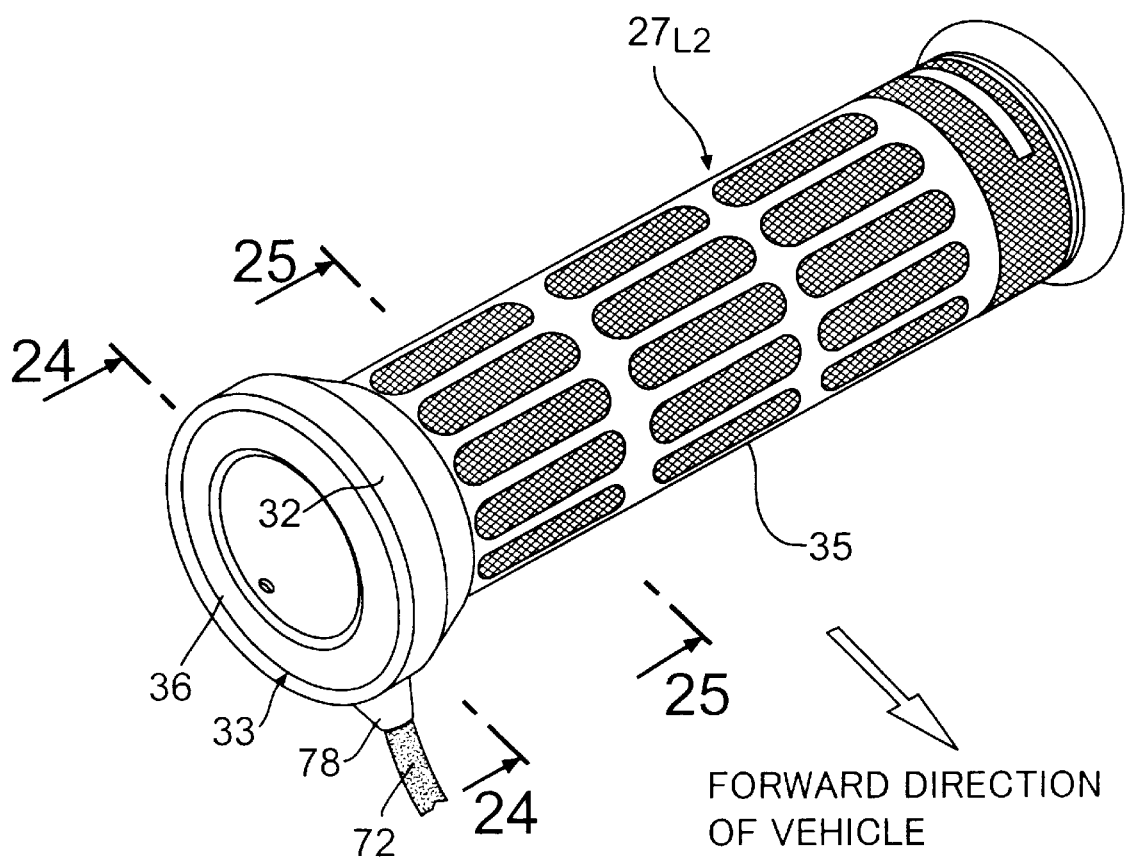

FIG. 22 illustrates a second embodiment of the present invention, wherein portions or components corresponding to those in the first embodiment are designated by like reference characters.

In the first embodiment, the head lamp 22 and the left and right front winker lamps $23_L$ and $23_R$ have been mounted on the front fork 21 turned in unison with the steering handlebar 26, but they may be mounted, for example, on a cowling on the vehicle body frame. In this case, the minus-side connecting wire 95 as the second connecting wire led from the grip heater unit 92 is connected to the steering handlebar 26, for example, by co-clamping, along with the earth wire 147 connected to the grounding portion $E_C$. In addition, the plus-side connecting wire 94 as the first connecting wire is interruptively connected between the stop switch 155 and the fuse 150, as in the first embodiment.

With the second embodiment, by the fact that the minus-side connecting wire 95 is connected to the steering handlebar 26, the minus-side connecting wire 95 cannot be twisted even if the steering handlebar 26 is turned, thereby providing an effect similar to that in the first embodiment.

In the above-described embodiments, the plus-side connecting wire 94 of the grip heater unit 92 has been interruptively connected between the stop switch 155 and the fuse 150, but the plus-side connecting wire 94 may be interruptively connected between the head lamp switch 153 and the fuse 149. However, there is a vehicle in which a power supplied to the head lamp 22 is an AC power and hence, when the power is supplied from the battery 90 to the heaters $34_L$ and $34_R$, the interruptive connection of the plus-side connecting wire 94 is impossible. To provide the general-purpose utilization of the connection, it is desirable that the plus-side connecting wire 94 is interruptively connected between the stop switch 155 and the main switch 142.

In addition, the power of the battery 90 has been used as the power source in the above-described embodiments, but the present invention is also applicable to a vehicle in which the heaters $34_L$ and $34_R$ are energized by an AC power from the AC generator 145.

FIGS. 23 to 30 illustrate a third embodiment of the present invention, wherein portions or components corresponding to those in each of the above-described embodiments are designated by like reference characters.

Referring to FIGS. 23 to 28, a left grip $27_{L2}$ is comprised of an inner piece assembly 33 formed into a cylindrical shape, and a sheet-shaped heater $174_L$ wound around substantially the entire periphery of an outer surface of the inner piece assembly 33. The inner piece assembly 33 and the sheet-shaped heater $174_L$ are integrally embedded in a grip body 35 made of a rubber.

Support projections 42a are formed at a plurality of circumferentially spaced-apart points on inner surfaces of inner pieces $33_1$ and $33_2$, i.e., on an inner surface of the inner piece assembly 33 to fill grooves 43 in the inner surface of the inner piece assembly 33. The support projections 42a extend in a lengthwise direction of the inner piece assembly 33 and are integrally connected to the grip body 35. The support projections 42a resiliently bear on an outer surface of the steering handlebar 26 press-fitted into the left grip $27_{L2}$. Moreover, the width of the support projections 42a in the circumferential direction of the inner piece assembly 33 is constant.

The structure of a section excluding the heater $174_L$ and the shapes of the support projections 42a is basically the same as the left grip $27_{L1}$ in the first embodiment and hence, the portions corresponding to the structure of the left grip $27_{L1}$ in the first embodiment are only shown with the same reference characters as in the first embodiment being affixed in FIGS. 23 to 28, and the detailed description thereof is omitted.

Figure 26:
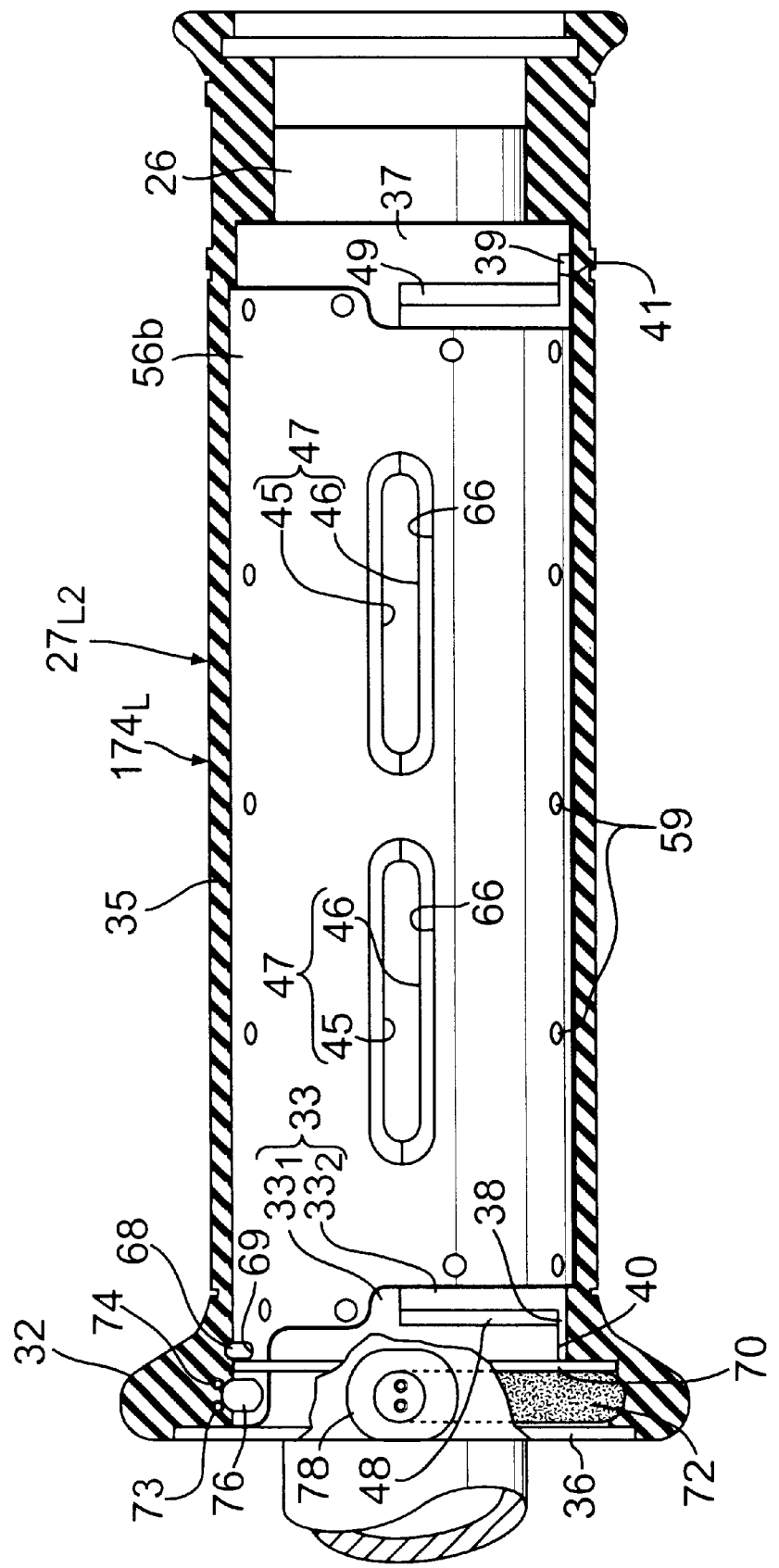
Figure 27:
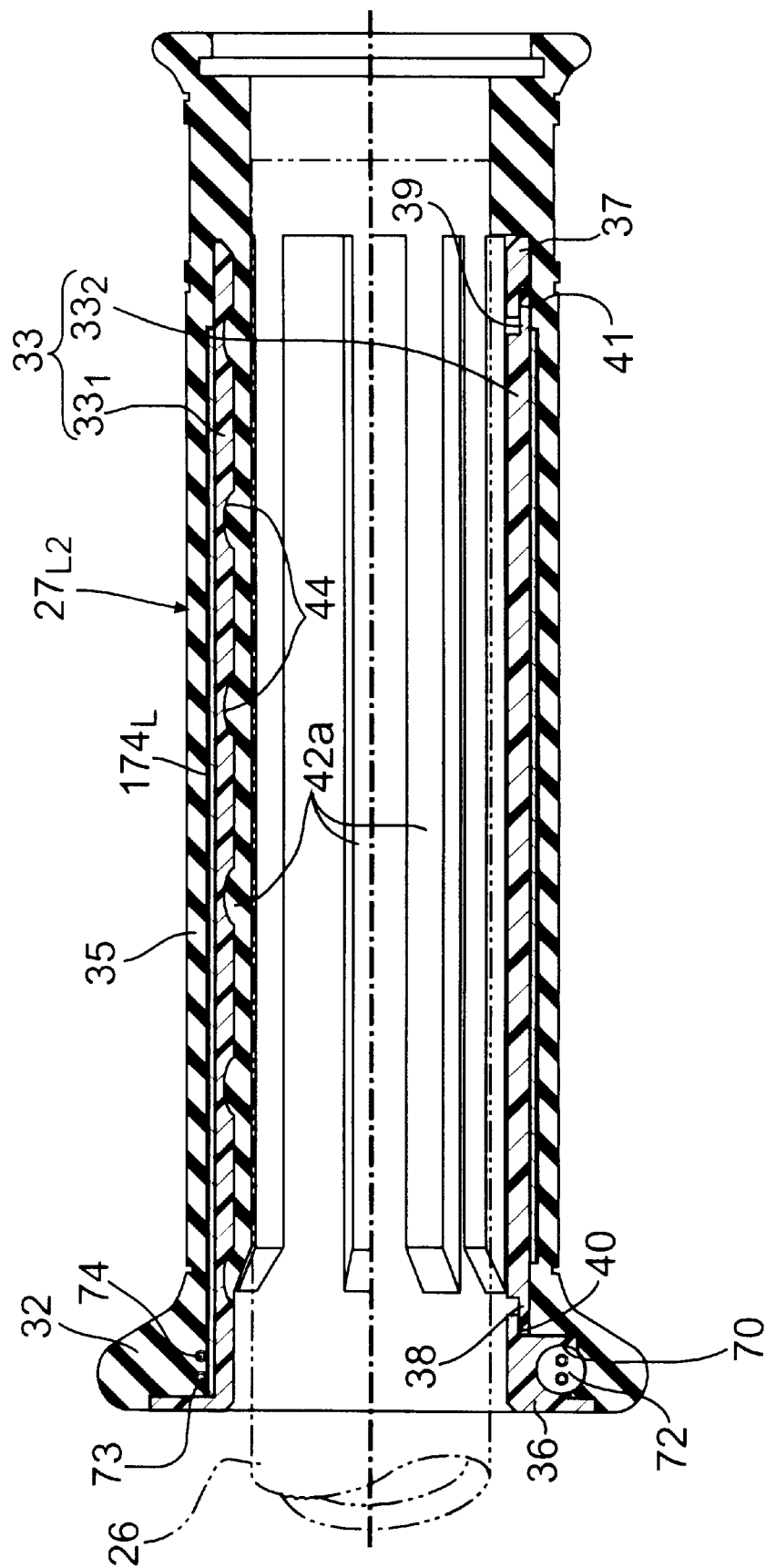
Figure 28:
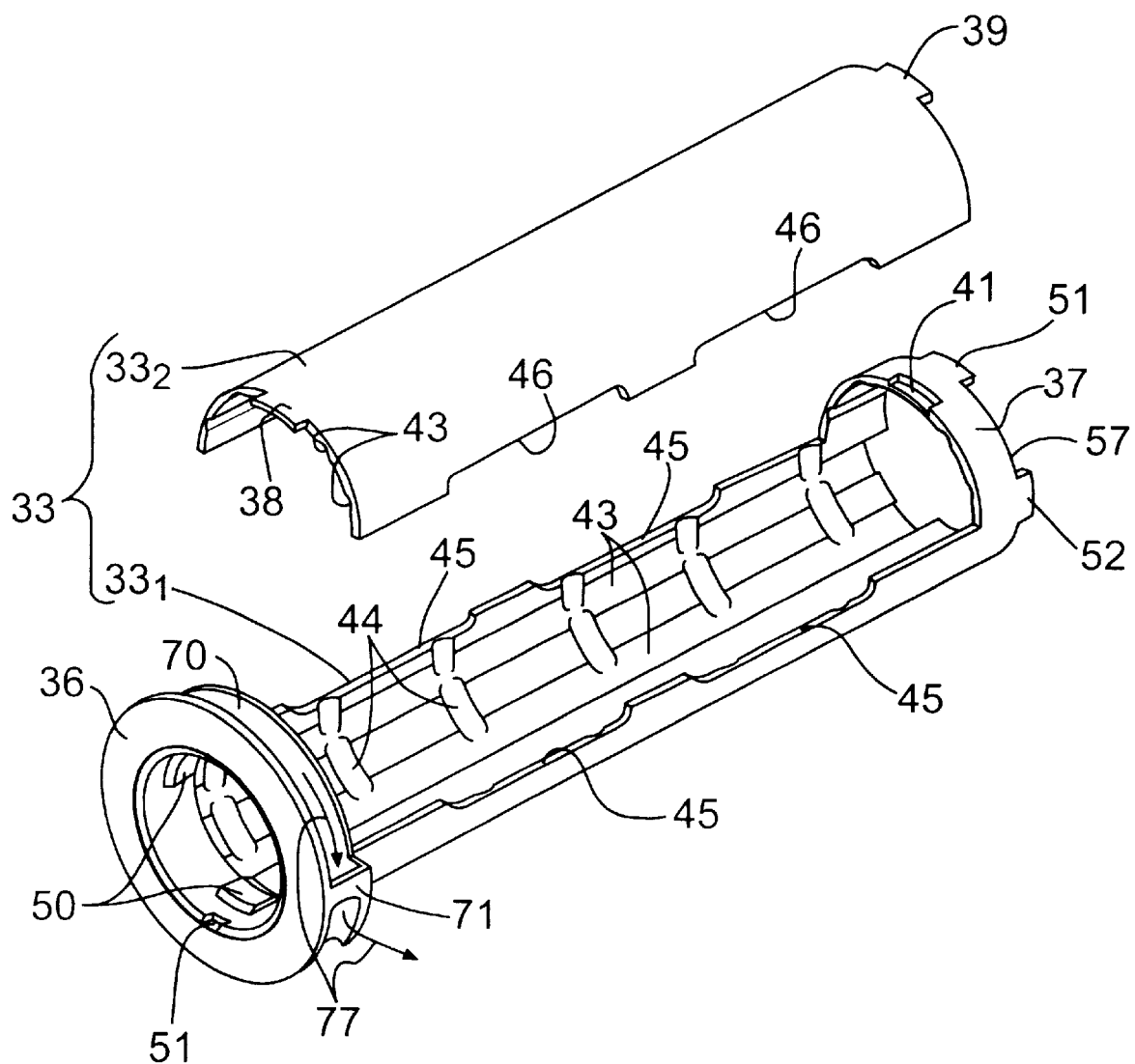
Figure 29:
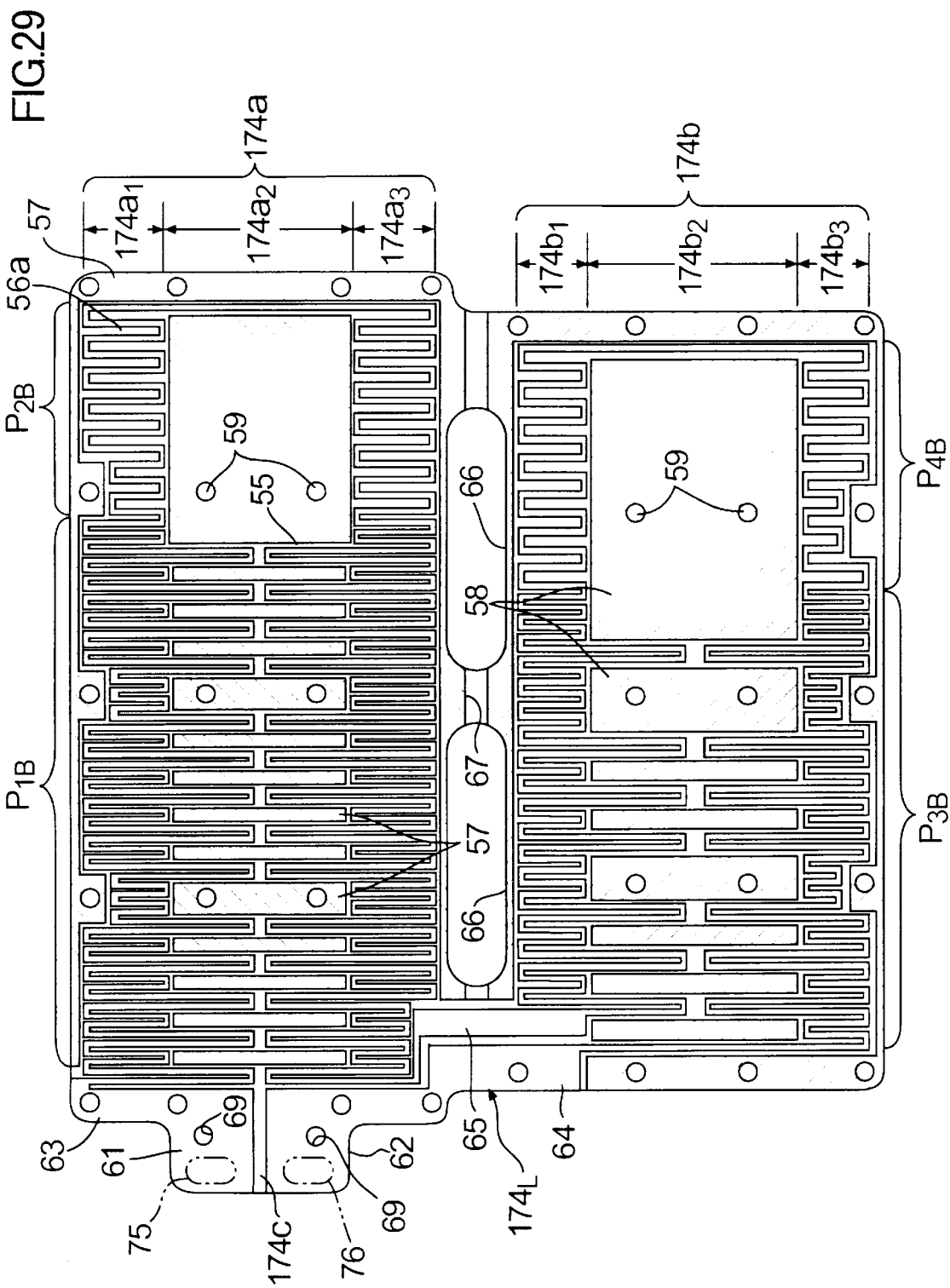

Referring to FIG. 29, the heater $174_L$ is constituted as an FPC heater and has a sectional structure in which a strip pattern formed of a copper foil 55 as a heat generating element is laminated between a base film 56a and an overlying film 56b (see FIG. 26 and omitted and not shown in FIG. 29). The heater $174_L$ includes a first rectangular heater region 174a substantially corresponding to the outer periphery of the first inner piece $33_1$ excluding the annular portions 36 and 37, a second rectangular heater region 174b substantially corresponding to the outer periphery of the second inner piece $33_2$, and a connecting region 174c led from the first heater region 174a toward the annular portion 36 of the first inner piece $33_1$.

First and second heater circuit pattern portions $P_{1B}$ and $P_{2B}$ having different densities of the copper foil 55 dispersed are formed on the first heater region 34a by the strip pattern of the copper foil 55. The heater circuit pattern portions $P_{1B}$ and $P_{2B}$ are connected in series in such a manner that half of the first heater circuit pattern portion $P_{1B}$ is connected to one end of the second heater circuit pattern portions $P_{2B}$, and the other end of the second heater circuit pattern portions $P_{2B}$ is connected to remaining half of the first heater circuit pattern portions $P_{1B}$. Moreover, the first heater circuit pattern portions $P_{1B}$ having the density of the copper foil 55 dispersed higher than that of the second heater circuit pattern portions $P_{2B}$ is disposed in a location inner in the widthwise direction of the motorcycle, i.e., adjacent an inner end of the grip body 35, when a portion of the first heater region 174a which is near the connecting region 174c and corresponds to the annular portion 36, i.e., the left grip $27_{L2}$, has been mounted on the steering handlebar 26. The second heater circuit pattern portions $P_{2B}$ having the density of the copper foil 55 dispersed lower than that of the first heater circuit pattern portions $P_{1B}$ is disposed in a location outer in the widthwise direction of the motorcycle, i.e., adjacent an outer end of the grip body 35, when the left grip $27_{L2}$ has been mounted on the steering handlebar 26.

Third and fourth heater circuit pattern portions $P_{3B}$ and $P_{4B}$ having different densities of the copper foil 55 dispersed are formed in the second heater region 174b by the strip pattern of the copper foil 55. The third and fourth heater circuit pattern portions $P_{3B}$ and $P_{4B}$ are connected in series in such a manner that half of the third heater circuit pattern portion $P_{3B}$ is connected to one end of the fourth heater circuit pattern portion $P_{4B}$, and the other end of the fourth heater circuit pattern portion $P_{4B}$ is connected to remaining half of the third heater circuit pattern portion $P_{3B}$. Moreover, the density of the copper foil 55 dispersed in all the third and fourth heater circuit pattern portions $P_{3B}$ and $P_{4B}$ in the second heater region 174b is set lower than the density of the copper foil 55 dispersed in all the first and second heater circuit pattern portions $P_{1B}$ and $P_{2B}$ in the first heater region 174a. The third heater circuit pattern portion $P_{3B}$ having the density of the copper foil 55 dispersed higher than that of the fourth heater circuit pattern portion $P_{4B}$ is disposed in a location inner in the widthwise direction of the motorcycle, i.e., adjacent the inner end of the grip body 35, when a portion of the second heater region 174a adjacent the connecting region 174c, i.e., the left grip $27_{L2}$, has been mounted on the steering handlebar 26. The fourth heater circuit pattern portion $P_{4B}$ having the density of the copper foil 55 dispersed lower than that of the third heater circuit pattern portion $P_{3B}$ is disposed in a location outer in the widthwise direction of the motorcycle, i.e., adjacent the outer end of the grip body 35, when the left grip $27_{L2}$ has been mounted on the steering handlebar 26.

Moreover, the strip patterns of the heater circuit pattern portions $P_{1B}$ to $P_{4B}$ are formed to extend longer in the circumferential direction of the inner piece assembly $33_1$ when the heater $174_L$ is wound around the inner piece assembly 33. Thus, during winding the heater $174_L$ around the inner piece assembly 33, wrinkles are difficult to be produced in each of the heater circuit pattern portions $P_{1B}$ to $P_{4B}$.

A plurality of larger and smaller copper foil land portions 57 and 58, which do not function as a heater circuit pattern, but which are intended to reinforce the heater $174_L$, are respectively formed in the first and second heater regions 174a and 174b, as best shown by oblique lines drawn in FIG. 29. Bores 59 are defined at a plurality of points in each of the copper foil land portions 57 and 58 and adapted to be filled with a molten rubber at the winding of the heater $174_L$ around the inner piece assembly 33 to ensure a reliable adhesion of the heater $174_L$ to the inner piece assembly 33.

The formation of the copper foil land portions 57 ensures that regions having different dispersed densities of the copper foil 55 are formed in the first and second heater circuit pattern portions $P_{1B}$ and $P_{2B}$ in the circumferential direction of the heater $174_L$ wound around the inner piece assembly 33, and higher-density regions $174a_1$ and $174a_3$ are formed in the first heater region 174a on opposite sides of a lower-density region $174a_2$ located in the middle in the circumferential direction. The formation of the copper foil land portions 58 ensures that regions having different dispersed densities of the copper foil 55 are formed in the third and fourth heater circuit pattern portions $P_{3B}$ and $P_{4B}$ in the circumferential direction of the heater $174_L$ wound around the inner piece assembly 33, and higher-density regions $174b_1$ and $174b_3$ are formed in the second heater region 174b on opposite sides of a lower-density region $174b_2$ located in the middle in the circumferential direction. In this way, the density of the copper foil 55 dispersed is varied in the circumferential direction of the heater $174_L$ wound around the inner piece assembly 33 due to the formation of the copper land portions 57 and 58. However, the disposition of the higher-density regions $174a_1$, $174a_3$, $174b_1$ and $174b_3$ and the lower-density regions $174a_2$ and $174b_2$, i.e., the disposition of the copper foil land portions 57 and 58 may be determined depending upon the distribution of a pressure of contact of a left hand with the left grip $27_{L2}$.

A pair of connecting lands 61 and 62 are formed in the connecting region 174c by exposure of the copper foil 55. One 61 of the connecting lands is connected to the first heater circuit pattern portion $P_{1B}$ by a connecting portion 63 disposed near the connecting region 174c, and the other connecting land 62 is connected to the third heater circuit pattern portion $P_{3B}$ by a connecting portion 64 disposed near the connecting region 174c. The first and third heater circuit pattern portions $P_{1B}$ and $P_{3B}$ are connected to each other by a connecting portion 65 adjoining the connecting portion 64. Moreover, each of the connecting portions 63, 64 and 65 is formed relatively widely, so that a wasteful heat is not generated.

Elongated bores 66, 66 corresponding to the openings 47, 47 in the inner piece assembly 33 are defined in the heater $174_L$ between the first and second heater regions 174a and 174b. The elongated bores 66, 66 are formed larger than the openings 47, 47, so that the openings 47, 47 cannot be occluded by the heater $174_L$ even if the relative positions of the inner piece assembly 33 and the heater $174_L$ are misaligned slightly from each other. A band-shaped copper foil-non-formed region 67 is formed in the heater $174_L$ in such a manner to connect the elongated bores 66, 66 to each other. The flexibility of the heater $174_L$ is enhanced by the copper foil-non-formed region 67.

Such heater $174_L$ is wound around the outer periphery of the inner piece assembly 33 in such a manner that the connecting region 174c extends toward the annular portion 36 at the circumferential central portion of the first inner piece $33_1$, and the heater $174_L$ is positioned relative to the inner piece assembly 33 by bringing a pair of positioning pins 68 protruding from the outer periphery of the first inner piece $33_1$ at locations near the annular portion 36 into engagement into positioning pins 69, 69 provided in the connecting lands 61 and 62 in the heater 34.

Connecting wires 73 and 74 led from a cord 72 are connected at soldering portions 75 and 76 to the connecting lands 61 and 62 of the heater $174_L$ wound around the inner piece assembly 33. The cord 72 and the connecting wires 73 and 74 are mounted in a mounting groove 70 over a range of approximately 270 degree in the annular portion 36 and led outwards through a cord supporting portion 71, as shown by an arrow 77 in FIG. 28. A cylindrical portion 78 for guiding and supporting the led-out portion of the cord supporting portion 71 is projectingly provided on the flange 32 of the grip body 35.

Figure 24:
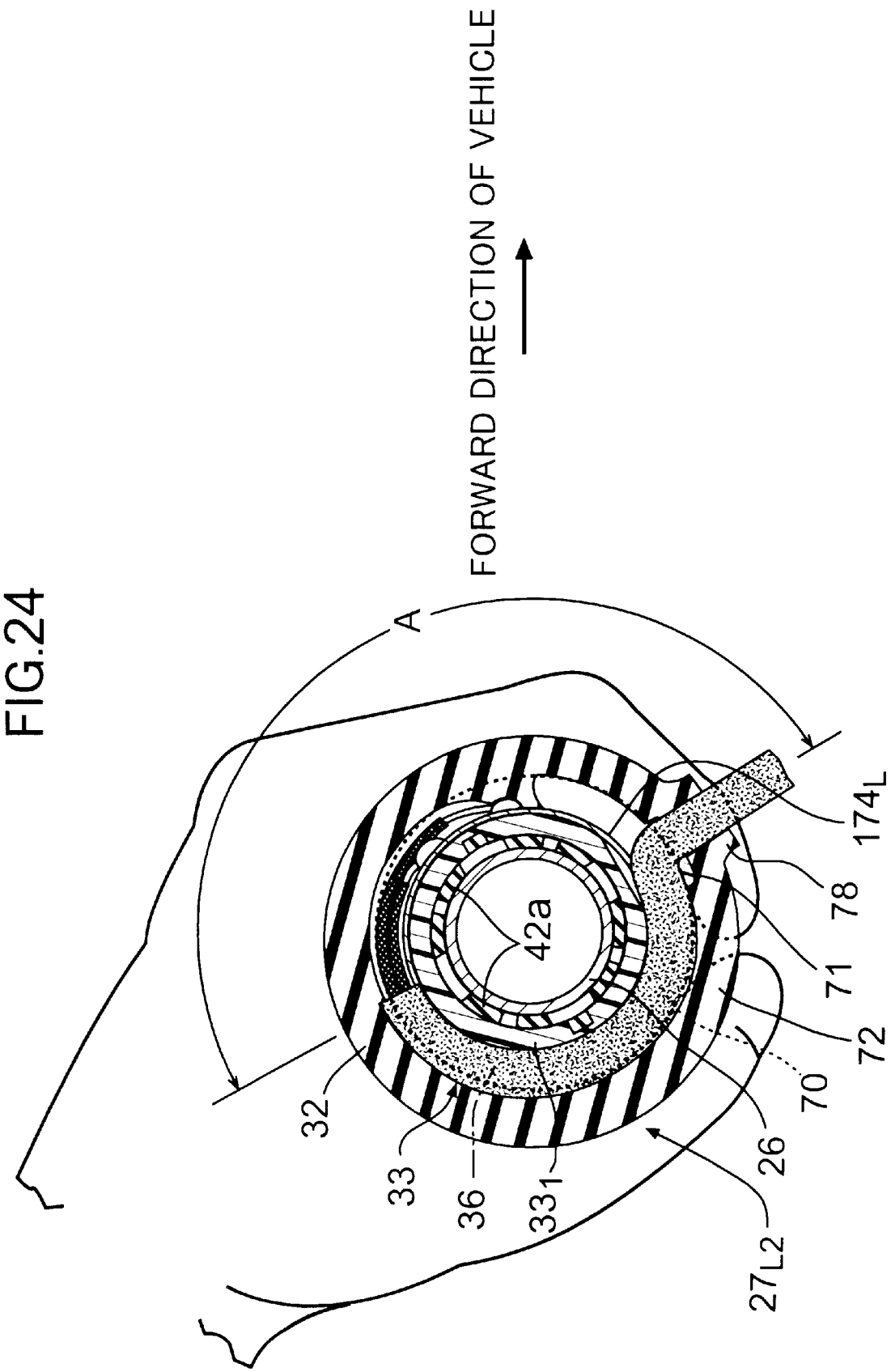
Figure 25:
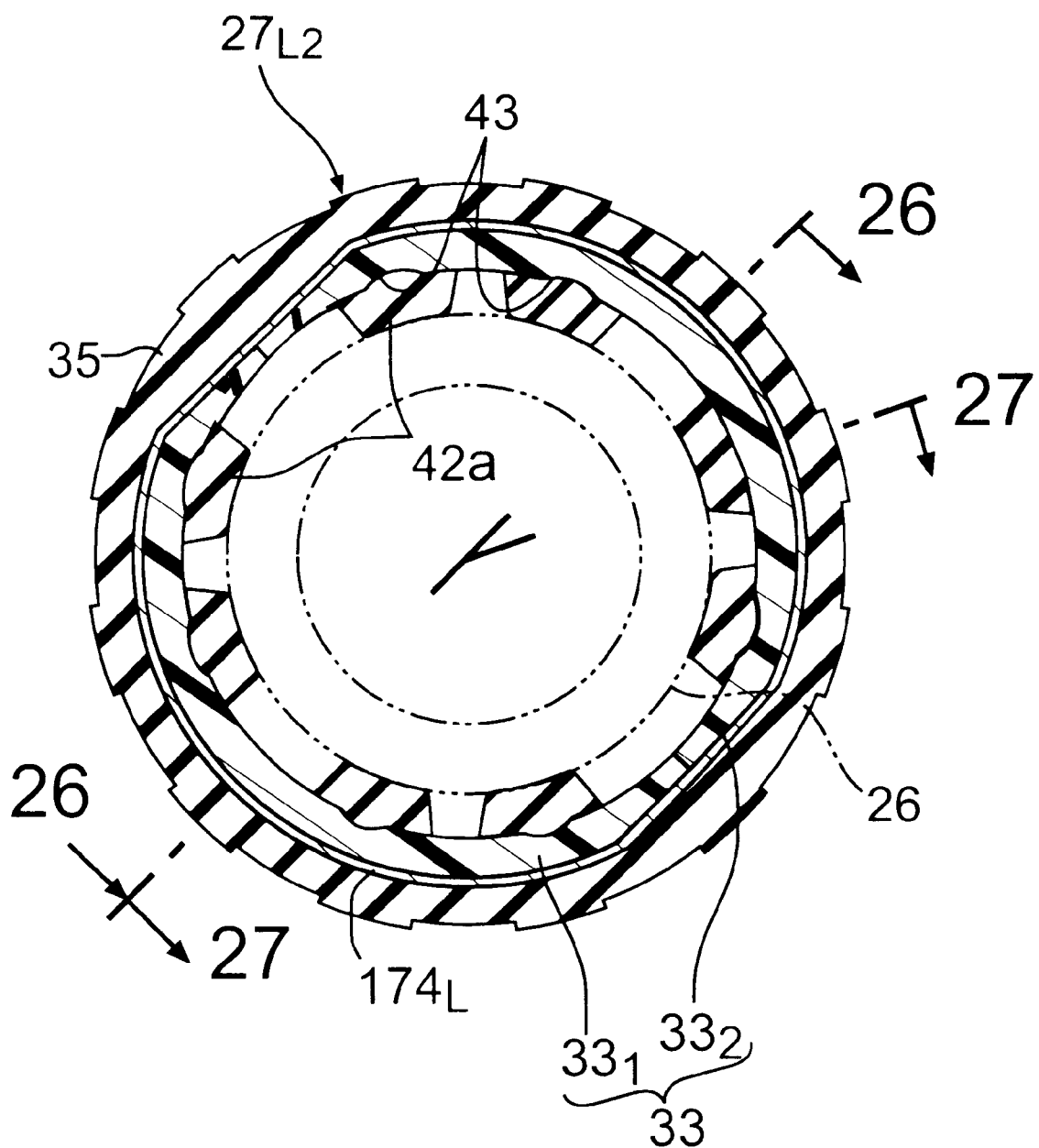

Such left grip $27_{L2}$ is mounted at the left end of the steering handlebar 26 in such a manner that the cylindrical portion 78, i.e., the cord 72, is led out in a direction declined forwards, for example, at 60 degree in a direction of movement of the motorcycle, as shown in FIG. 24. Thus, in the heater $174_L$ installed in the left grip $27_{L2}$, the first heater region 174a is disposed in an obliquely upper range A of approximately 180 degree on the front in the direction of movement of the motorcycle, i.e., at the front portion of the left grip $27_{L2}$.

Figure 30:
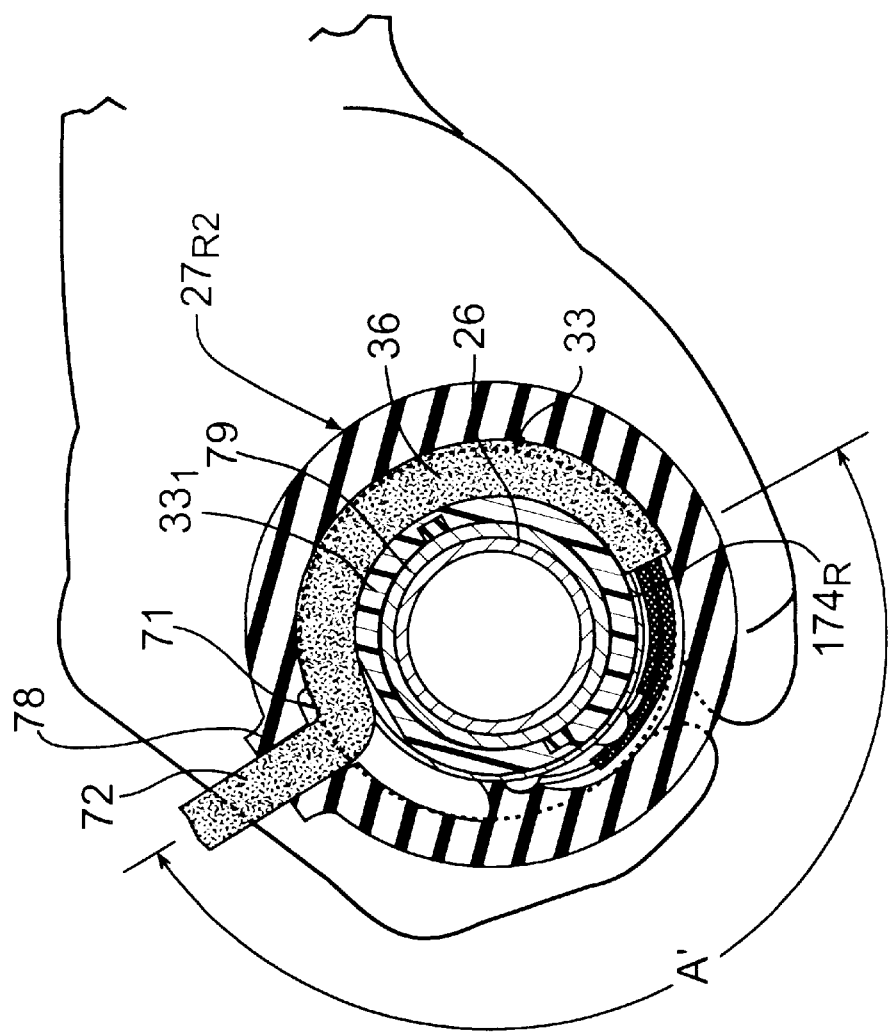

Referring to FIG. 30, the right grip $27_{R2}$ is mounted at a throttle pipe 79 which is turnably mounted at the right end of the steering handlebar 26. The right grip $27_{R2}$ is mounted at the throttle pipe 79 in such a manner that the cylindrical portion 78, i.e., the cord 72, is led out in a direction sloped up forwards, for example, at 60 degree in the direction of movement of the motorcycle. Thus, in the heater $174_R$ installed in the right grip $27_{R2}$, the first heater region 174a is disposed in an obliquely lower range A' of approximately 180 degree on the front in the direction of movement of the motorcycle, i.e., at the front portion of the right grip $27_{R2}$.

With the third embodiment, the heaters $174_L$ and $174_R$ are embedded in the left and right grips $27_{L2}$ and $27_{R2}$, respectively, in such a manner that the first heater region 174a is disposed in the grip body 35 on the front side in the direction of movement of the motorcycle, while the second heater region 174b is disposed in the grip body 35 on the rear side in the direction of movement of the motorcycle. Moreover, the density of the copper foil 55 dispersed throughout the first and second heater circuit pattern portions $P_{1B}$ and $P_{2B}$ formed in the first heater region 174a is higher than the density of the copper foil 55 dispersed throughout the third and fourth heater circuit pattern portions $P_{3B}$ and $P_{4B}$ formed in the second heater region 174b. Thus, the front portion of the grip body 35 in the direction of movement of the motorcycle is a portion touched by fingertips of a hand grasping each of the grips $27_{L2}$ and $27_{R2}$. By the fact that the density of the copper foil 55 dispersed in the front portion of the grip body 35 is higher than that in the rear portion of the grip body 35, as described above, the fingertips sensitively perceiving the cold can effectively be warmed, while warming the entire grip $27_{L2}$, $27_{R2}$ by the copper foil 55 dispersed over the substantially entire periphery of the grip $27_{L2}$, $27_{R2}$, thereby providing an excellent warm-feeling with a relatively reduced amount of power consumed.

In the first and second heater regions 174a and 174b in each of the heaters $174_L$ and $174_R$, the density of the copper foil 55 dispersed in the first and third heater circuit pattern portions $P_{1B}$ and $P_{3B}$ disposed at the locations adjacent the flange 32 of each of the grips $27_{L2}$ and $27_{R2}$, i.e., at the inner end of grip body 35 is higher than the density of the copper foil 55 dispersed in the second and fourth heater circuit pattern portions $P_{2B}$ and $P_{4B}$ disposed at the location spaced apart from the flange 32 of each of the grips $27_{L2}$ and $27_{R2}$, i.e., at the outer end of grip body 35. Thus, the inner end of the grip body 35 is a portion relatively strongly touched by a hand when grasping each of the grips $27_{L2}$ and $27_{R2}$. By the fact that the density of the copper foil 55 dispersed in this portion is larger than that at the outer end, the hand can effectively be warmed. Thus, an excellent warm-feeling can be provided with a relatively reduced amount of power consumed.

Moreover, the left and right grips $27_{L2}$ and $27_{R2}$ are only slightly different in shapes of their inner surfaces. Therefore, the density of the copper foil 55 dispersed at the front portion of the grip body 35 can be set higher than that at the rear portion only by leading-out of the cords 72 in different directions, and the number of parts and the manufacture cost can be reduced by the fact that most of the arrangement of one of the grips $27_{L2}$ and $27_{R2}$ is the same as most of the arrangement of the other grip.

In each of the heaters $174_L$ and $174_R$, the density of the copper foil 55 dispersed is ununiform, but in a state in which the grips $27_{L2}$ and $27_{R2}$ are not grasped, the grips $27_{L2}$ and $27_{R2}$ are uniformly warmed by heat transfer. Therefore, when the grips $27_{L2}$ and $27_{R2}$ has been grasped after heating of the heaters $174_L$ and $174_R$ by supplying the power, the sense of incompatibility due to the ununiformity of the temperature cannot be felt.

Figure 31:
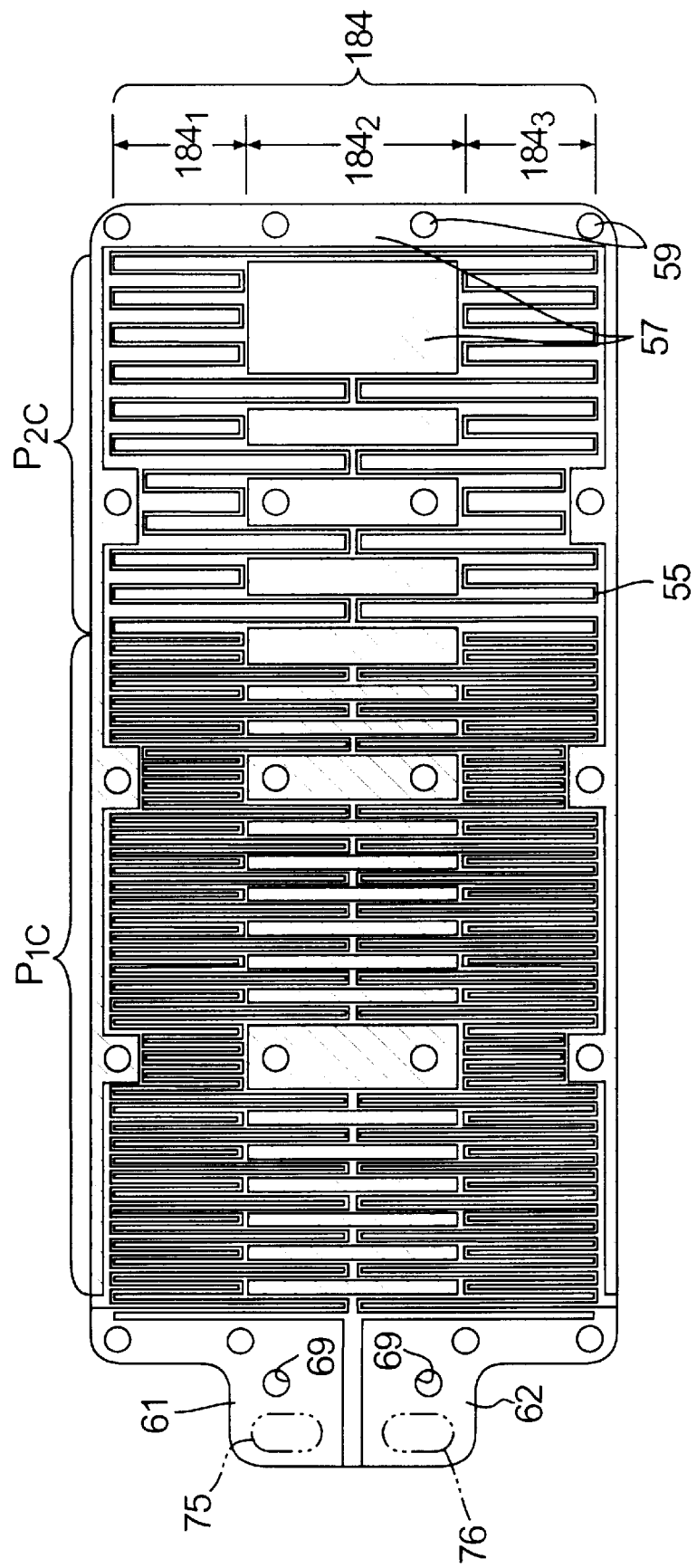
FIG. 31 is a plan view similar to FIG. 29, but showing a heater according to a fourth embodiment.

FIG. 31 illustrates a fourth embodiment of the present invention, wherein portions or components corresponding to those in each of the above-described embodiments are designated by like reference characters.

In place of the heaters $174_L$ and $174_R$ in the third embodiment, a heater 184 corresponding to a substantially half of a periphery of each of the grips $27_{L2}$ and $27_{R2}$ may be integrally embedded in the grip body 35 of each of the left and right grips $27_{L2}$ and $27_{R2}$. This heater 184 is constructed as an FPC heater and formed in correspondence to the first inner piece $33_1$ which is substantially half of the periphery of the inner piece assembly 33. Namely, the heater 184 is formed in correspondence to the first heater region 174a of each of the heaters $174_L$ and $174_R$ in the third embodiment.

First and second heater circuit pattern portions $P_{1C}$ and $P_{2C}$ having different densities of the copper foil 55 dispersed are formed in the heater 184 by a strip pattern of the copper foil 55. When the grips $27_{L2}$ and $27_{R2}$ have been mounted on the steering handlebar 26 and the throttle pipe 79, the density of the copper foil 55 dispersed in the first heater circuit pattern portion $P_{1C}$ located on the inner side in the widthwise direction of the motorcycle, i.e., at the inner end of the grip body 35 is set higher than that in the second heater circuit pattern portion $P_{2C}$ located on the outer side in the widthwise direction, i.e., at the outer end of the grip body 35.

A plurality of large and small copper foil land portions 57 which do not function as a heater circuit pattern, but which are intended to reinforce the heater 184, are formed in the heater 184, as clearly shown by oblique lines drawn in FIG. 31. The formation of the copper foil land portions 57 ensures that higher-density regions $184_1$ and $184_3$ are formed in the first and second heater circuit pattern portions $P_{1C}$ and $P_{2C}$ on opposite sides of a lower-density region $184_2$ located at the middle in the circumferential direction of the heater 184 integrally embedded in the grip body 35. The disposition of the higher-density regions $184_1$ and $184_3$ and the lower-density region $184_2$, i.e., the disposition of the copper foil land portions 57 is determined depending upon the distribution of a pressure of contact of a hand with each of the grips $27_{L2}$ and $27_{R2}$ (see the third embodiment).

With the fourth embodiment, when the grips $27_{L2}$ and $27_{R2}$ are mounted on the steering handlebar 26 and the throttle pipe 79, the heaters 184 are disposed in the ranges shown by A and A' in FIGS. 24 and 30, i.e., on the front side in the direction of movement of the motorcycle. Thus, fingertips sensitively feeling the cold can be effectively warmed, thereby providing an excellent warm-feeling with a relatively reduced amount of power consumed. In addition, by the fact that the density of copper foil 55 dispersed in the first heater circuit pattern portion $P_{1C}$ disposed at the inner end of the grip body 35 is set higher than that in the second heater circuit pattern portion $P_{2C}$ disposed at the outer end of the grip body 35, the hand can be effectively warmed, thereby also providing an excellent warm-feeling with a relatively reduced amount of power consumed.

Figure 32:
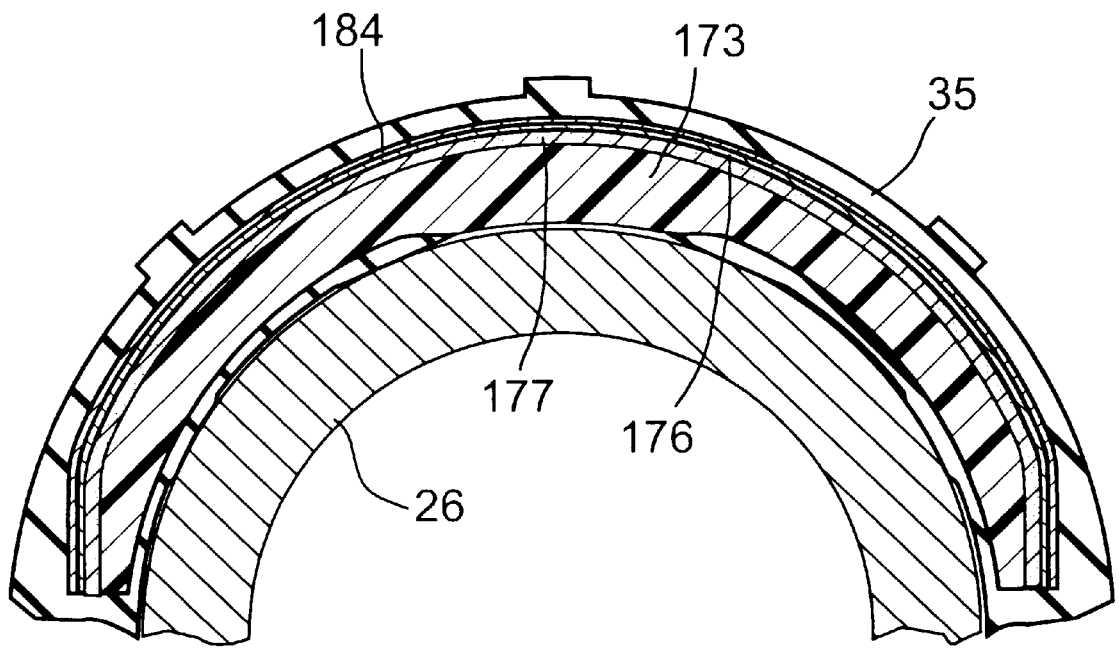
FIGS. 32 and 33 illustrate a fifth embodiment, FIG. 32 being a partially cross-sectional view of a grip, and FIG. 33 being a graph illustrating variations in temperature of the grip surface with the lapse of time.

FIG. 32 illustrates a fifth embodiment of the present invention. A substantially semi-cylindrical inner piece 173 made of a synthetic resin and having a heater 184 wound around an outer periphery thereof is integrally embedded in a grip body 35 mounted at an end of the steering handlebar 26.

The inner piece 173 is formed so that the wall thickness of its circumferential central portion is larger than that of its circumferentially opposite ends. Sandwiched between an inner periphery of the heater 184 and an outer periphery of the inner piece 173 are a sheet 176 made of an aluminum foil and located on the side of the heater 184, and a heat insulating material 177 located on the side of the inner piece 173.

The heat insulating material 177 is comprised of, for example, VHB acrylfoam which is a trade name and is available from Sumitomo 3M, Co., Ltd., or the like. The heat insulating material 177 is bonded to an outer surface of the semi-cylindrical inner piece 173 by a pressure sensitive adhesive double coated tape or the like. The sheet 176 is also bonded to an outer surface of the heat insulating material 177 by a pressure sensitive adhesive double coated tape or the like, and the heater 184 is bonded to an outer surface of the sheet 177.

Figure 33:
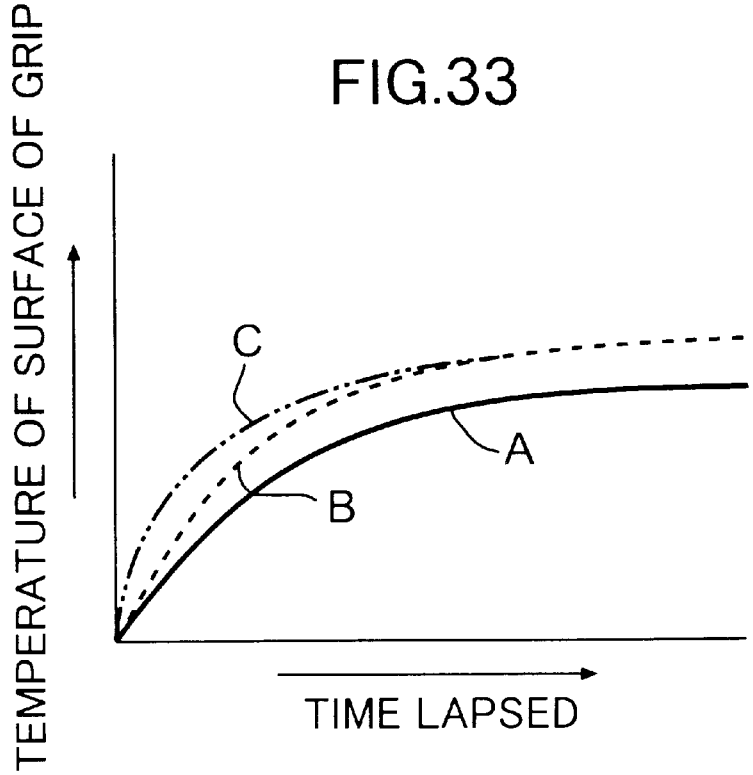

By the fact that the sheet 176 and the heat insulating material 177 are mounted between the heater 184 and the inner piece 173 in the above manner, a heat generated in the heater 184 can be inhibited to the utmost from being escaped toward the steering handlebar 26. More specifically, when the heater 184 has been wound directly around the inner piece 173, the rising of the temperature of the grip surface is late due to the escaping of the heat toward the steering handlebar 26 and moreover, the highest temperature is relatively low, as shown by a curve A in FIG. 33. On the contrast, due to the addition of the heat insulating material 177, the escaping of the heat to the steering handlebar 26 can be reduced, as shown by a curve B in FIG. 33, whereby the rising of the temperature of the grip surface can be hastened and moreover, the highest temperature can be also relatively increased. Further, due to the addition of the sheet 176 made of the aluminum foil, the rising of the temperature of the grip surface can further be hastened by heat reflection, as shown by a curve C in FIG. 33, and the distribution of the temperature of the grip surface can further be uniformized by the heat transfer.

In the fifth embodiment, the sheet 176 and the heat insulating material 177 are mounted between the heater 184 and the inner piece 173, but the structure may be such that either one of the sheet 176 and the heat insulating material 177 is mounted between the heater 184 and the inner piece 173. In addition, the fifth embodiment has been described with regard to the structure in which the semi-cylindrical inner piece 173 is embedded in the grip body 35, but it is of course that the arrangement of the fifth embodiment is applicable to a structure in which heaters $34_L$, $34_R$, $174_L$, $174_R$ are wound around an inner piece assembly 33 cylindrically formed of a pair of semi-cylindrical inner pieces $33_1$ and $33_2$.

Figure 34:
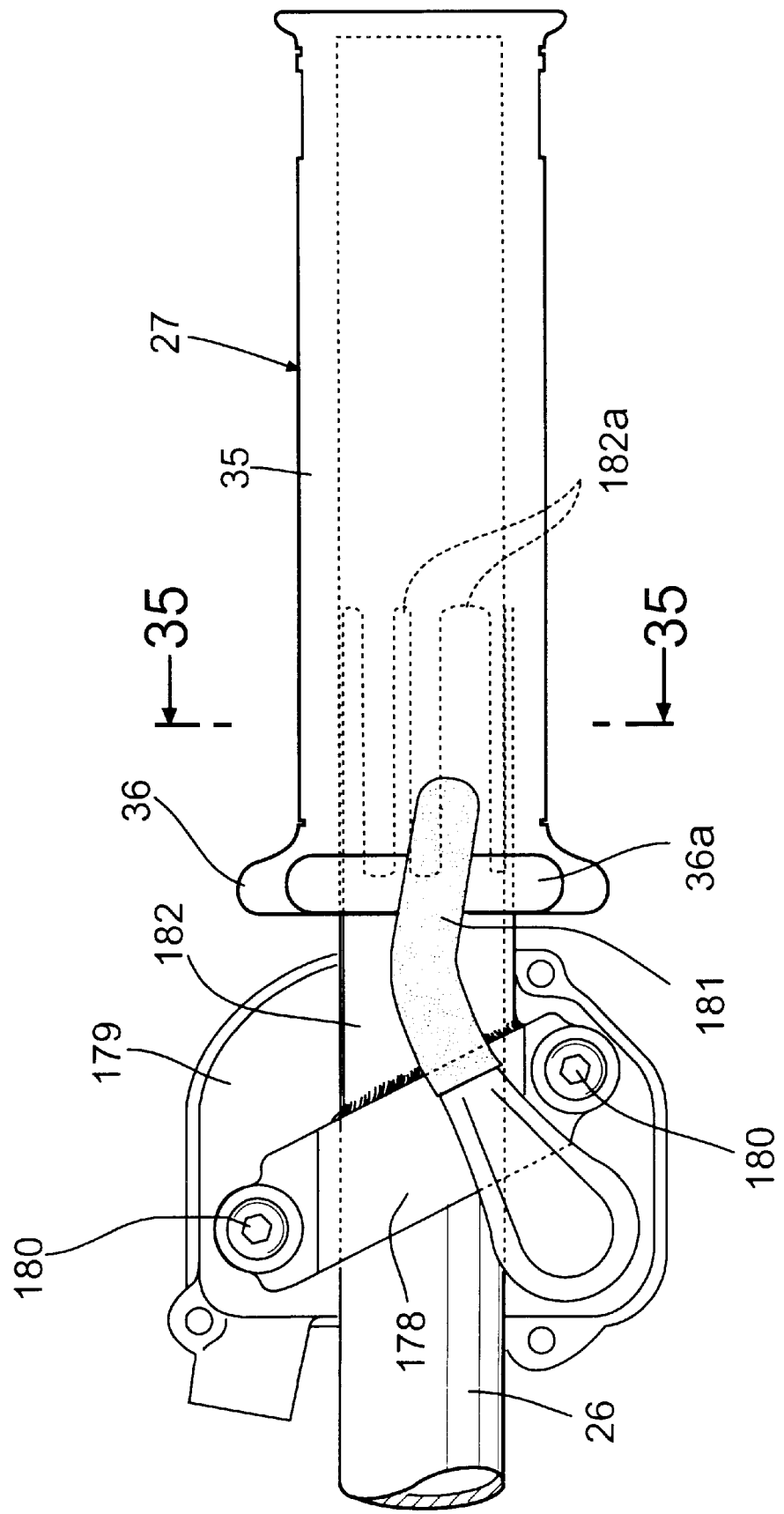
Figure 35:
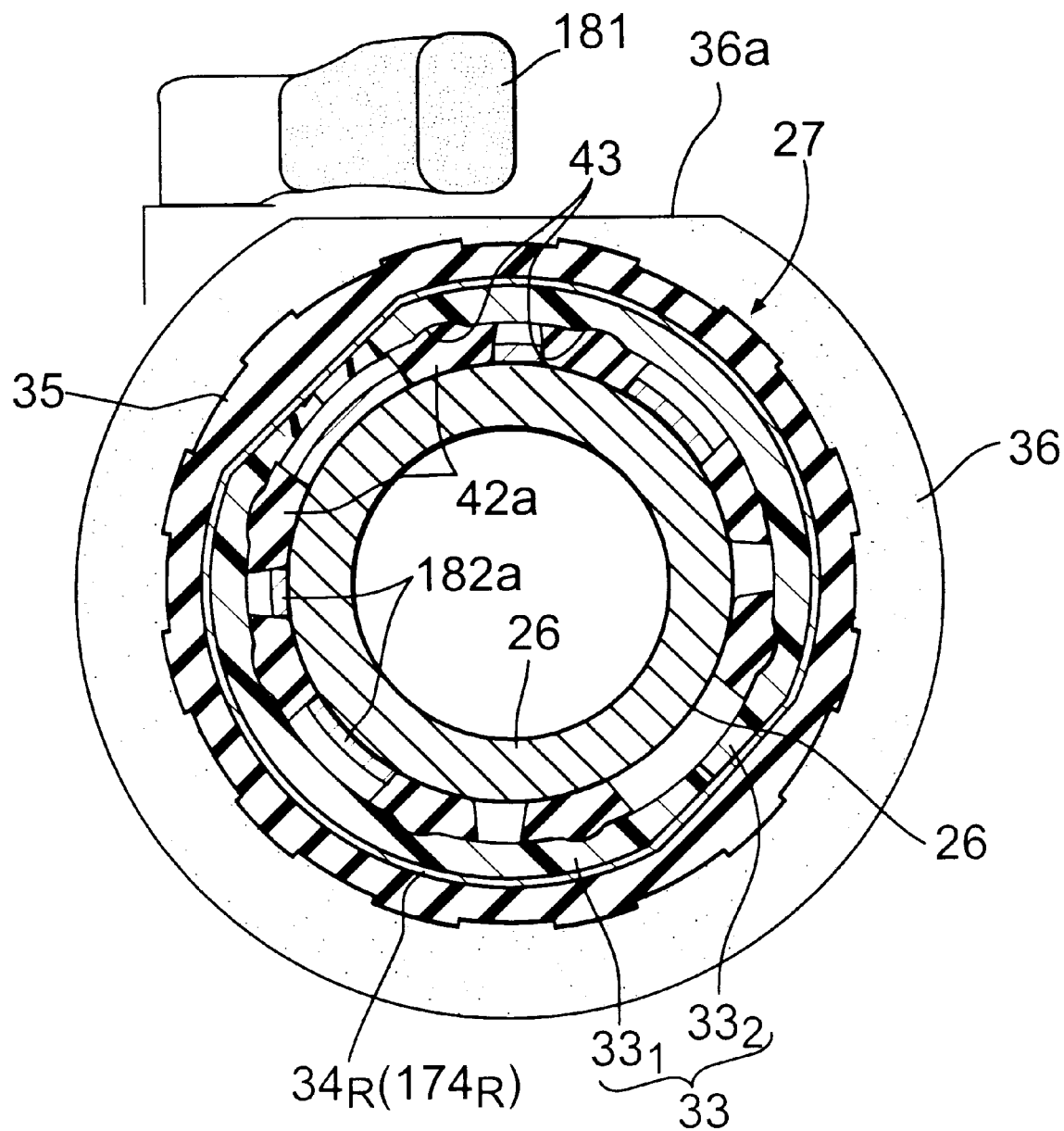
Figure 36:
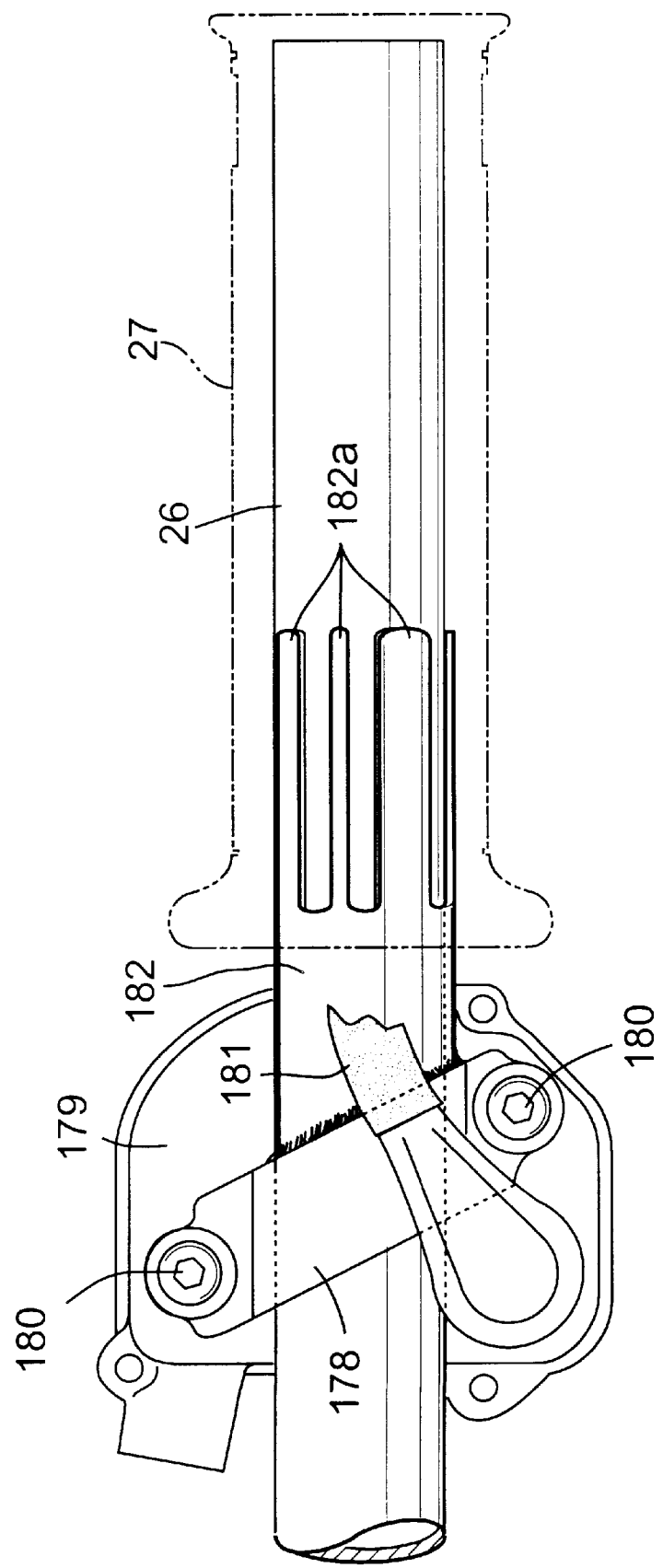
Figure 37:
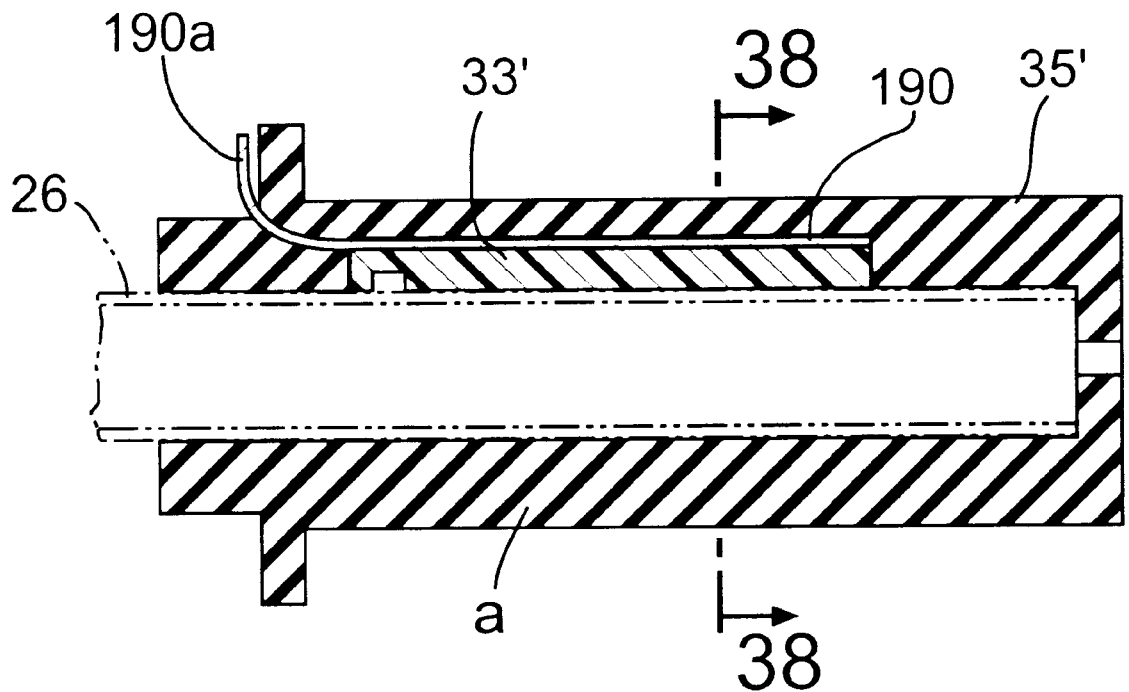
FIG. 37 is a longitudinal sectional view of a conventional heater-installed grip.
Figure 38:
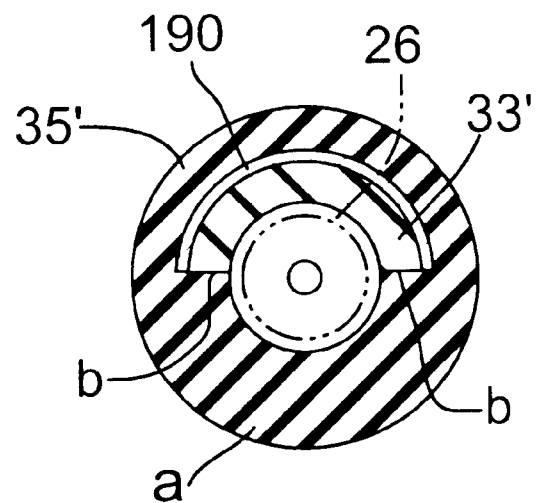
FIG. 38 is a sectional view taken along a line 38—38 in FIG. 37.
Figure 39:
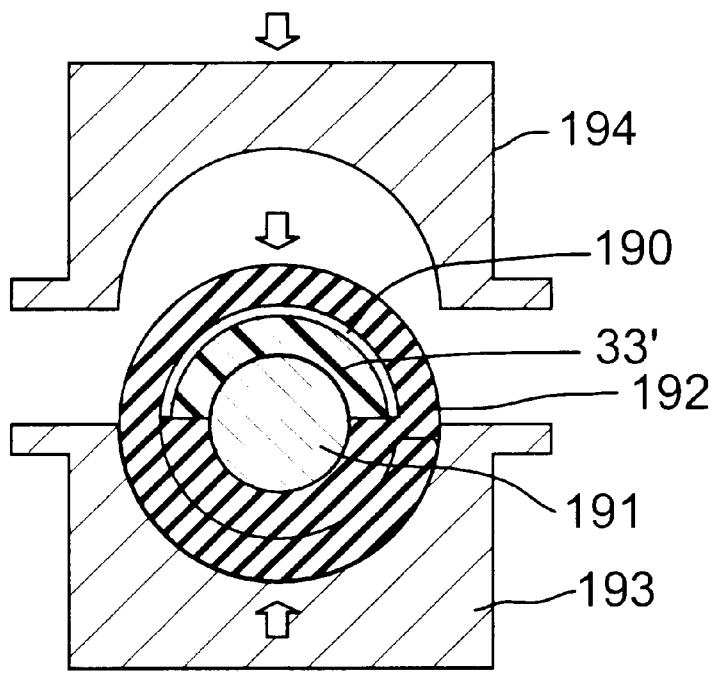
FIG. 39 is a sectional view for explaining a die clamping step in the formation of a grip body.
Figure 40:
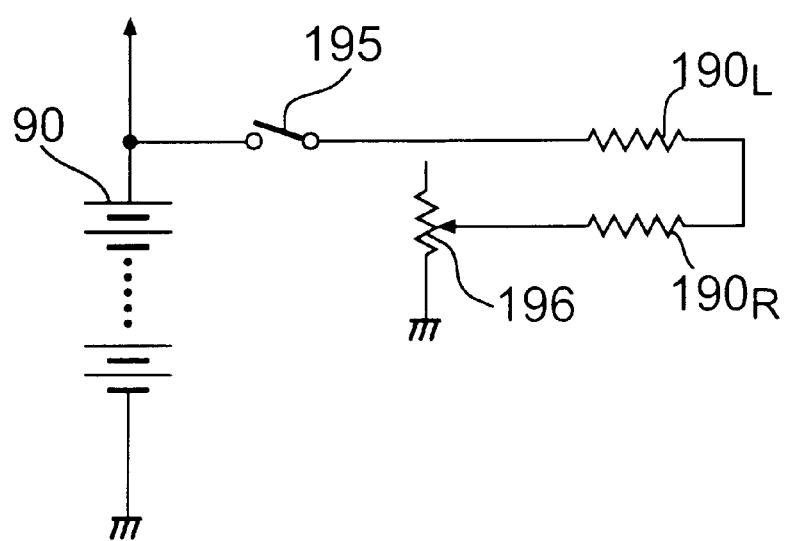
FIG. 40 is a circuit diagram of a conventional heater control device.

FIGS. 34 to 36 illustrate a sixth embodiment of the present invention. FIG. 34 is a plan view of a right grip in a buggy vehicle; FIG. 35 is a sectional view taken along a line 35—35 in FIG. 34; and FIG. 36 is a plan view similar to FIG. 34, but in a state in which a grip has been removed from a steering handlebar.

A grip 27 is mounted at a right end of a steering handlebar 26 in a buggy vehicle. A mounting member 178 is mounted on substantially half of a periphery of the steering handlebar 26 inside the grip 27, and a case 179 mounted to a remaining half of the periphery of the steering handlebar 26 is fastened to the mounting member 178 by a pair of screw members 180, 180. Moreover, a throttle lever 181 capable of being operated by a right hand grasping the grip 27 is turnably supported on the case 179 to extend toward the grip 27.

The grip 27 is comprised of an inner piece assembly 33 which has, for example, a heater $34_R$ or $174_R$ wound around an outer periphery thereof and which is integrally embedded in a grip body 35. A flat notch 36a for enabling the turning operation of the throttle lever 181 is provided in an annular portion 36 which is provided at an axially inner end of the grip 27.

In a structure of the right end of the steering handlebar 26 of such buggy vehicle, when the grip 27 is turned about an axis of the steering handlebar 26, the turning of the throttle lever 181 may be difficult in some cases due to catching of the throttle lever 181 in the notch 36a. Therefore, in order to inhibit the turning of the grip 27 about the axis of the steering handlebar 26, a limiting member 182 is integrally coupled to the mounting member 178 by welding or the like.

The limiting member 182 is formed into an arcuate shape in cross section to come into close contact with the outer surface of the steering handlebar 26. A plurality of fitting claws 182a, 182a are integrally formed at a tip end of the limiting member 182 and adapted to be fitted into between a plurality of support projections 42a, 42a which are formed at circumferential distances on an inner peripheral surface of the grip 27. Moreover, the distance between the support projections 42a, 42a is not uniform and is set to be different depending upon the circumferential point of the grip 27. The width of the fitting claws 182a, 182a is set in correspondence to such distance.

With the sixth embodiment, by the fact that the mounting member 178 is fixed to the steering handlebar 26 and that the plurality of fitting claws 182a, 182a included in the limiting member 182 integrally coupled to the mounting member 178 are fitted between the plurality of support projections 42a, 42a around the inner periphery of the grip 27, the turning of the grip 27 about the axis of the steering handlebar 26 is reliably inhibited. Thus, even if the grip 27 is strongly grasped by a right hand, the grip 27 cannot be turned, and the smooth operation of the throttle lever 181 can be ensured.

Although the embodiments of the present invention have been described in detail, it will be understood that the present invention is not limited to the above-described embodiments, and various modifications in design may be made without departing from the spirit and scope of the invention defined in claims.

For example, the present invention is applicable to a structure in which a nichrome wire is used as a heat generating element in place of the copper foil.

Industrial Applicability

The heater-installed grip for the vehicle, the control device for the heater installed in the vehicle grip and the electrical connection structure for the heater unit for the grip in the vehicle according to the present invention can be suitably used for the grip in a vehicle such as a motorcycle, a snowmobile, a buggy vehicle and the like.

What is claimed is:

1. A heater-installed grip for a vehicle, comprising substantially semi-cylindrical inner pieces ($33_1$ and $33_2$) of a synthetic resin which have a planar heater ($34_L$, $34_R$; $174_L$, $174_R$; 184) wound around an outer periphery thereof and which are integrally embedded in a cylindrical grip body (35) of a rubber assembled to a pipe-shaped steering handle-bar (26) or a throttle pipe (79), wherein an axially extending projection (33a) is formed at a circumferentially central portion of an inner surface of said inner piece ($33_1$ and $33_2$) over a substantially entire axial length of the inner piece.

2. A heater-installed grip for a vehicle according to claim 1, wherein grooves (43, 44), which are arcuate in cross section and into which a molten rubber flows in the formation of the grip body (35), are formed in a lattice-shaped fashion in regions of inner surfaces of said inner pieces ($33_1$, $33_2$), other than regions where said projection (33a) is formed.

3. A heater-installed grip for a vehicle, comprising a substantially semi-cylindrical inner piece ($33_1$) of a synthetic resin which has a planar heater ($34_L$, $34_R$; $174_L$, $174_R$; 184) wound around an outer periphery thereof and which is integrally embedded in a cylindrical grip body (35) of a rubber assembled to a pipe-shaped steering handlebar (26) or a throttle pipe (79), wherein said inner piece ($33_1$) is integrally provided, at axially predetermined locations thereon, with annular portions (36, 37) which are intended to prevent the deformation of the inner piece ($33_1$) attendant on the shrinkage of a rubber layer after formation of the grip body (35), and each of which functions as a guide for insertion of the steering handlebar or the throttle pipe.

4. A heater-installed grip for a vehicle according to claim 3, wherein said annular portions (36, 37) are provided in an opposed relation to axially opposite ends of said inner piece ($33_1$).

5. A heater-installed grip for a vehicle according to claim 4, wherein said inner piece ($33_1$) and a second, substantially semi-cylindrical inner piece ($33_2$) together form a cylindrical inner piece assembly (33), the second inner piece ($33_2$) being formed from a synthetic resin and disposed between said annular portions (36, 37).

6. A heater-installed grip for a vehicle according to claim 5, wherein circumferentially central portions of the axially opposite ends of said second inner piece ($33_2$) engage with said annular portions (36, 37) in a recess/projection manner.

7. A heater-installed grip for a vehicle according to claim 5 or 6, wherein openings (48, 49), which permit a molten rubber to flow into said inner pieces ($33_1$, $33_2$) in a process for forming the grip body (35), are provided at least either between said inner pieces ($33_1$, $33_2$), or between said second piece ($33_2$) and both said annular portions (36, 37).

8. A heater-installed grip for a vehicle according to claim 4, wherein one of said annular portions (36, 37) has a plurality of positioning abutment projections (50) provided on an inner peripheral surface thereof for abutment against an outer surface of a core die (82) in a process for forming the grip body (35) to align axes.

9. A heater-installed grip for a vehicle according to claim 4, wherein either one (36) of said annular portions (36, 37) has a plurality of positioning notches (51) provided in an inner peripheral surface at one end thereof for engagement with the core die (82) in a process for forming the grip body (35) to determine a circumferential position of the inner piece ($33_1$) relative to a grip body forming mold.

10. A heater-installed grip for a vehicle according to claim 4, wherein either one (37) of said annular portions (36, 37) has a positioning projection (52) provided thereon for abutment against a grip body forming mold in a process for forming the grip body (35) to determine an axial position of said inner piece ($33_1$), so that a molten rubber can flow into said inner piece ($33_1$) on opposite sides of said positioning projection (52).

11. A heater-installed grip for a vehicle, comprising a heat generating element (55) integrally embedded in substantially an entire circumference of a grip body (35) made of a rubber, wherein said heat generating element (55) is disposed in a dispersed manner in the grip body (35) in such a manner that the density of the heat generating element dispersed at a front portion of said grip body in the direction of movement of the vehicle is higher than that at a rear portion of said grip body.

12. A heater-installed grip for a vehicle, comprising a heat generating element (55) integrally embedded in substantially an entire circumference of a grip body (35) made of a rubber, wherein said heat generating element (55) is disposed in a dispersed manner in said grip body (35) in such a manner that the density of said heat generating element (55) dispersed at an end portion of said grip body (35), that is located on an inner side when assembled on said vehicle, is higher than that at an outer end portion of said grip body (35).

13. A heater-installed grip for a vehicle, comprising a heat generating element (55) integrally embedded in substantially half of a circumference of a grip body (35) made of a rubber, wherein said heat generating element (55) is disposed in the grip body (35) at a front portion of said grip body (55) in a direction of movement of the vehicle.

14. A heater-installed grip for a vehicle, comprising a heat generating element (55) integrally embedded in substantially half of a circumference in a grip body (35) made of a rubber, wherein said heat generating element (55) is disposed in a dispersed manner in said grip body (35) in such a manner that the density of said heat generating element (55) dispersed at an end portion of said grip body (35), that is located on an inner side when assembled on said vehicle, is higher than that at an outer end portion of said grip body (35).

15. A control device for a heater installed in a grip for a vehicle for controlling a power supplied from a battery (90) to a heater ($34_L$, $34_R$; $174_L$, $174_R$; 184) installed in a grip ($27_{L1}$, $27_{R1}$; $27_{L2}$, $27_{R2}$; 27) mounted on a steering handlebar (26), wherein said control device comprises a periodic voltage generating means (100) for generating a periodic voltage whose value is periodically varied, a comparative voltage outputting means (101) for outputting a predetermined comparative voltage depending upon a temperature regulating operation for the heater ($34_L$, $34_R$; $174_L$, $174_R$; 184), a rectangular-wave signal outputting means (103) for outputting a rectangular-wave signal having a duty ratio depending upon said temperature regulating operation by comparing the periodic voltage outputted from said periodic voltage generating means (100) with the comparative voltage outputted from said comparative voltage outputting means (101), a switching means (106) for ON/OFF-controlling the power supplied from the battery (90) to said heater ($34_L$, $34_R$; $174_L$, $174_R$; 184) in response to the rectangular-wave signal outputted from said rectangular-wave signal outputting means (103), and a battery voltage monitoring means (104) for monitoring a power source voltage outputted from the battery (90), so that when the power source voltage is dropped down to a value lower than a predetermined value, a rectangular-wave signal indicative of command to control said switching means (106) into an OFF state is forcibly outputted from said rectangular-wave signal outputting means (103) by maintaining said power source voltage at the predetermined value.

16. A control device for a heater installed in a grip for a vehicle according to claim 15, further including a fail-safe means (102) operable to ensure that when the comparative voltage outputted from the comparative voltage outputting means (101) becomes irregular, a rectangular-wave signal indicative of command to control the switching means (106) into an OFF state is forcibly outputted from said rectangular-wave signal outputting means (103) by maintaining said comparative voltage at a predetermined value.

17. A control device for a heater installed in a grip for a vehicle, comprising a switching means (106) for ON/OFF-controlling a power supplied from a battery (90) to a heater ($34_L$, $34_R$; $174_L$, $174_R$; 184) installed in a grip ($27_{L1}$, $27_{R1}$; $27_{L2}$, $27_{R2}$; 27) mounted on a steering handlebar (26), and a driving-signal outputting means (103) for outputting a driving signal for turning the switching means (106) ON, wherein said control device further includes a battery voltage monitoring means (104) which is operable to provide a state to prohibit the outputting of the driving signal from said driving-signal outputting means (103), when a voltage corresponding to a power source voltage outputted from said battery (90) is smaller than a first voltage threshold value, and to provide a state to permit the outputting of the driving signal from the driving-signal outputting means (103), when the voltage corresponding to said power source voltage is equal to or larger than a second voltage threshold value set higher than said first voltage threshold value by a predetermined value or more, said first voltage threshold value being set as being ($V_M - \Delta V_1 + \Delta V_2$), wherein $V_M$ represents a necessary minimum power source voltage required in said battery (90); $\Delta V_1$ represents a decrement of voltage dropped from said battery (90) to said battery voltage monitoring means (104); and $\Delta V_2$ represents a maximum voltage detection error on the plus side presumed in said battery voltage monitoring means (104).

18. An electrical connection structure for a heater unit for a grip in a vehicle comprising a heater unit (92) for a grip, which is comprised of a heater ($34_L$, $34_R$; $174_L$, $174_R$; 184) installed in a grip ($27_{L1}$, $27_{R1}$; $27_{L2}$, $27_{R2}$, 27) mounted on a steering handlebar (26), and a control device (91) for controlling the supplying of a power from a power source (90) mounted on a vehicle body frame to said heater ($34_L$, $34_R$; $174_L$, $174_R$; 184), wherein plus-side and minus-side connecting wires (94, 95) led out of said heater unit (92) for the grip are interruptively connected to a plus wire of one of first and second electric parts (158; $23_L$, $23_R$) and to a minus wire of the other electric part at locations near said electric parts (158, $23_L$, $23_R$) which are disposed on said steering handlebar (26) or a member (21) turned in unison with said steering handlebar (26) and to which a power is supplied from the power source (90).

19. An electrical connection structure for a heater unit for a grip in a vehicle according to claim 18, wherein one of said plus-side and minus-side connecting wires (94, 95) is interruptively connected between a main switch (142) for switching-over the connection and disconnection with a battery (90) which serves as said power source and a stop switch (158) disposed on the steering handlebar (26), and the other of said plus-side and minus-side connecting wires (94, 95) is interruptively connected to between said battery (90) and left and right front winker lamps ($23_L$, $23_R$) disposed on the steering handlebar (26) or the member (21) turned in unison with said steering handlebar (26).

20. An electrical connection structure for a heater unit for a grip in a vehicle, comprising a heater unit (92) for a grip, said heater unit being comprised of a heater ($34_L$, $34_R$; $174_L$, $174_R$; 184) installed in a grip ($27_{L1}$, $27_{R1}$; $27_{L2}$, $27_{R2}$; 27) mounted on a steering handlebar (26), and a control device (91) for controlling the supplying of a power from a power source (90) mounted on a vehicle body frame to said heater ($34_L$, $34_R$; $174_L$, $174_R$; 184), and an earth wire (147) connected to a grounding portion ($E_C$) of a power source (90) and coupled to the steering handlebar (26) or a member (21) which is turned in unison with the steering handlebar (26), wherein a first connecting wire (94) led out of said heater unit (92) is interruptively connected between the power source (90) and an electric part (158) at a location near said electric part (158) which is disposed on the steering handlebar (26) or the member (21) turned in unison with the steering handlebar (26) and to which an electric power is supplied from the power source (90), and a second connecting wire (95) led out of said heater unit (92) is connected to said steering handlebar (26) or said member (21) turned in unison with the steering handlebar (26).

* * * * *

UNITED STATES PATENT AND TRADEMARK OFFICE
CERTIFICATE OF CORRECTION

PATENT NO. : 6,114,668

DATED : September 5, 2000

INVENTOR(S) : OGATA et al.

It is certified that error appears in the above-identified patent and that said Letters Patent is hereby corrected as shown below:

On the title page: ITEM [54] and Column 1, line 3, please delete--HEATER-CONTAINING GRIP FOR VEHICLES, and insert--HEATER-INSTALLED GRIP FOR VEHICLE, CONTROL DEVICE FOR HEATER INSTALLED IN VEHICLE GRIP, AND ELECTRICAL CONNECTION STRUCTURE FOR HEATER UNIT FOR GRIP IN VEHICLE.

Item [73] change "Koita" to --Koito--.

Signed and Sealed this

Twentieth Day of February, 2001

*Attest:*

NICHOLAS P. GODICI

*Attesting Officer*     Acting Director of the United States Patent and Trademark Office